(12) United States Patent
Hammi et al.

(10) Patent No.: US 11,299,300 B2
(45) Date of Patent: Apr. 12, 2022

(54) POUCH FILLING STATION

(71) Applicant: ChooMee Inc., Rocklin, CA (US)

(72) Inventors: Ray J. Hammi, Rocklin, CA (US); Daniel Adamian, San Diego, CA (US)

(73) Assignee: ChooMee Inc., Rocklin, CA (US)

( * ) Notice: Subject to any disclaimer, the term of this patent is extended or adjusted under 35 U.S.C. 154(b) by 154 days.

(21) Appl. No.: 16/868,288

(22) Filed: May 6, 2020

(65) Prior Publication Data
US 2020/0354092 A1 Nov. 12, 2020

Related U.S. Application Data

(60) Provisional application No. 62/844,028, filed on May 6, 2019.

(51) Int. Cl.
| | |
|---|---|
| *B65B 3/12* | (2006.01) |
| *B65D 75/58* | (2006.01) |
| *B65B 3/04* | (2006.01) |
| *B65B 39/08* | (2006.01) |
| *B65B 3/14* | (2006.01) |
| *B65B 37/06* | (2006.01) |
| *B65B 37/14* | (2006.01) |
| *B65B 3/26* | (2006.01) |
| *B67D 7/02* | (2010.01) |

(52) U.S. Cl.
CPC ............... *B65B 3/12* (2013.01); *B65B 3/045* (2013.01); *B65B 3/14* (2013.01); *B65B 3/26* (2013.01); *B65B 37/06* (2013.01); *B65B 37/14* (2013.01); *B65B 39/08* (2013.01); *B65D 75/5883* (2013.01); *B67D 7/0227* (2013.01)

(58) Field of Classification Search
CPC .. B65B 3/12; B65B 3/045; B65B 3/14; B65B 3/26; B65B 3/30; B65B 37/06; B65B 37/14; B65B 39/004; B65B 39/08; B65B 39/06; B65B 57/145; B65D 75/5883; B67D 7/0227; A47J 19/04
See application file for complete search history.

(56) References Cited

U.S. PATENT DOCUMENTS

| | | | | |
|---|---|---|---|---|
| 3,682,356 | A * | 8/1972 | Karie | A47J 47/01 222/132 |
| 4,493,349 | A * | 1/1985 | Pomponio, Sr. | B65B 31/044 137/246.22 |
| 5,975,163 | A * | 11/1999 | Gianfranco | B65B 39/004 141/285 |

(Continued)

OTHER PUBLICATIONS

Sep. 29, 2021—(EP) EESR—App. No. 21172598.1.

*Primary Examiner* — Nicolas A Arnett
(74) *Attorney, Agent, or Firm* — Banner & Witcoff, Ltd.

(57) ABSTRACT

A table top appliance rapidly fills a pouch through some mechanical actuation or automation by inserting the pouch into the appliance and the machine fills the pouch. One embodiment of the food pouch filling station may be a mechanical version that includes a method to pump or push the contents of the container into the pouch. A second embodiment of the food pouch filling station may be an electric pump version that fills pouches and may have the option of controlling the amount of food dispensed. The food pouch filling station may also include a valve that connects to the pouch to control the flow to the pouch.

20 Claims, 50 Drawing Sheets

(56) References Cited

U.S. PATENT DOCUMENTS

| | | | |
|---|---|---|---|
| 8,016,150 B1 * | 9/2011 | Bunch | A47J 37/1271 |
| | | | 220/571 |
| 9,918,580 B2 | 3/2018 | Jan | |
| 10,710,753 B2 * | 7/2020 | Tamarindo | B65D 75/5866 |
| 2008/0105328 A1 * | 5/2008 | Desmond | A45F 5/00 |
| | | | 141/2 |
| 2013/0074456 A1 * | 3/2013 | Hradisky | B65B 39/06 |
| | | | 53/473 |
| 2014/0178545 A1 | 6/2014 | Fach | |

* cited by examiner

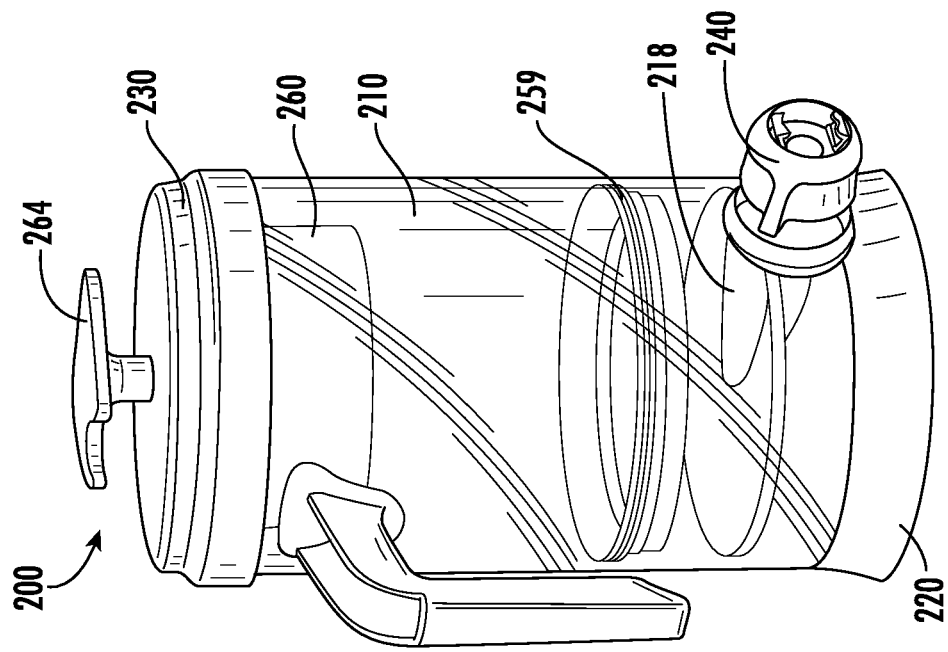
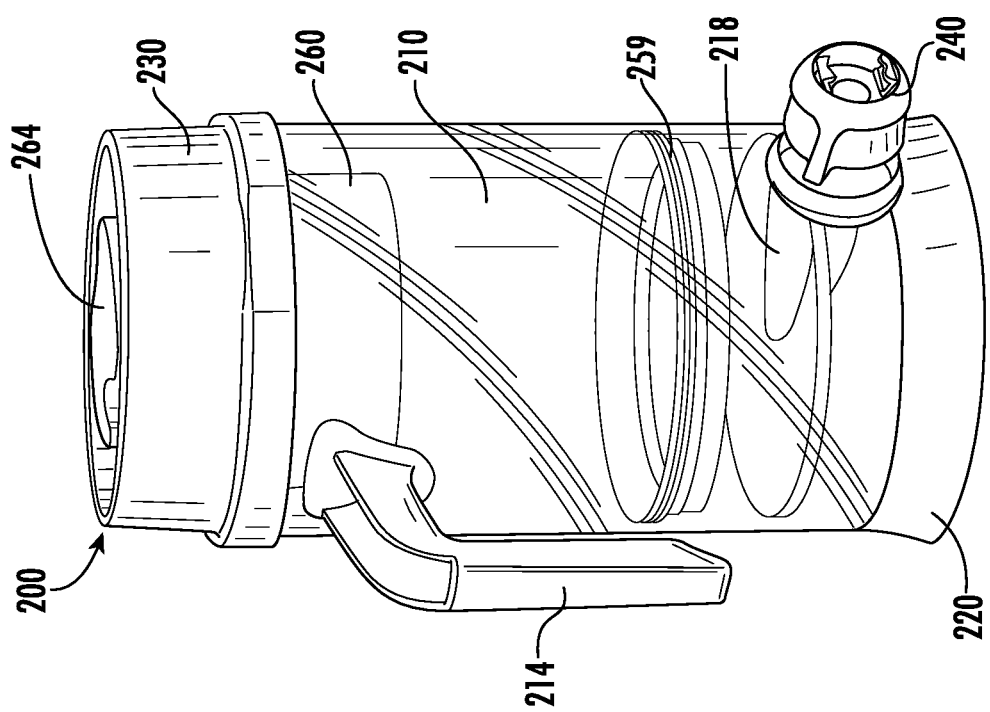

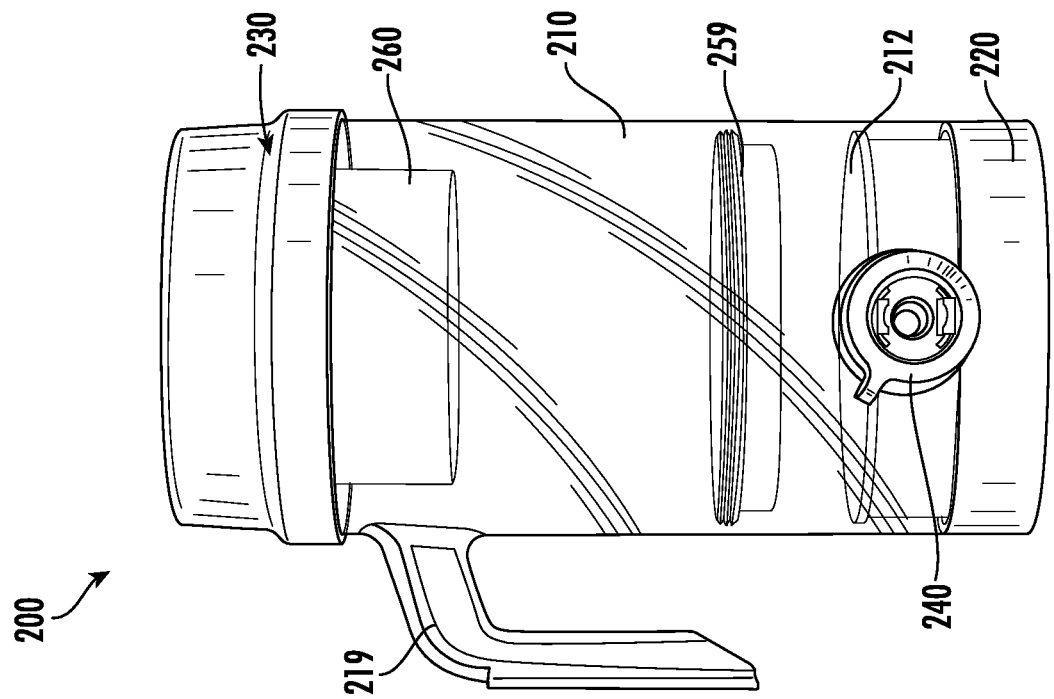
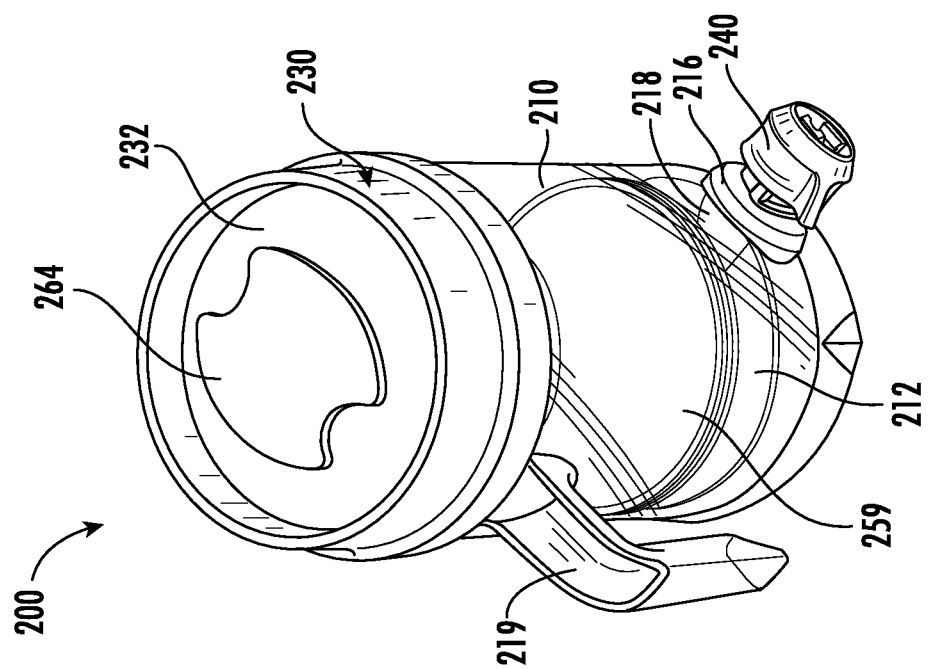

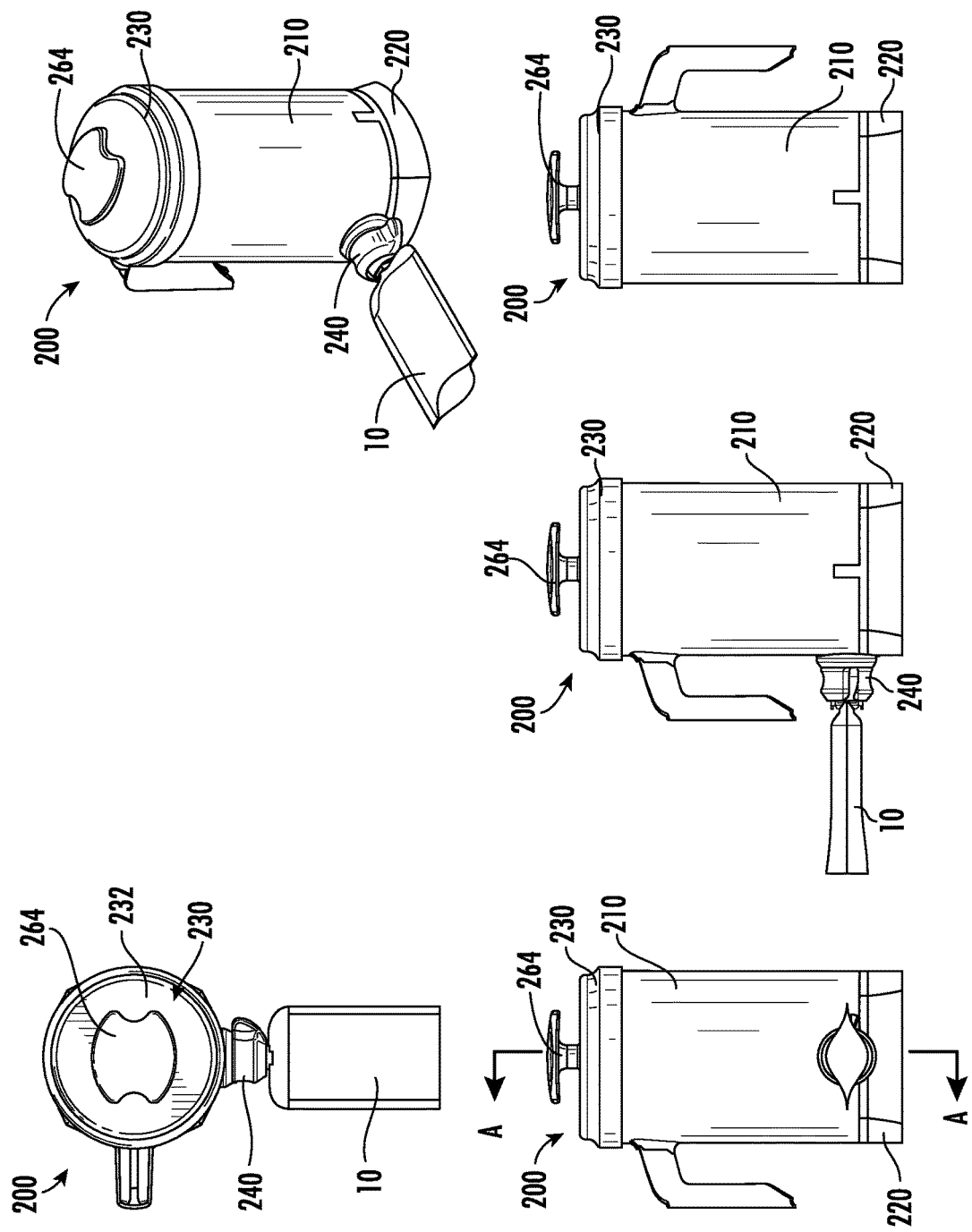

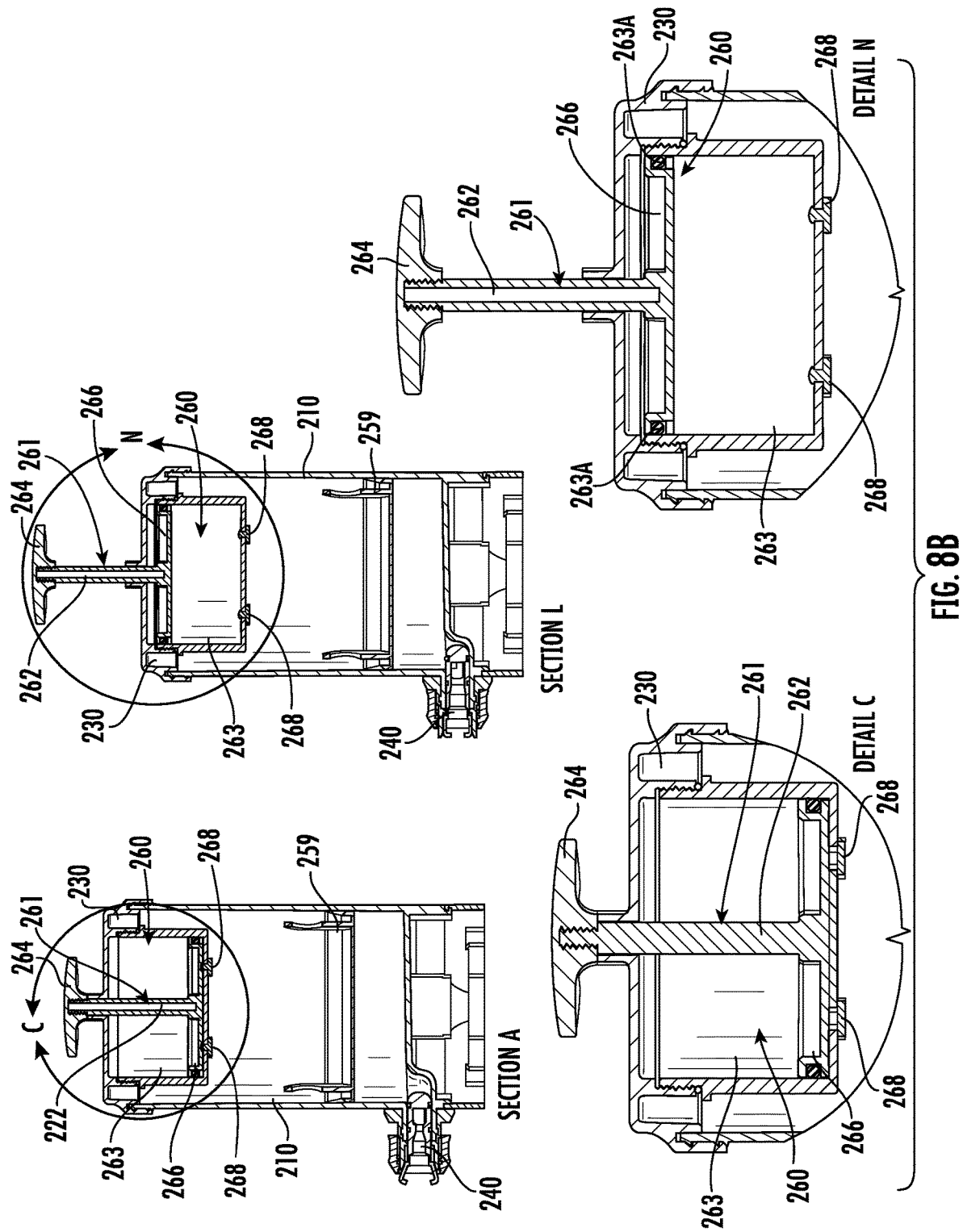

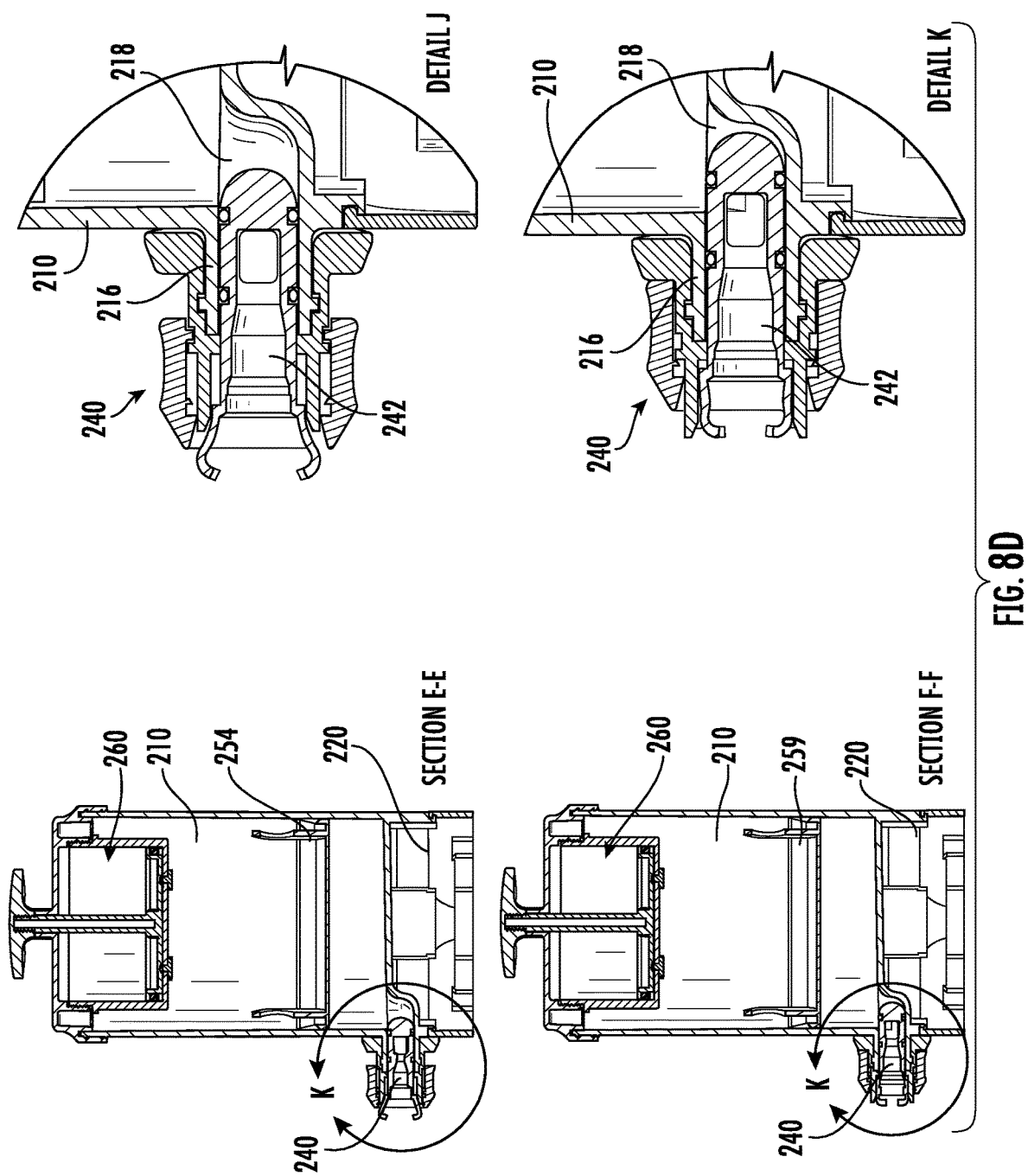

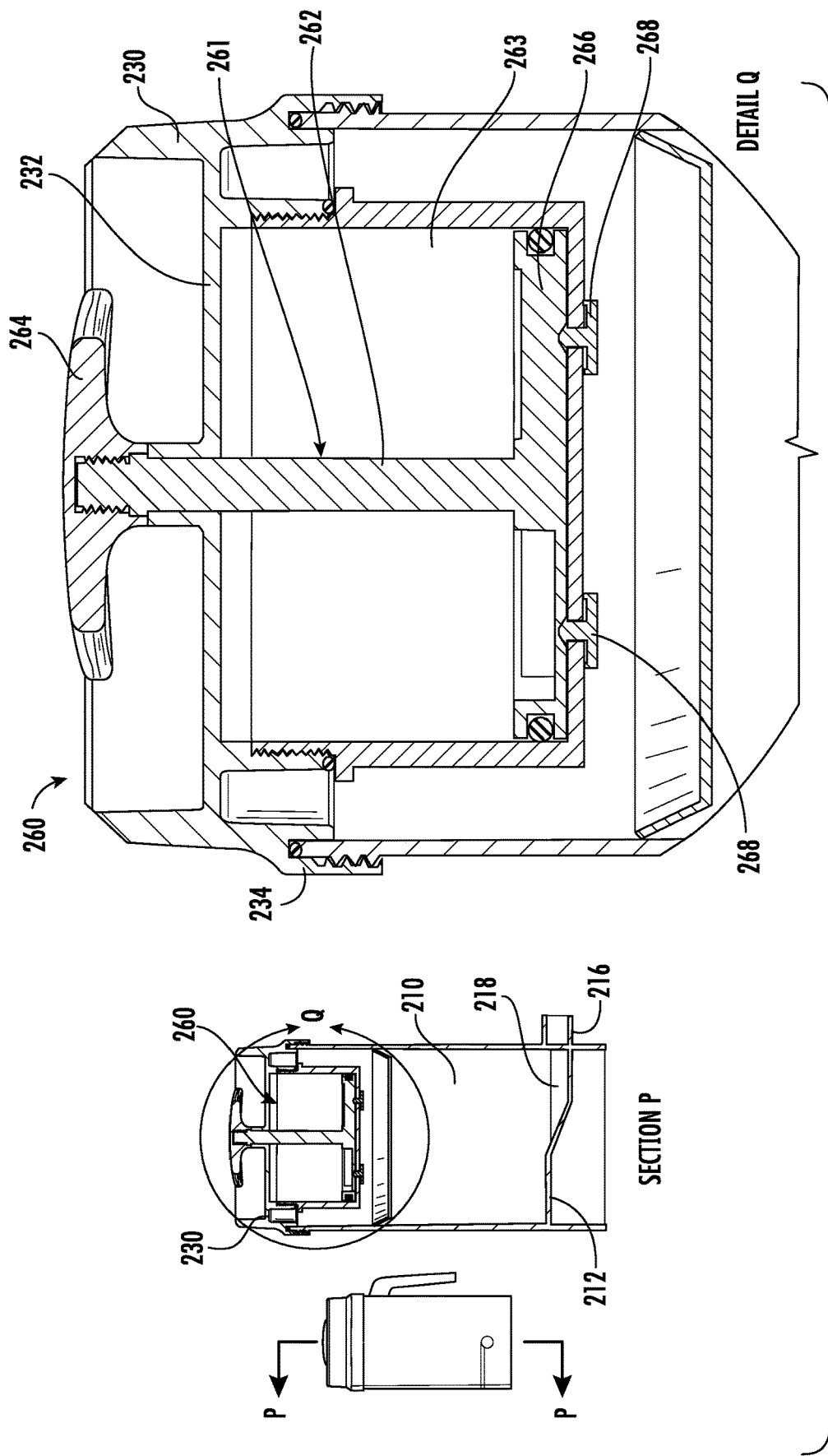

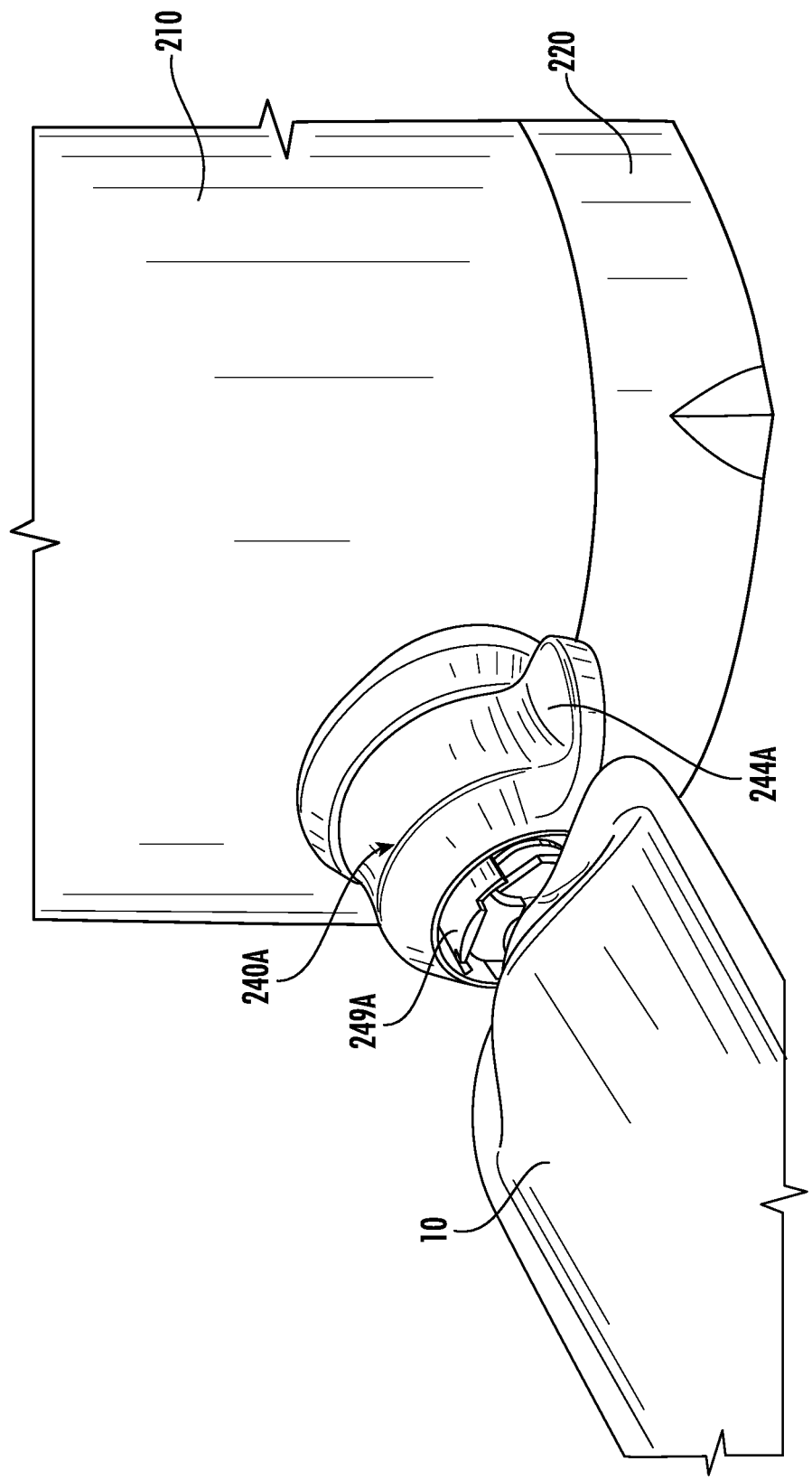

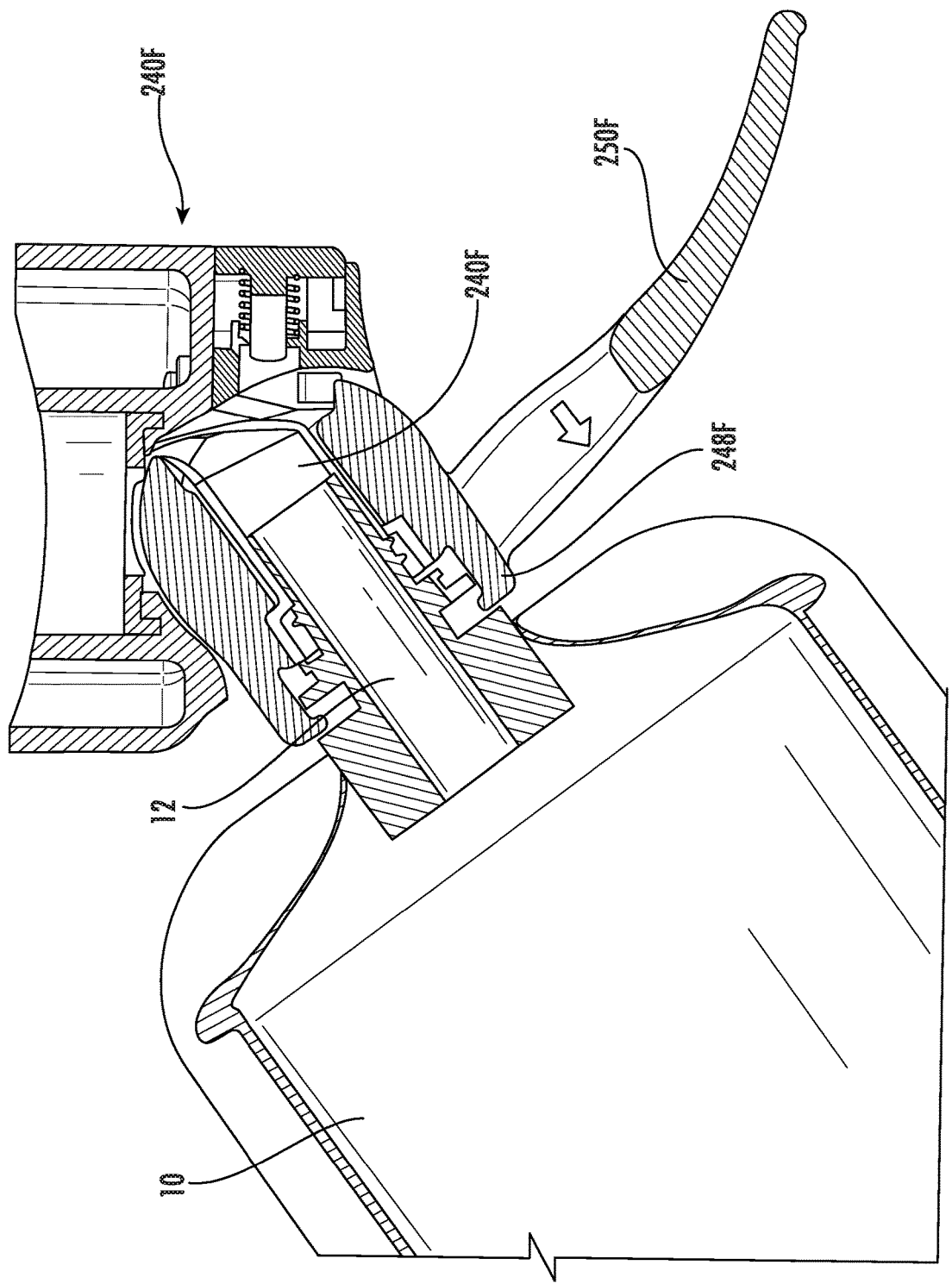

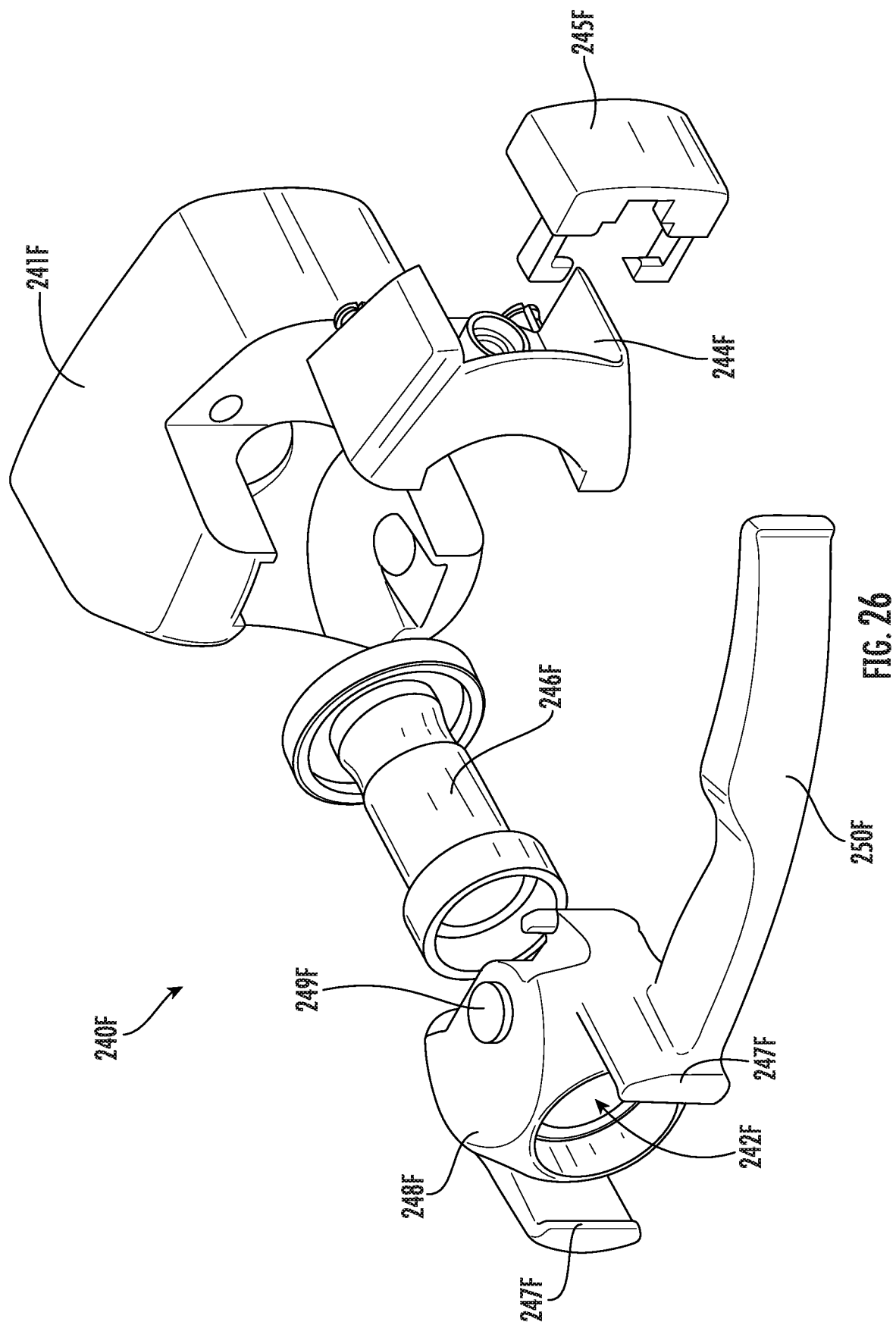

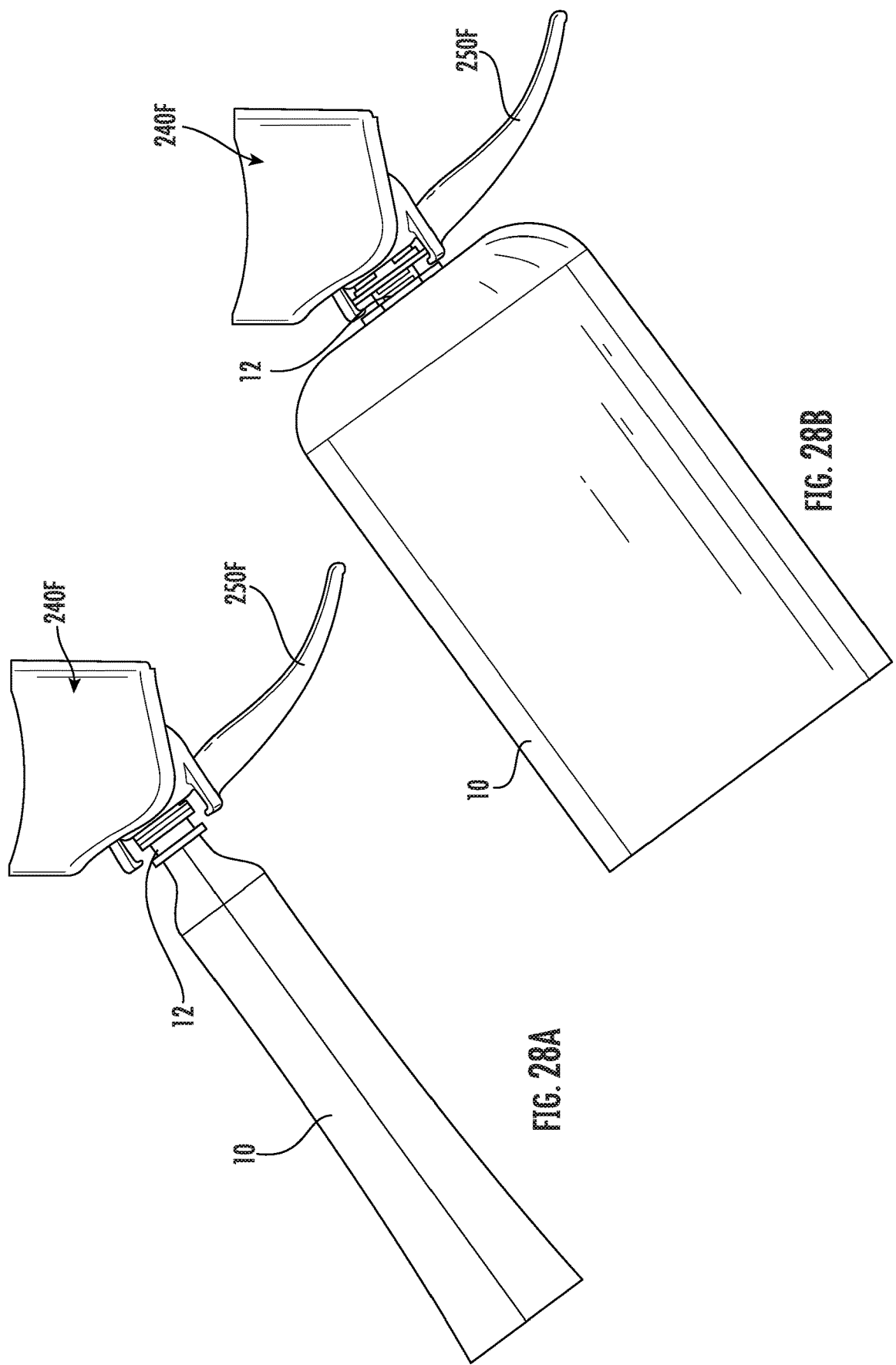

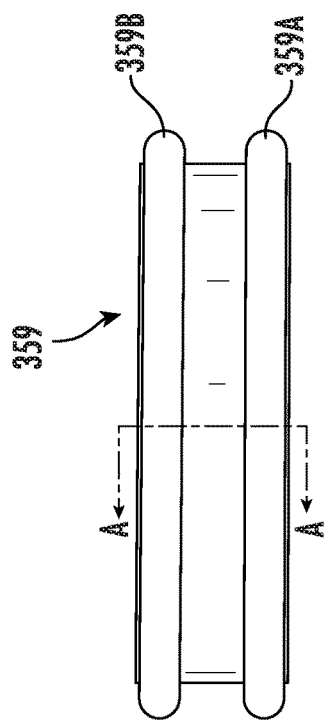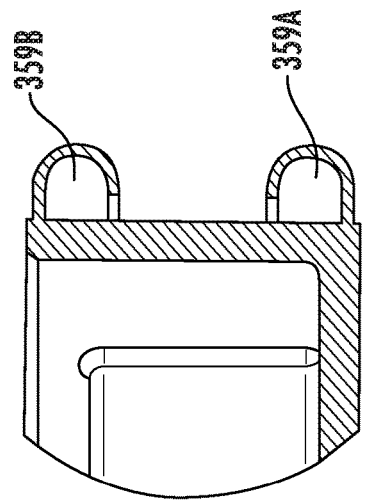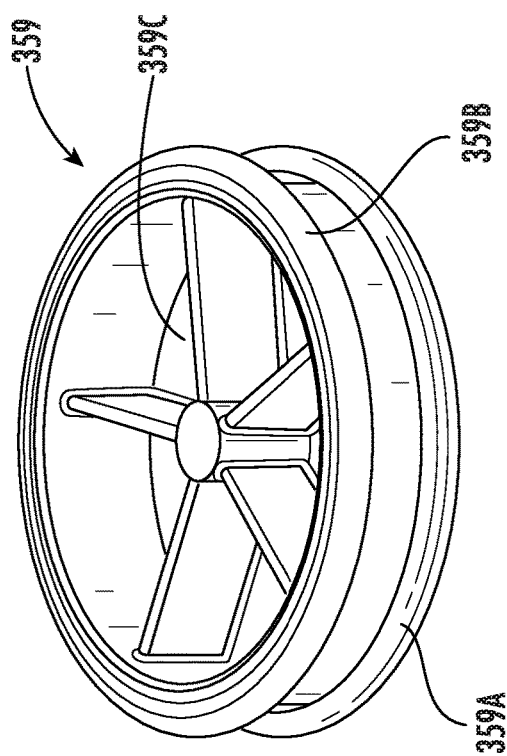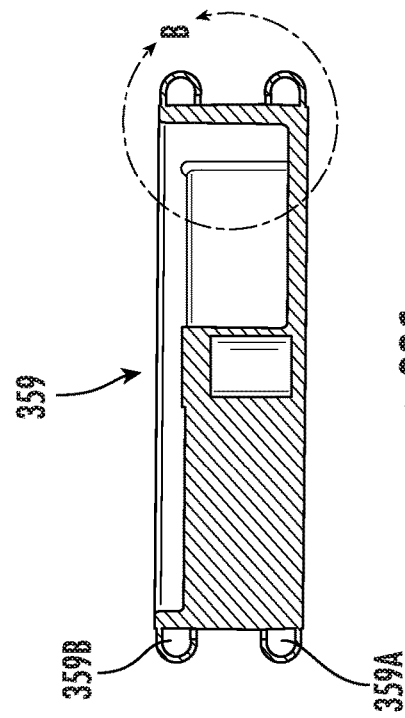

POUCH FILLING STATION

CROSS-REFERENCE TO RELATED APPLICATIONS

This application claims priority to U.S. Provisional Patent No. 62/844,028, filed May 6, 2019, entitled Food Pouch Filling Station, which is incorporated herein by reference in its entirety and made a part hereof.

FIELD OF THE INVENTION

The present invention relates to filling stations, more particularly, to a pouch filling station or a food pouch filling station.

BACKGROUND

Since the advent of the reusable and disposable food pouch, consumers are now able to prepare and fill their own fresh recipes they make or by simply buying a large jar of apple sauce and pouring the food into each pouch. Food pouches are easy for on the go and are air tight and safe for refrigerator and freezer storage. Food pouches also act as a storage bag for puree and other liquid foods similar to resealable bags, resealable plastic ware, glass jars, and other container formats. Reusable pouches provide unique qualities such as low plastic weight, flexible, and the food can be squeezed out of various size and shape spouts. Pouches come in different sizes that typically range from 3 ounces to 8 ounces. Pouches can be designed for even larger sizes and may be used in other applications like laundry detergent, condiments, cooking sauces, hair shampoo. The uses may be endless and may carry into various markets globally.

Generally, the spouts used on reusable and disposable food pouches are standardized and there are only a few variations. There is one common spout diameter and two common spout track designs. Some spouts in Europe and other countries are larger in diameter and in some examples, the spout is a shorter than the standard design used on reusable pouches. Disposable food pouches at the grocery store also use the same standard spout shapes as noted above. These spouts were originally designed for retort packaging at the factory production packing level which is the reason for the channel tracks below the threads on the spouts.

Filling reusable or disposable food pouches has been traditionally completed by two methods. The first method is to fill through a zipper opening of the reusable pouches by pouring from a container or by placing a funnel in the zipper opening to minimize any overfill and spills on the zipper. Usually this this first method results in you having to wash the pouch from overfilling after closing the zipper and then cleaning out the food between the pouch material past the zipper end. There is about 10 mm of space from edge to zipper where food can lay and needs to be cleaned. This process is not efficient.

The second method of filling a pouch is through the spout of the food pouch. If the pouch has no zipper, then the pouch needs to be filled through the spout. There is one popular method today of using a plunger and canister to push the food into the spout. Some example canisters may use large diameter canisters that hold roughly 24 ounces of food. The second popular canister and plunger method fills smaller canisters for individual pouch filling. For these smaller canisters, there are three or four canister filling stations to plunger food into each pouch. In another example, there are reusable pouches with a large syringe to push the food through the food pouch spout.

Generally, it is ideal to fill through the spout because of speed and the elimination of overfilling the pouch from the zipper and eliminating the pouch cleanup time. It is ideal to create a proper seal around the spout surface either on the inside or outside circumference. It is best to seal on the outer diameter (OD) surface so that you do not reduce the diameter and food flow as in some of the prior art designs. For prior art designs, the pouch slides into a track and then squeezed for the food so the pouch is installed first and with a face-to-face gap with no contact because there is vertical flow down into the spout. The canister is loaded into canister, filled with food, and screwed down into the plastic station. The multiple mini-canisters and plungers create added cleaning time and more potential for spills and an efficient process.

It is difficult to control the vertical downward movement of the existing plunger and canister designs. The plunger is not affixed at the top like a french press plunger which has a lid and hole with a collar underneath the lid that provides vertical and concentric alignment to the canister for a smooth up and down motion. Without this feature, the plunger tips and will lose its seal about the canister and food can then float on top of the plunger. The process requires the operator to carefully push straight down. The seals on these plungers are also not well designed and due to the draft angle associated with the canister from the molding process, a well-designed lip seal and supporting plastic structure similar to a piston prevents tipping and ensures smooth and consistent force required.

SUMMARY

The present invention generally provides a system that includes a table top appliance that can rapidly fill a pouch through some mechanical actuation and ultimately be automated by inserting the pouch and the machine will fill the pouch.

According to one embodiment, a pouch filling station may comprise: a base that is sized and shaped to sit on a flat surface; a canister including a vessel that connects to the base; a lid that fits on a top of the canister; a valve located on the side wall of the canister; and an air pump system included with the lid and located on the top of the canister. The canister may have a bottom, side walls extending from the bottom, and a canister spout located adjacent to the bottom, the canister holding contents to be dispensed into a pouch. The valve may be configured to attach to the canister spout and a pouch spout of the pouch, the valve controlling a flow of the contents of the canister to fill the pouch. The air pump system may include a pump housing, one or more check valve seals located at the bottom of the pump housing, and a pump to pressurize the pump housing and the canister through the one or more check valve seals. The one or more check valve seals may allow air to flow from the pump housing to the canister and prevent air from escaping from the canister when the pump pressurizes the pump housing. When the pump housing and the canister are pressurized with the pump, the pouch spout is connected to the valve, and the valve is opened, the air pressure from the canister pushes the contents of the canister through the canister spout and the valve into the pouch.

Additionally, the bottom of the canister may be slanted towards the canister spout and the bottom of the canister may include a trough to feed the contents of the canister to the canister spout. The valve may be one of the following:

a ball valve, a pinch valve, a dial-clamp valve, or a cone valve seal. The lid may include a top plate and a flange extending downward from the top plate, wherein the flange is sized and shaped to cooperate with the side walls of the canister to secure the lid to the canister, wherein the top plate stabilizes a pump shaft from the pump. The pump may include a pump shaft with a handle located at one end and a pump flange located at the opposite end of the pump shaft. The pump housing may include a spring so that the pump and handle retract automatically after the pump is pressed downward. The lid may include a seal on the pump housing. The air pump system may include a plunger disk seal located within an internal diameter of the canister to ensure an even distribution of air pressure on the contents of the canister. The plunger disk seal may include a rigid body disk and one or more radius-lobed flexible seals extending around the circumference of the rigid body disk, wherein the one or more radius-lobed flexible seals seal the internal diameter of the canister. The air pump system may include an automatic pump with a pump motor that electronically generates a pressure and a volume of air in the pump housing in a specified amount of time, wherein when the valve is opened and a pouch is filled, the automatic pump automatically turns on and pressurizes the pump housing and the canister to maintain a preset pressure. The air pump system may include a pressure sensor that stops filling at a certain pressure and maintains a specific pressure within in the canister. The air pump system may include an electric pump that fits on the lid and mates with the canister to generate a pressure and a volume of air in the pump housing in a specified amount of time. The electric pump may include controls that maintain a specified air pressure to fill a certain amount of fluid ounces based on a pouch size.

According to another embodiment, a pouch filling station may comprise: a base that is sized and shaped to sit on a flat surface; a canister including a vessel that connects to the base; a lid that fits on a top of the canister; valve located on the side wall of the canister; and an air pump system included with the lid and located on the top of the canister. The canister may have a bottom, side walls extending from the bottom, and a canister spout located adjacent to the bottom, the canister holding contents to be dispensed into a pouch. The bottom of the canister may be slanted towards the canister spout to feed the contents of the canister to the canister spout. The bottom of the canister may include a trough to feed the contents of the canister to the canister spout. The lid may include a top plate and a flange extending downward from the top plate, wherein the flange is sized and shaped to cooperate with the side walls of the canister to secure the lid to the canister. The valve may be configured to attach to the canister spout and a pouch spout of the pouch, the valve controlling a flow of the contents of the canister to fill the pouch. The air pump system may include a pump housing, one or more check valve seals located at the bottom of the pump housing, and a pump to pressurize the pump housing and the canister through the one or more check valve seals. The one or more check valve seals may allow air to flow from the pump housing to the canister and prevent air from escaping from the canister when the pump pressurizes the pump housing. The air pump system may further include a plunger disk seal located within an internal diameter of the canister to ensure an even distribution of air pressure on the contents of the canister. The pump may include a pump shaft with a handle located at one end and a pump flange located at the opposite end of the pump shaft, the top plate stabilizes the pump shaft. The pump housing may include a spring so that the pump and handle retract automatically after the pump is pressed downward. When the pump housing and the canister are pressurized with the pump, the pouch spout is connected to the valve, and the valve is opened, the air pressure from the canister pushes the contents of the canister through the canister spout and the valve into the pouch.

In yet a further embodiment of the invention, a pouch filling station may comprise: a base that is sized and shaped to sit on a flat surface; a canister including a vessel that connects to the base; a lid that fits on a top of the canister; a valve located on the side wall of the canister; and an air pump system included with the lid and located on the top of the canister. The canister may have a bottom, side walls extending from the bottom, and a canister spout located adjacent to the bottom. The canister may hold contents to be dispensed into a pouch. The bottom of the canister may be slanted towards the canister spout to feed the contents of the canister to the canister spout. The bottom of the canister may include a trough to feed the contents of the canister to the canister spout. The valve may be configured to attach to the canister spout and a pouch spout of the pouch, the valve controlling a flow of the contents of the canister to fill the pouch. The air pump system may include a pump housing, one or more check valve seals located at the bottom of the pump housing, and a pump to pressurize the pump housing and the canister through the one or more check valve seals. The one or more check valve seals may allow air to flow from the pump housing to the canister and prevent air from escaping from the canister when the pump pressurizes the pump housing. The air pump system may further include a plunger disk seal located within an internal diameter of the canister to ensure an even distribution of air pressure on the contents of the canister. The plunger disk seal may include a rigid body disk and one or more radius-lobed flexible seals extending around the circumference of the rigid body disk, wherein the one or more radius-lobed flexible seals seal the internal diameter of the canister. The air pump system may include an automatic pump with a pump motor that electronically generates a pressure and a volume of air in the pump housing in a specified amount of time. When the valve is opened and a pouch is filled, the automatic pump automatically turns on and pressurizes the pump housing and the canister to maintain a preset pressure. When the pump housing and the canister are pressurized with the pump, the pouch spout is connected to the valve, and the valve is opened, the air pressure from the canister pushes the contents of the canister through the canister spout and the valve into the pouch.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIGS. 6A-6D are various views of another food pouch filling station in accordance with an embodiment of the system of the present invention;

FIGS. 8A-8D include various views of another food pouch filling station in accordance with an embodiment of the system of the present invention;

FIGS. 9 and 10 include various views of components of a food pouch filling station in accordance with an embodiment of the system of the present invention;

FIGS. 12-15 include various views of components of a food pouch filling station in accordance with an embodiment of the system of the present invention;

FIGS. 25A-25C include various views of components of a food pouch filling station in accordance with an embodiment of the system of the present invention;

FIG. 26 includes an exploded view of components of a food pouch filling station in accordance with an embodiment of the system of the present invention;

FIGS. 28A and 28B include various views of components of a food pouch filling station in accordance with an embodiment of the system of the present invention;

FIGS. 38A-38D include various views of components of a food pouch filling station in accordance with an embodiment of the system of the present invention.

The reader is advised that the attached drawings are not necessarily drawn to scale.

DETAILED DESCRIPTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

The goal of the invention is a table top appliance that can rapidly fill a pouch through some mechanical actuation and ultimately be automated by inserting the pouch and the machine will fill the pouch.

One embodiment of the food pouch filling station may be a mechanical version that includes a method to pump or push the food into the pouch. A second embodiment of the food pouch filling station may be an electric pump version that fills pouches and may have the option of controlling the amount of food dispensed.

French Press Plunger Concept

Figure 1:
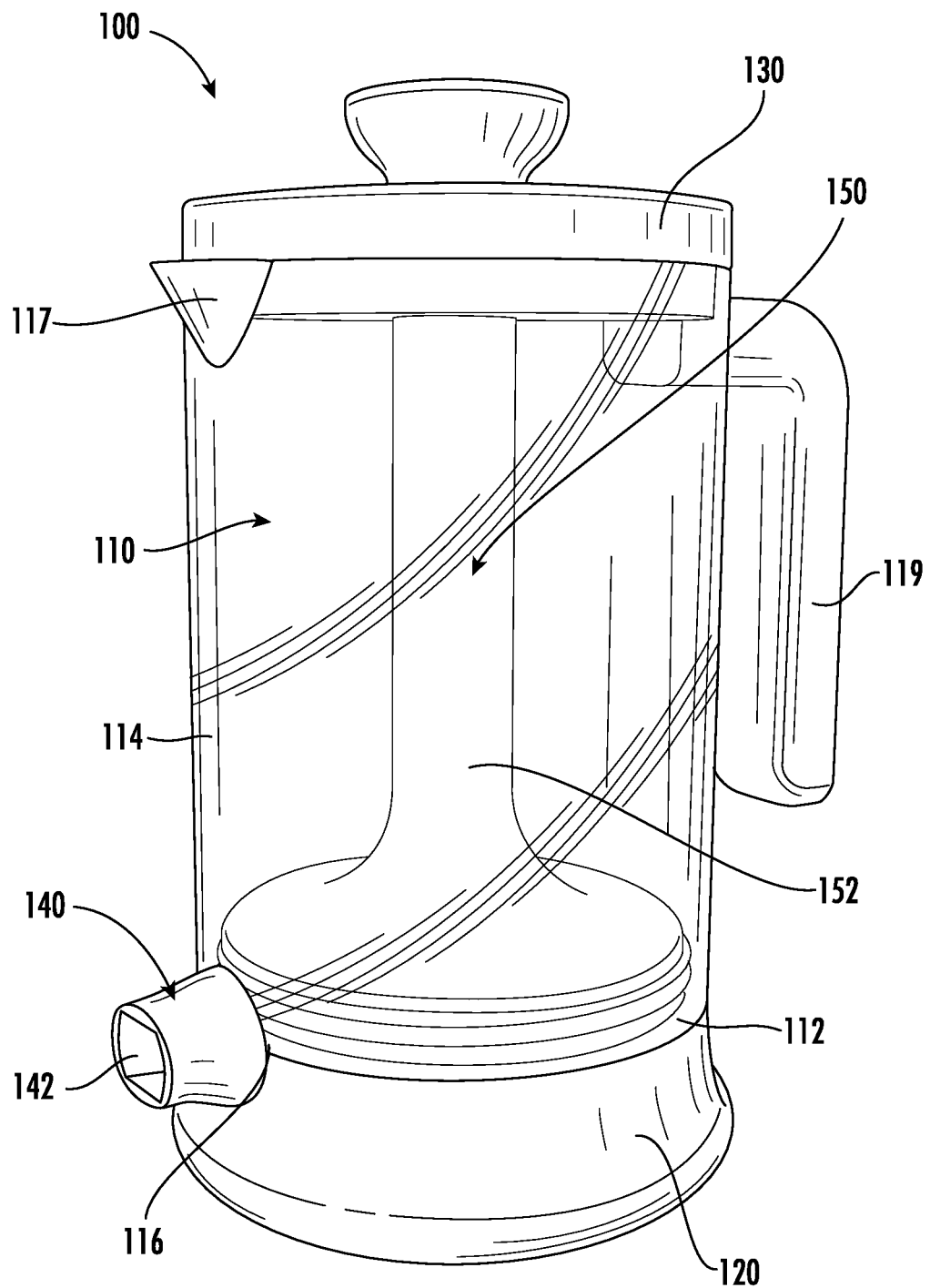
FIG. 1 is a perspective view of a food pouch filling station with a plunger in accordance with an embodiment of the system of the present invention.
Figure 2A:
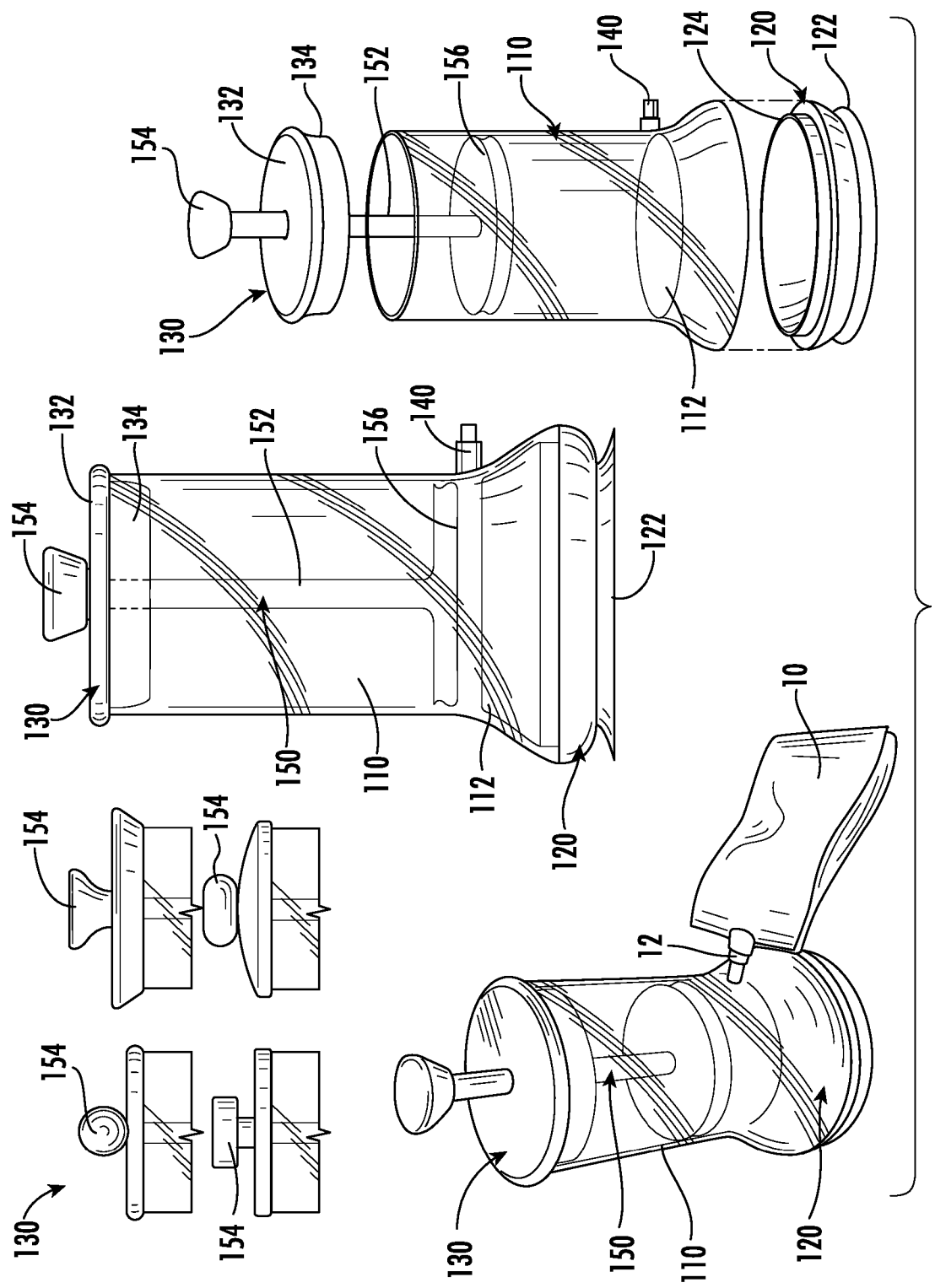
FIGS. 2A-2D are various views of another food pouch filling station in accordance with an embodiment of the system of the present invention.
Figure 2B:
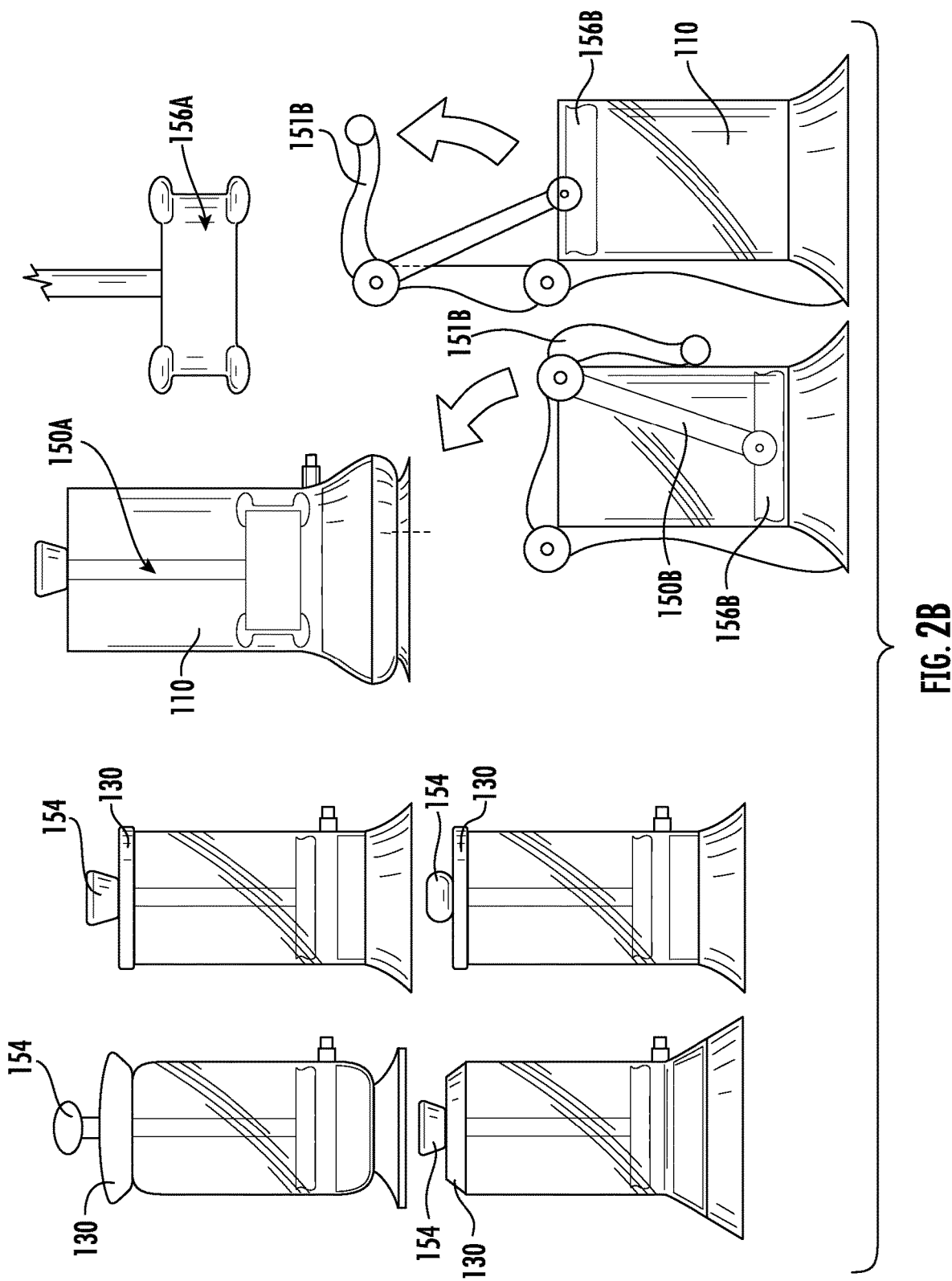
Figure 2C:
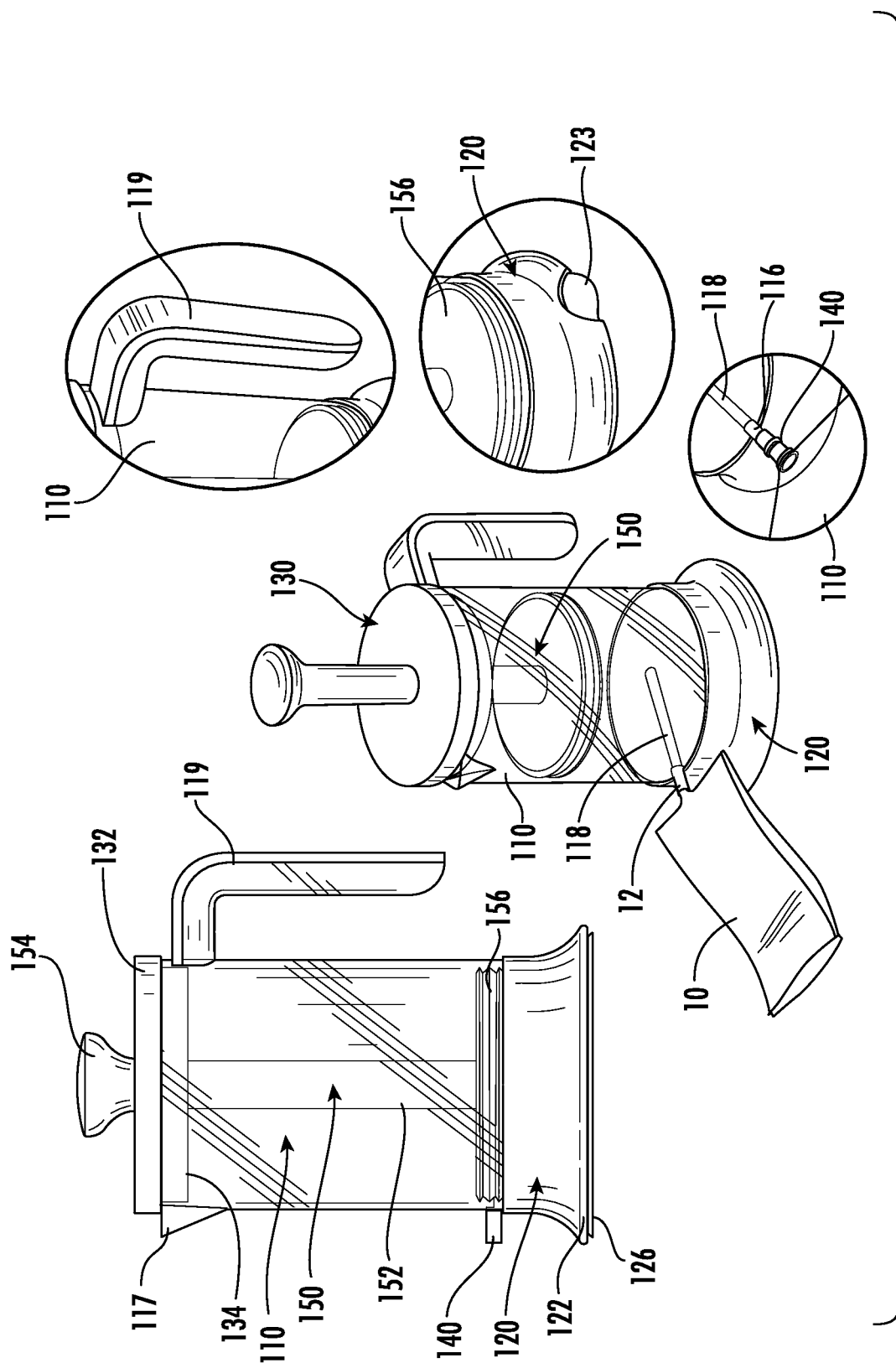
Figure 2D:
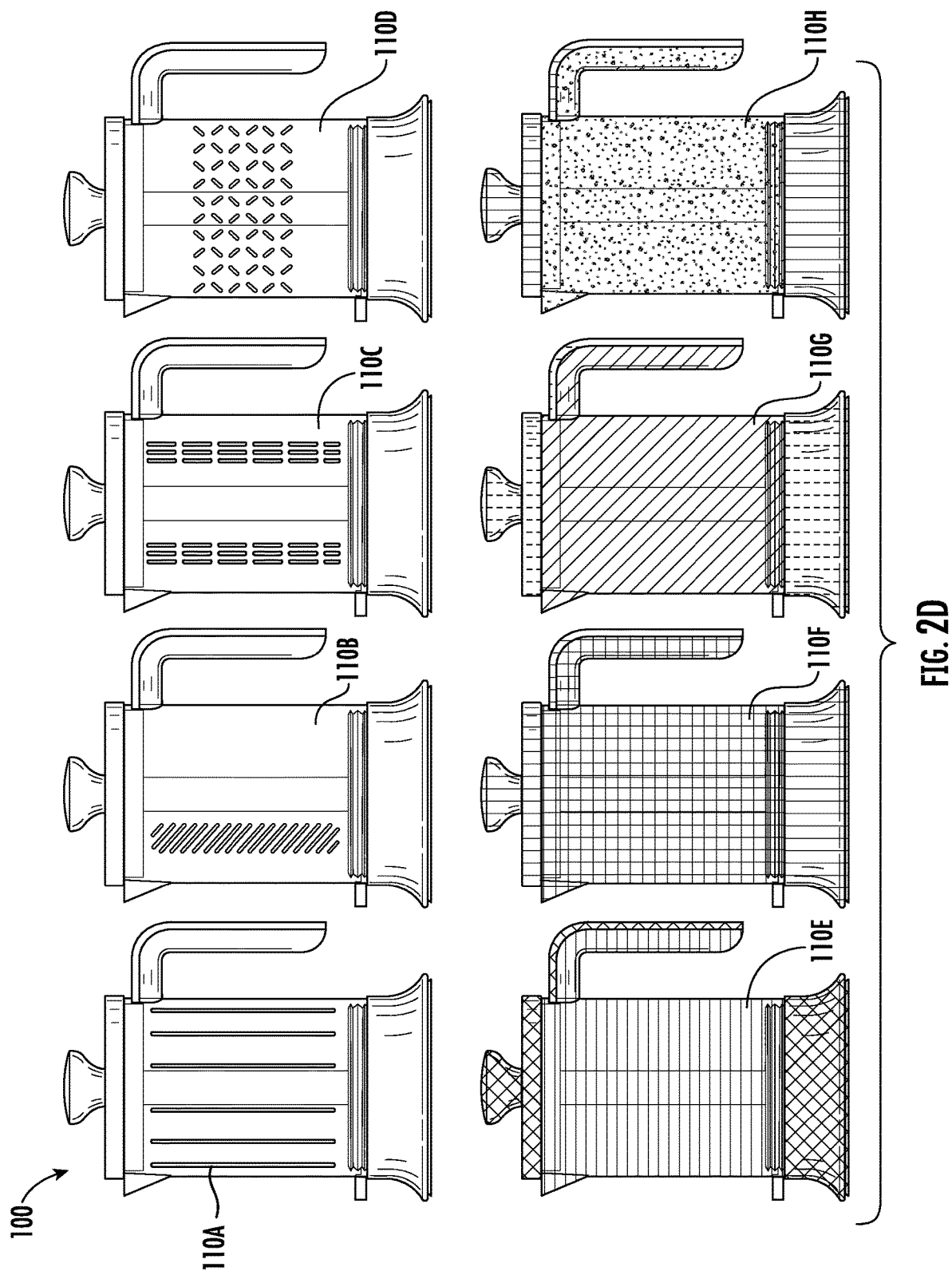
Figure 3:
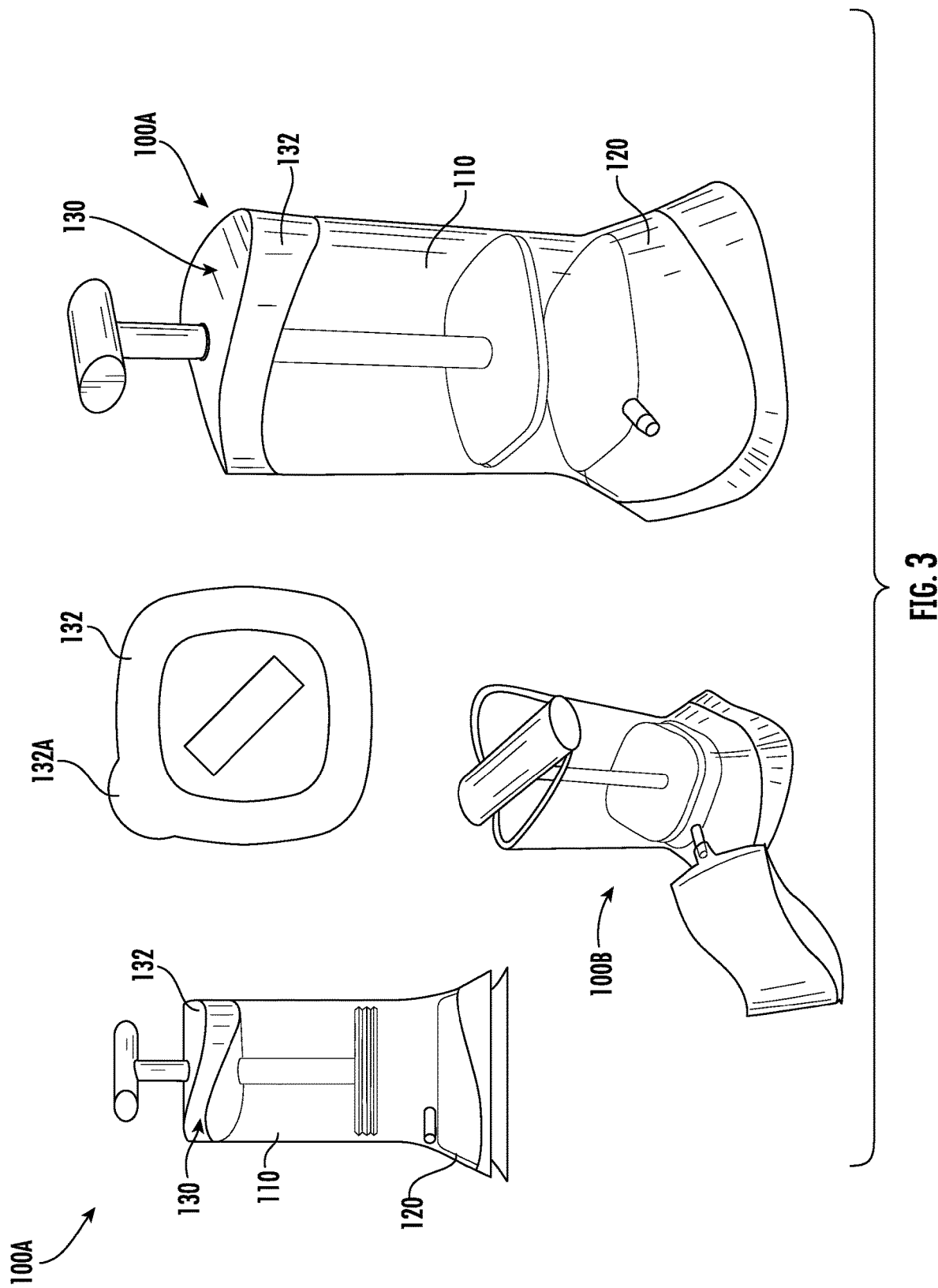
FIG. 3 includes various views of another food pouch filling station in accordance with an embodiment of the system of the present invention.
Figure 4:
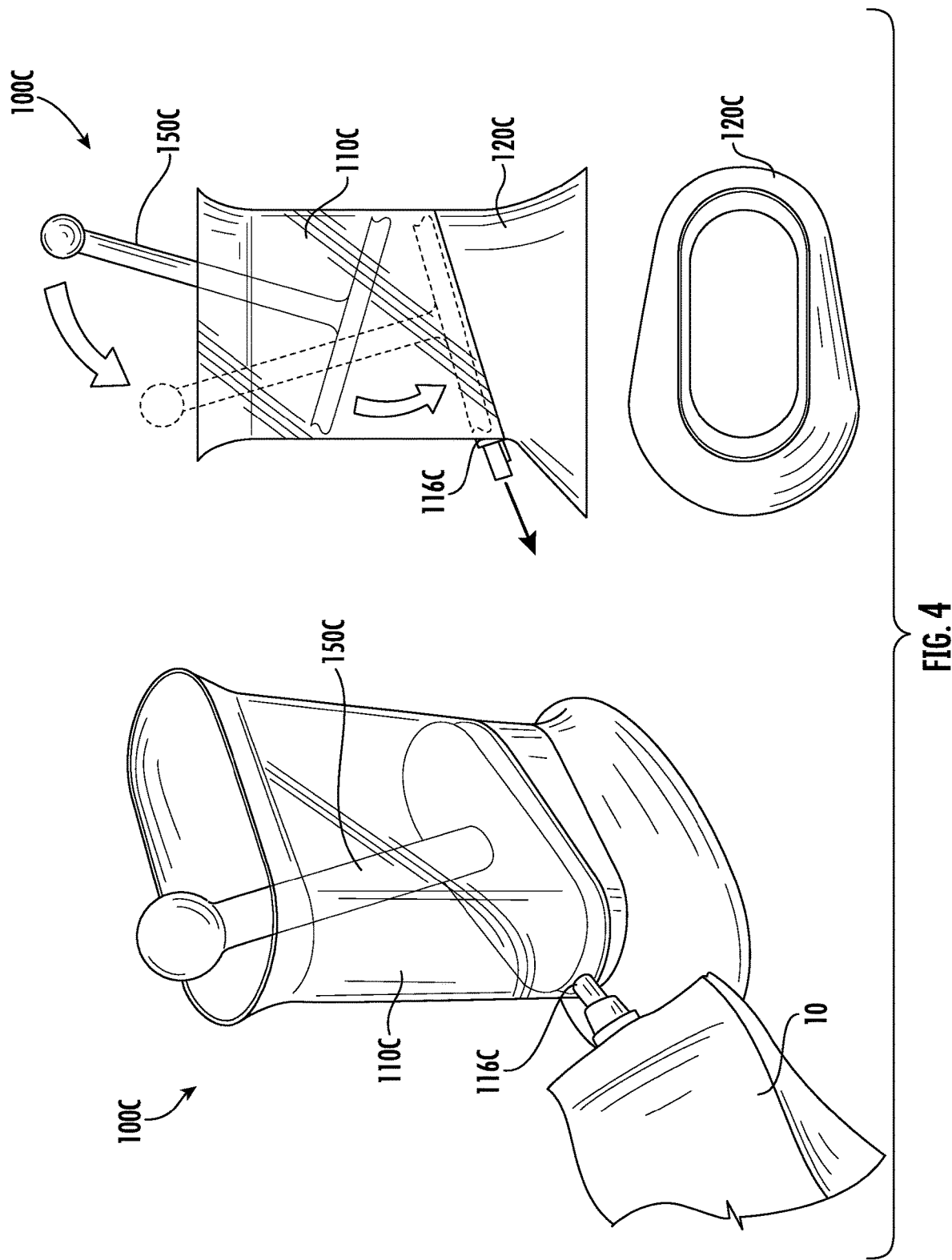
FIG. 4 includes various views of another food pouch filling station in accordance with an embodiment of the system of the present invention.
Figure 5B:
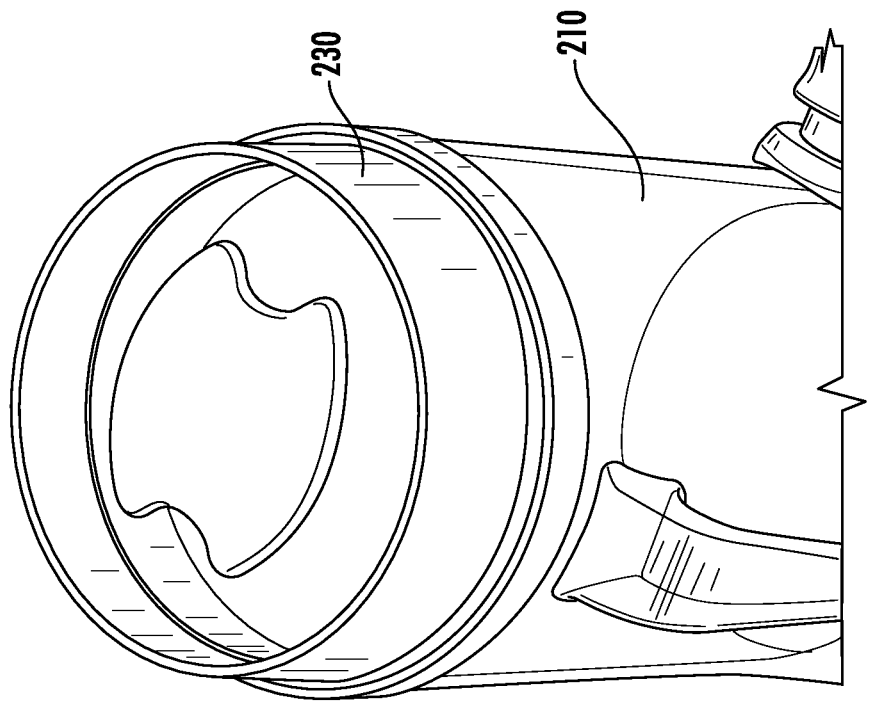
FIGS. 5A-5D are various views of another food pouch filling station in accordance with an embodiment of the system of the present invention.
Figure 5A:
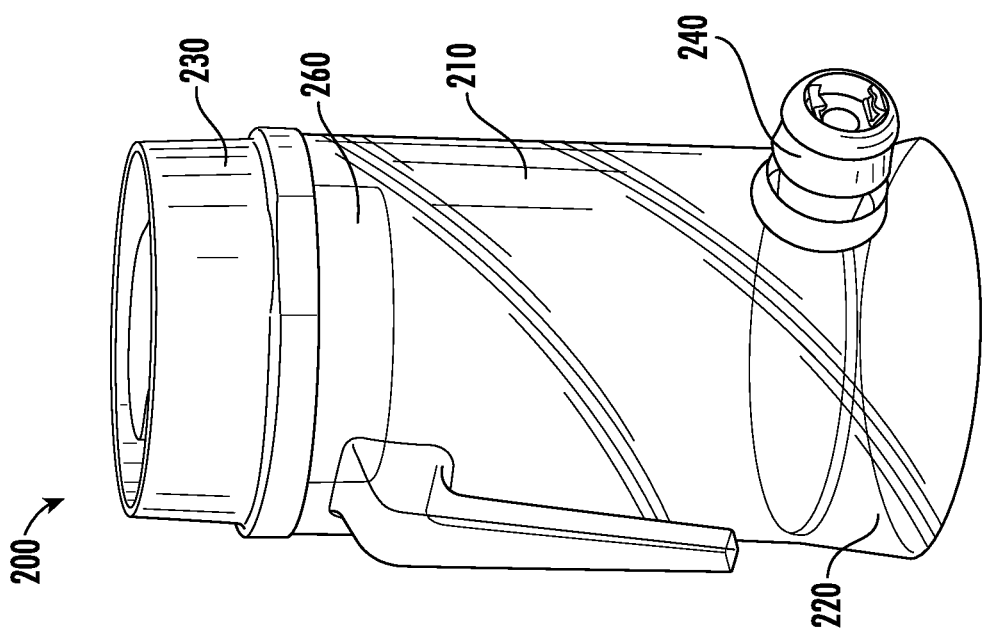
Figure 5D:
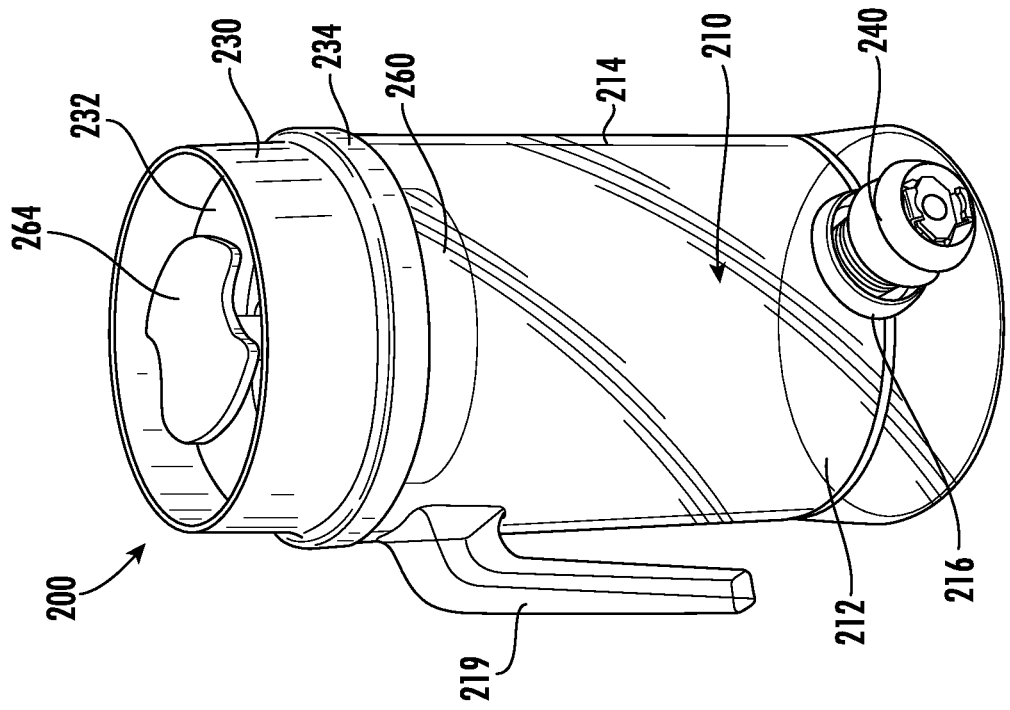
Figure 5C:
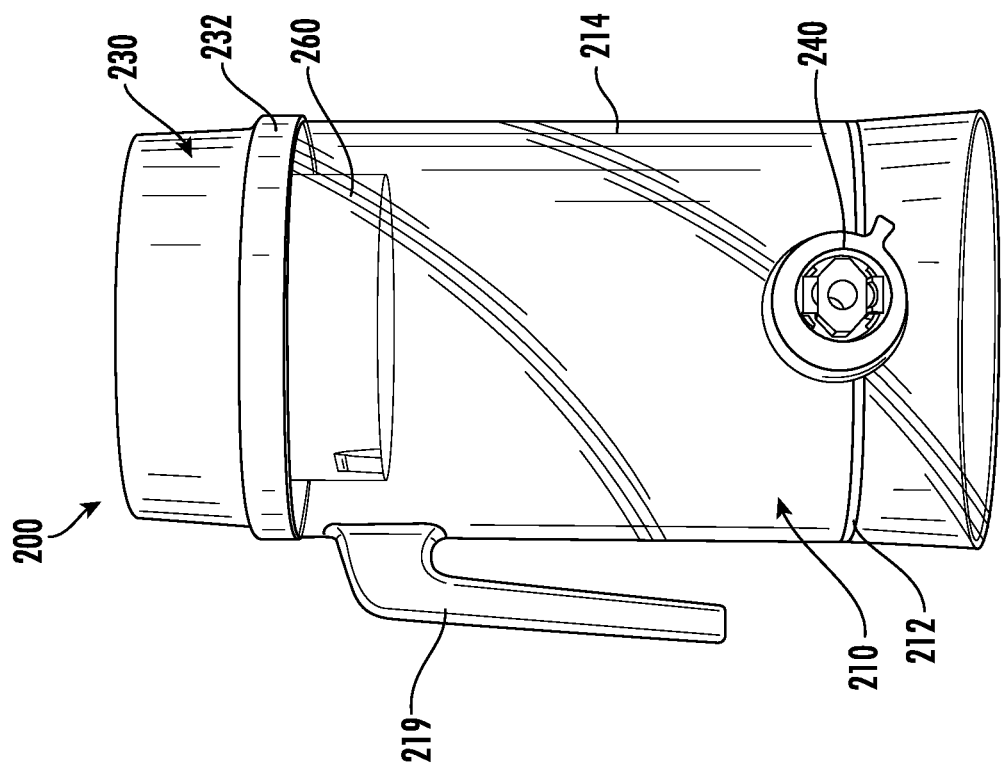
Figure 7:
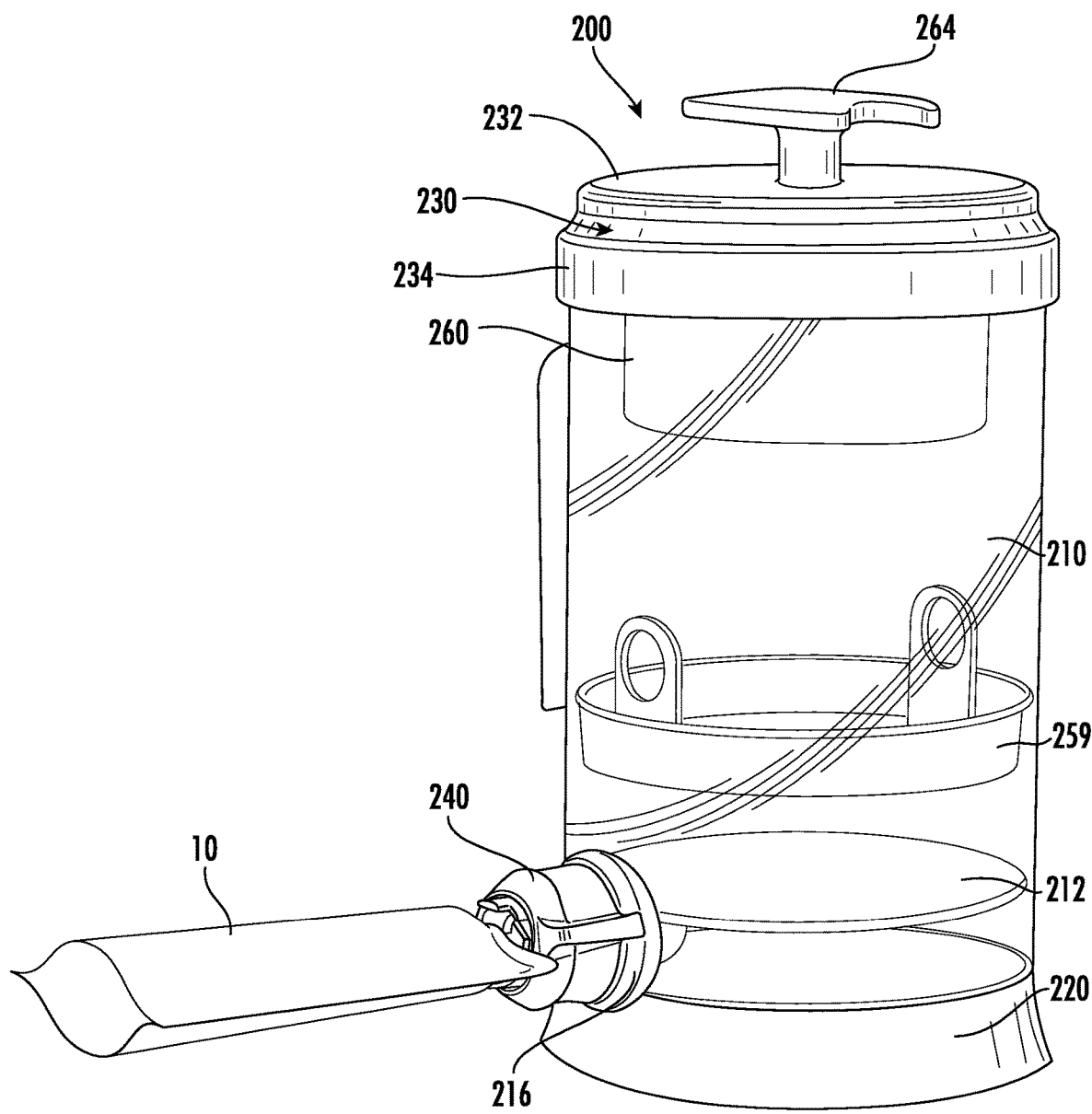
FIG. 7 is a perspective view of another food pouch filling station in accordance with an embodiment of the system of the present invention.
Figure 8C:
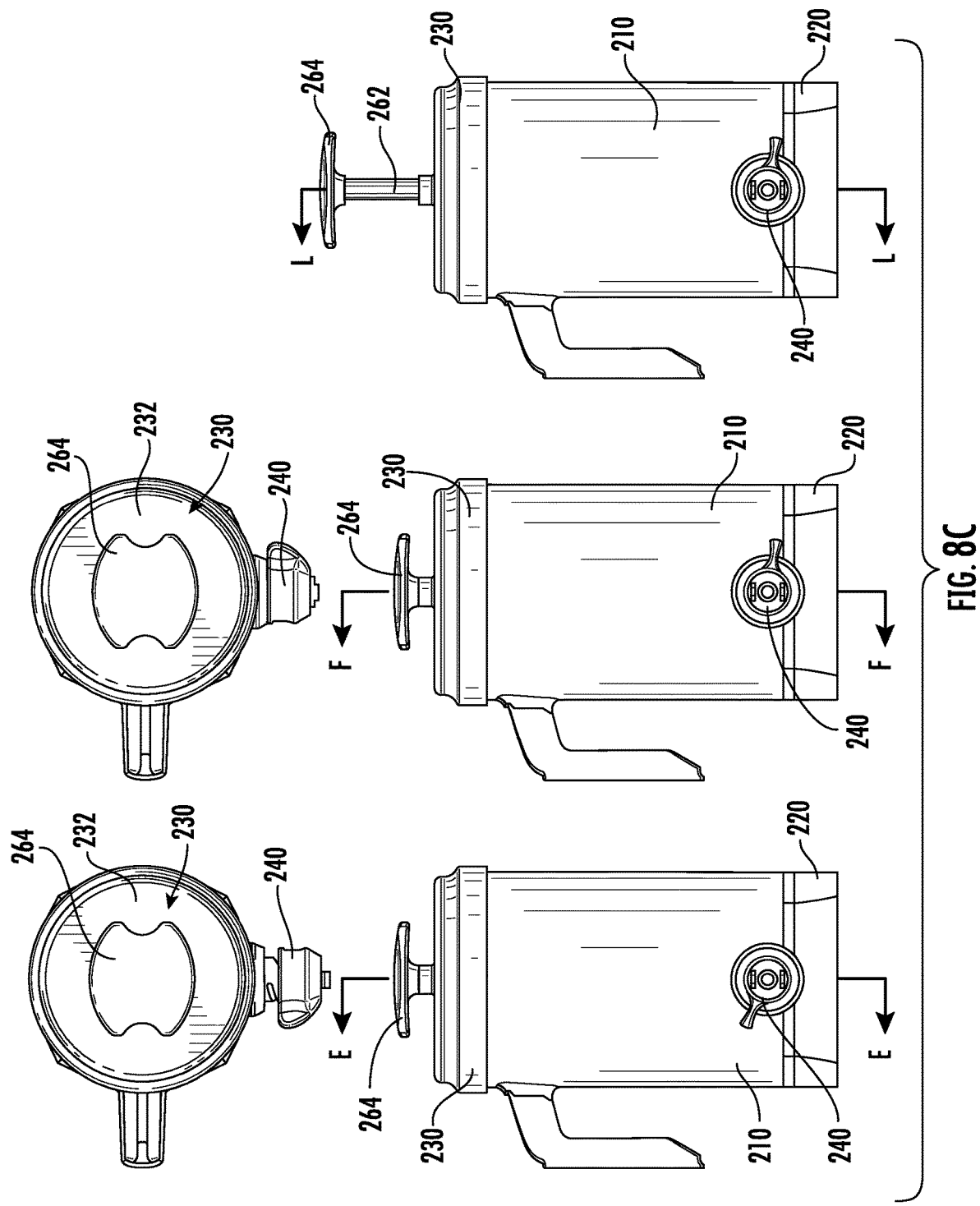

FIGS. 1, 2A-2D, 3, and 4 illustrate a food pouch filling station 100 with a french press plunger 150. Specifically, FIG. 1 illustrates a perspective view of the food pouch filling station 100. FIGS. 1, 2A-2D, 3, and 4 illustrate the food pouch filling station 100 with different embodiments of the french press plunger 150 and various lip seals that would allow for the plunger to slide down the canister walls and adjust as the inner diameter (ID) on the bottom of the canister is smaller than on top. Specifically, FIGS. 2A-2D illustrate an embodiment of the food pouch filling station with a cylinder press, FIG. 3 illustrates an embodiment of the food pouch filling station with a curvaceous rounded square press, and FIG. 4 illustrates an embodiment of the food pouch filling station with an open-elliptical shaft press.

One embodiment of a food pouch filling station 100 includes a canister 110, a suction base 120, a top plate 130, and a plunger 150 with a valve 140 that prevents food from draining out of the canister spout 116. The canister 110 may sit on and attach to the suction base 120. The top plate 130 may fit onto the top of the canister 110. The plunger 150 may extend through the middle of the lid 130. The plunger 150 may be sized to snugly slide into the canister 110 with enough pressure on the side walls 114 of the canister 110 to prevent the contents of the canister 110 from sliding by when the plunger 150 is pressed. The valve 140 may be located on the wall of the canister 110 and be connected to the canister spout 116. The valve 140 may be include an attachable soft valve interface portion 142 designed to match the food pouch 10 specification and dimensions. The food pouch filling station illustrated in FIGS. 1-4 includes a french press plunger concept to hold a shaft 152 of the plunger 150 vertical when a user plunges.

The canister 110 as illustrated in FIGS. 1-4 may include a bottom 112, side walls 114, and a spout 116. The side walls 114 may extend upward from the bottom 112. The side walls 114 may extend with a small draft angle angled inward from the top to the bottom of the canister 110 thereby creating a top-to-bottom internal diameter change. The top-to-bottom diameter change provides an upper internal diameter of the canister 110 larger than a lower internal diameter of the canister 110. The top-to-bottom diameter change of the internal diameter may be around 0.080 inch. Other values of top-to-bottom diameter change may be utilized without departing from this invention. The bottom 112 and side walls 114 may be various different shapes without departing from this invention. For example, as illustrated in FIGS. 1 and 2A-2D, the bottom 112 and side walls 114 may be in a cylindrical or circle shape. As illustrated in FIG. 3, the bottom 112 and side walls 114 may be in a curvaceous rounded shape. As illustrated in FIG. 4, the bottom 112 and side walls 114 may be in an open-elliptical shape. The spout 116 may be located near or adjacent to the bottom 112 of the canister 110 in order to connect to and receive a food pouch 10. The valve 140 may be located within the canister wall 114 and adjacent to the spout 116. Various valve designs 140 will be described in more detail below. Additionally, the bottom 112 may include a trough 118 that leads to the spout 116 at the bottom 112 of the canister 110. As illustrated in FIG. 2A, the canister 110 may also include a straight cylinder vessel or side walls 114 canister may also include a flared bulbous base section to slide onto and connect with the suction base 120. The canister 110 may also include a pour spout 117 and a canister handle 119 without departing from this invention. As further illustrated in FIG. 2C, the pour spout 117 may be a small pour spout above mid-cylinder volume. The canister handle 119 may also include a TPE covered handle that snaps onto a clear plastic handle.

The suction base 120 as illustrated in FIGS. 1-4 may be sized and shaped to sit on a flat surface, such as a table-top or a counter top. The suction base 120 may be plastic or rubber or combination of plastic and rubber or rubber-like materials. For example, the suction base 120 may be made of a silicone or a thermoplastic elastomer (TPE) or other materials without these without departing from this invention. The suction base 120 may slides into the bottom of the canister 110. As illustrated in FIG. 2A, the suction base 120 may include a lower section 122 and an upper section 124. The lower section 122 may provide suction through a lip seal to a flat surface to hold the suction base 120 and the food pouch filling station 100 in place while the user operates and uses the food pouch filling station 100. The upper section 124 may provide the interface for sliding into the canister 110. FIG. 2B illustrates various side views of alternative suction bases 120, with various lids 130 that may be utilized without departing from this invention. As illustrated in FIG. 2C, the suction base may be a fixed molded TPE base with a hidden suction lip seal 126. Additionally, as further illustrated in FIG. 2C, the suction base 120 may include a small tab 123 at the base for access de-suction capacity.

The lid 130 as illustrated in FIGS. 1-4 may include a top plate 132 and a flange 134 extending downward from the top plate 132. The top plate 132 may be sized and shaped to slide with a flange 134 within an internal portion of the side walls 114 of the canister 110. The top plate 132 may be used to stabilize the shaft 152 trajectory. The lid 130 may have a collar underneath to extend the hole through the top plate 132 that the shaft 154 is sliding against to reduce the amount of shaft angle due a larger diameter canister 110.

The plunger 150 as illustrated in FIGS. 1-4 may include a shaft 152 with a handle 154 on one end and a plunger flange 156 on the other end. The plunger flange 156 may include a plurality of flexible ridges to snugly slide into the canister 110 with enough pressure on the side walls 114 of the canister 110 to prevent the contents of the canister 110 from sliding by when the plunger 150 is pressed. The plunger flange 156 may be fine-tuned to facilitate the press action of the contents of the canister 110. FIG. 2A illustrates various alternative handles 154 and top plates 132 that may be utilized without departing from this invention.

FIG. 2B illustrates various other plunger 150 designs without departing from this invention. Plunger 150A illustrates an alternative plunger with a taller plunger flange 156A that helps create stability while plunging downward against the side walls 114 of the canister 110. As illustrated, the plunger flange 156A may also include additional flexible rings to press against the side walls 114 of the canister 110. Plunger 150B illustrates a second alternative plunger with a lever 151B that rotates and pivots to plunge the plunger flange 156B up and down within the canister 110.

FIG. 2D illustrates various canister 110 alternative designs. For example, the canister 110A,B,C,D may include various embossed texture concepts without departing from this invention. Additionally, the canister 110E,F,G may include various color concepts and/or tinted clear plastic embodiments without departing from this invention. Lastly, the canister 110F may include a bump-textured clear plastic embodiment without departing from this invention. Any of these various embodiments for the canister 110 may be utilized in coordination with one another.

The food pouch filling station 100 also includes a valve 140 with three slits. The valve 140 may be plastic or rubber or combination of plastic and rubber or rubber-like materials. For example, the valve 140 may be made of a silicone or a thermoplastic elastomer (TPE) or other materials without these without departing from this invention. The valve 140 may split open when a food pouch 10 is inserted into the food pouch filling station 100. The valve 140 may require a certain force to engage the spout 116 into position thus forcing the valve 140 to split open at the slits. The french press design may be a food pouch filling station 100 to fill food using the same canister design and valve seal design as described further below.

FIG. 3 illustrates an alternate shape and embodiment for the french press design food pouch filling station 100A. The food pouch filling station 100A as illustrated in FIG. 3 includes a curved rounded square shape canister 110, suction base 120, and lid 130. The food pouch filling station 100A as illustrated in FIG. 3 may include a curvilinear top plate 132 and curvilinear base 120. The top plate 132 may also include a flap 132A for dislodging the suction on the canister 110 from the lid 130. The top plate 132 may include a rounded corner square top profile and shaft form. Additionally, the food pouch filling station 100B may include an option for omitting the top plate 132 in exchange for an open-top food pouch filling station 100B.

FIG. 4 illustrates another alternate shape and embodiment for the French press design food pouch filling station 100C. The food pouch filling station 100C as illustrated in FIG. 3 includes an open elliptical shaft concept. For example, the food pouch filling station 100C may include a truncated ellipse shaft for ease of gripping and directing the contents of the canister 110C toward the spout 116C. The food pouch filling station 100C may also include an angled bottom 112C of the canister 110C to direct the contents of the canister 110C downward through the spout 116C. The food pouch filling station 100C may also include a large plastic or angled suction base 120C. Lastly, the food pouch filling station 100C may also include an option for the plunger 150C to ratchet back and forth for incremental siphoning of the contents of the canister 110C through the spout 116C.

Air Pump Food Pump Filling Station

Figure 10:
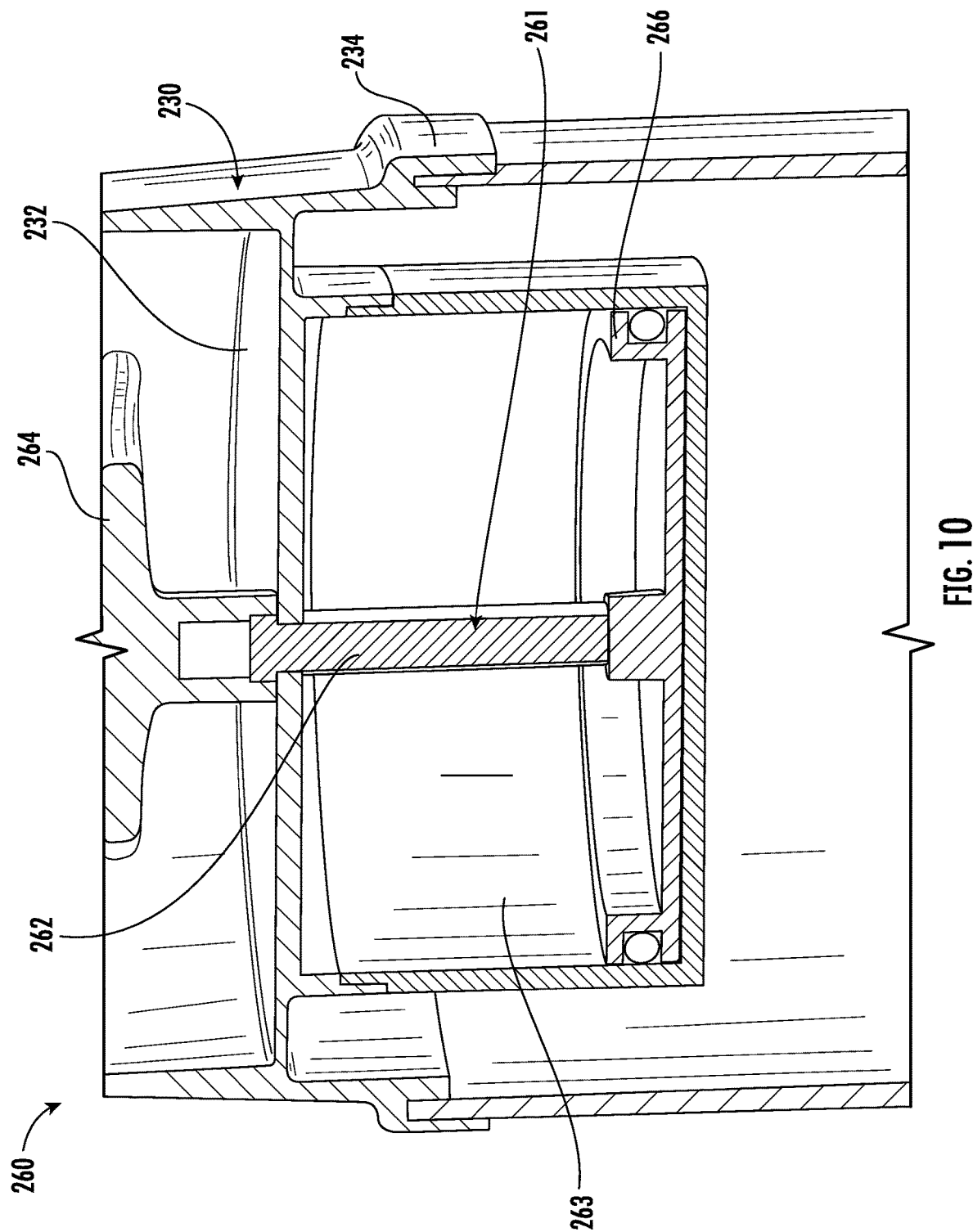
Figure 11:
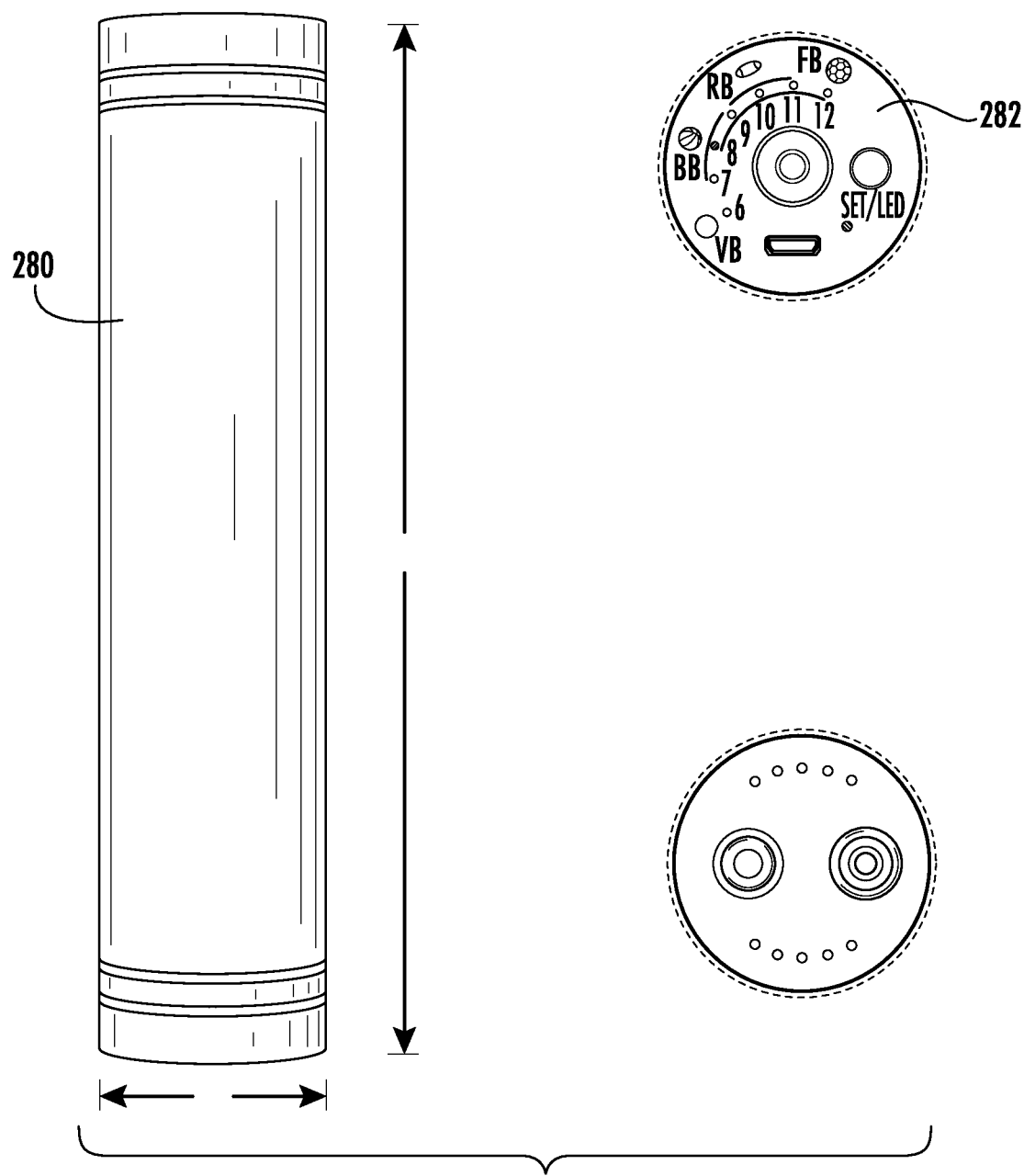
FIG. 11 include various views of an example motor assembly for a food pouch filling station in accordance with an embodiment of the system of the present invention.

FIGS. 5A-5D, 6A-6D, 7, and 8A-8D illustrate different embodiments of a food pouch filling station 200 that utilizes an air pump system 260. In another embodiment, the food pump filling station 200 may not have a hand plunger and may include an air pump fill system 260. The air pump fill concept may be similar to a spray bottle that you pump to pressurize the tank and then can spray the liquid. By pressurizing the chamber, the fluid releases when the valve is opened. Therefore, the valve and the canister lid must hold pressure above ambient. The more a user pumps, the more pressure is built up. In one exemplary embodiment, the food pouch filling station 200 may include a semi-automatic method that creates pumping a set number of times and then fills a set number of pouches 10 without having to pump again as the chamber releases its air pressure and goes back to ambient pressure. For example, the semi-automatic method may create pumping four times and then fills three pouches 10 without having to pump again as the chamber releases its air pressure and goes back to ambient pressure. In another example, the semi-automatic method may create pumping in a one-to-one ratio, such as pumping four times and then filling four pouches 10 without having to pump again as the chamber releases its air pressure and goes back to ambient pressure. Any number of pump-to-fill ratios may be utilized with the semi-automatic method without departing from this invention. The air pump system 260 may include a canister 210 and piston design as illustrated in FIGS. 9 and 10. FIG. 11 illustrates an electric automatic pump design of the food pouch filling station 200. FIGS. 12-24 illustrate and detail embodiments of various valve designs that may be used with the food pouch filling station 200 or the food pouch filling station 100.

For the embodiments of FIGS. 5A-24, the features are referred to using similar reference numerals under the "2xx" series of reference numerals, rather than "1xx" as used in the embodiment of FIGS. 1-4. Accordingly, certain features of the food pouch filling station 200 that were already described above with respect to the food pouch filling station 100 of FIGS. 1-4 may be described in lesser detail, or may not be described at all.

The food pouch filling station 200 includes a canister 210, a base 220, a lid 230, an air pump system 260, and a valve assembly 240. The canister 210 may sit on and attach to the suction base 220. The lid 230 and the air pump system 260 may fit onto the top of the canister 210. The air pump system 260 may be included with the lid 230. The valve 240 may be located on the wall of the canister 210 and may connect to the pouch spout 12.

The canister 210 as illustrated in FIGS. 5A-10 may include a bottom 212, side walls 214, and a canister spout 216. The side walls 214 may extend upward from the bottom 212. The side walls 214 may extend with a small draft angle angled inward from the top to the bottom of the canister 210 thereby creating a top-to-bottom internal diameter change. The top-to-bottom diameter change provides an upper internal diameter of the canister 210 larger than a lower internal diameter of the canister 210. The top-to-bottom diameter change of the internal diameter may be around 0.080 inch. Other values of top-to-bottom diameter change may be utilized without departing from this invention. The bottom 212 and side walls 214 may be various different shapes without departing from this invention. The canister spout 216 may be located near or adjacent to the bottom 212 of the canister 210 in order to connect to and receive a food pouch 10. The bottom 212 may also include a trough 218 to help feed the contents of the canister 210 to the canister spout 216. The valve 240 may be located adjacent with the canister wall 214 and adjacent to the canister spout 216. The canister 210 may also include a straight cylinder vessel or side walls 214 and may slide onto and connect with the base 220. The canister 210 may also include a pour spout 217 and a canister handle 219 without departing from this invention. Further, the base 220 may be sized and shaped to sit on a flat surface, such as a table-top or a counter top. The lid 230 may include a top plate 232 and a flange 234 extending downward from the top plate 232. The top plate 232 may be sized and shaped to slide with the flange 234 within an internal diameter or outer diameter of the side walls 214 of the canister 210. The top plate 232 may be used to stabilize the pump shaft 262 trajectory.

The embodiments illustrated in FIGS. 5A-10 includes a sealing system 270 to connect the pouch spout 12 to the canister spout 216. In order to eliminate the extra force required to insert and hold the pouch spout 12 in place, the sealing system 270 may pull the pouch spout 12 into place and seal the pouch spout 12 against an inside of the valve shaft 242. One example includes a membrane 272 that seals with slits 274 that would open when the pouch spout 12 was pressed inwards engaging the valve 240 and opening the slits 274. Another example is a valve slit 274 that opens when there is pressure, the slits 274 break the seal and fill the pouch. The membrane 272 and/or valve slit 274 may be plastic or rubber or combination of plastic and rubber or rubber-like materials. For example, the membrane 272 and/or valve slit 274 may be made of a silicone or a thermoplastic elastomer (TPE) or other materials without these without departing from this invention.

Components—Air Pump System

The air pump system 260 of the food pouch filling station 200 may include a one-way pump 261, a pump housing 263, and one or more button seals 268 located at the bottom of the pump housing 263. The pump housing 263 may be attached to or connected to a bottom-side or underside of the lid 230. For example, the pump housing 263 may be screwed onto the bottom-side of the lid 230 without departing from this invention. Other methods of connecting the pump housing 263 to the lid 230 may be utilized, such as snap-fit, molded, quarter-turn, etc. A seal may be utilized between the pump housing 263 and lid 230 connection. The one or more button seals 268 may act as one-way check valves from the pump housing 263 to the canister 210, preventing air from escaping from the canister 210 when a user pulls up on the pump 261. The pump 261 may include a pump shaft 262 with a handle 264 located at one end and a pump flange 266 located at the opposite end. When the canister 210 is pressurized, the pressure pushes against these valve seals 268 preventing the high pressure from escaping from the canister 210. The canister lid 230 may also have a seal 263A on the pump housing 263 and the canister 210 so that there is an air-tight chamber.

The air pump system 260 may also include a lip seal disk 259 that would sit on top of the contents of the canister 210. The lip seal disk 259 may be plastic or rubber or combination of plastic and rubber or rubber-like materials. For example, the lip seal disk 259 may be made of a silicone or a thermoplastic elastomer (TPE) or other materials without these without departing from this invention. The lip seal disk 259 may ensure there is an even distribution of air pressure on the contents of the canister 210 so that when there is a low volume of contents within the canister 210, the air does not bypass the contents of the canister 210 with air filling into the pouch 10. The lip seal disk 259 will also ensure that all the contents of the canister 210 off the side walls 214 of the canister 210 and what is remaining on the bottom of the canister 210 when the canister 210 is almost empty are dispensed into the pouch 10.

The air pump system 260 may also include an automatic pump system, which replaces the air pump lid with a lid with a pump motor that is electronically powered. For example, the pump motor may include a pressure sensor which stops filling at a certain pressure. The automatic pump system may include this top lid with preconfigured or configurable settings such that the pump would be told to maintain a specific pressure inside the canister chamber. When a pouch 10 is inserted and the valve 240 is turned on, the pouch 10 would fill. The canister 210 would then simultaneously lose X ounces of air and the pressure within the canister 210 would drop. With an automatic pump system, the pump 260 would then automatically turn on and pressurize the canister 210 to maintain the preset pressure.

As illustrated in FIG. 11, another embodiment of the invention may include an electric automatic pump design. The food pouch filling station 200 may include an electric pump 280 to mate with the canister 210 to generate pressure and volume of air in a specified amount of time. The electric pump 280 may fit in the canister lid 230 replacing the hand air pump lid. Additionally, a display panel 282 may control the electric pump 280 that would maintain a certain air pressure and/or be designed to pump a certain amount of fluid ounces based on a pouch size or customer preference of how many ounces the want to serve for their child. The electric automatic pump 280 may also have an intelligent pressure detection and stop function.

Components—Valve Designs

FIGS. 12-33 illustrate and detail embodiments of various valve designs 240 that may be used with the food pouch filling station 200. Any of the various valve designs 240 may be used with any of the food pouch filling stations 200 disclosed or described. Also, the various valve designs 240 may be used with any pouch filling station without departing from this invention. The valve 240 may include a valve shaft 242. The valve 240 may be a plastic valve assembly that includes inserting the pouch spout 12 and with an interference around an outside surface of the pouch spout 12 and an inside surface of the valve 240. The inside surface of the valve shaft 242 may include a slight taper such that when the pouch spout 12 is pushed into the valve 240, the taper creates a radial seal. This may eliminate a silicone rubber seal in this location between pouch spout 12 and inside the valve 240. Another example for sealing the valve 240 with the canister spout 216 may utilize O-rings with the seal on the inside surface of the canister spout 216.

Figure 12:
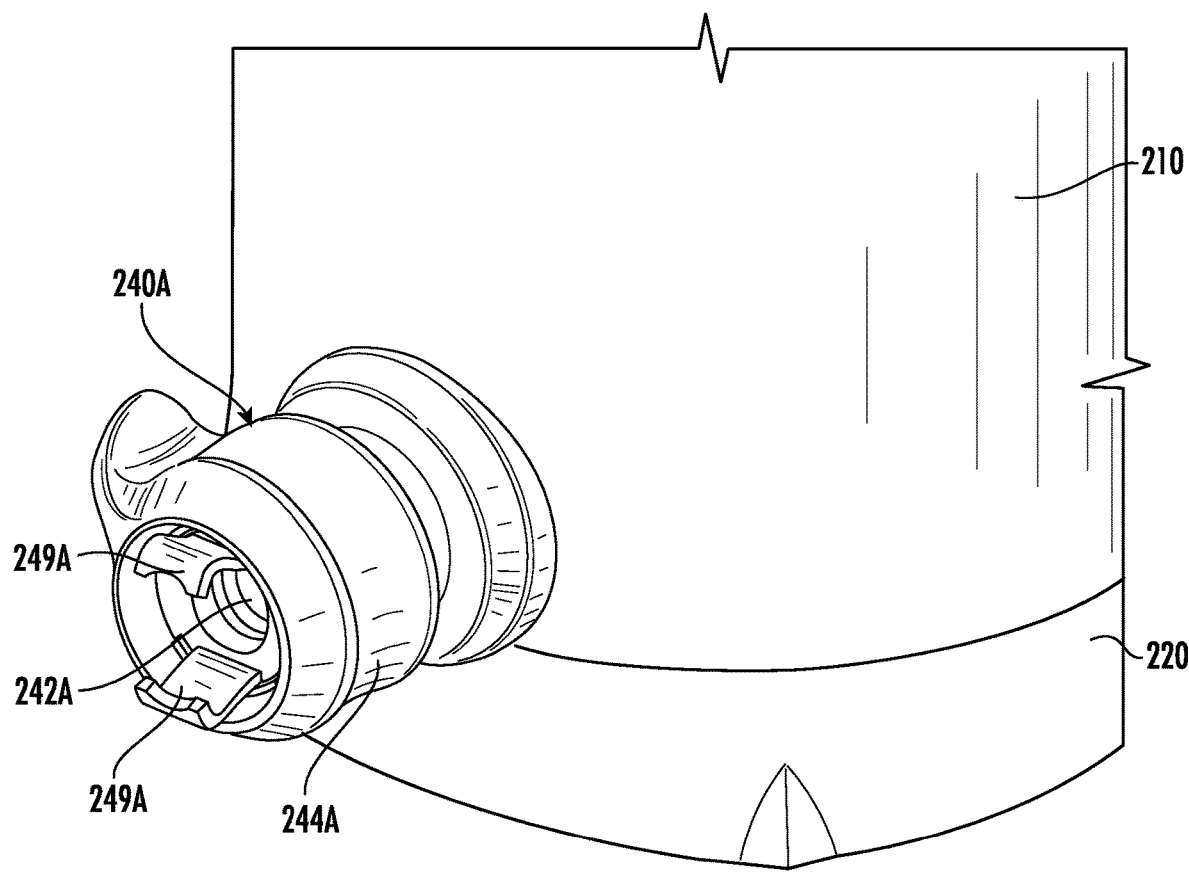
Figure 13:
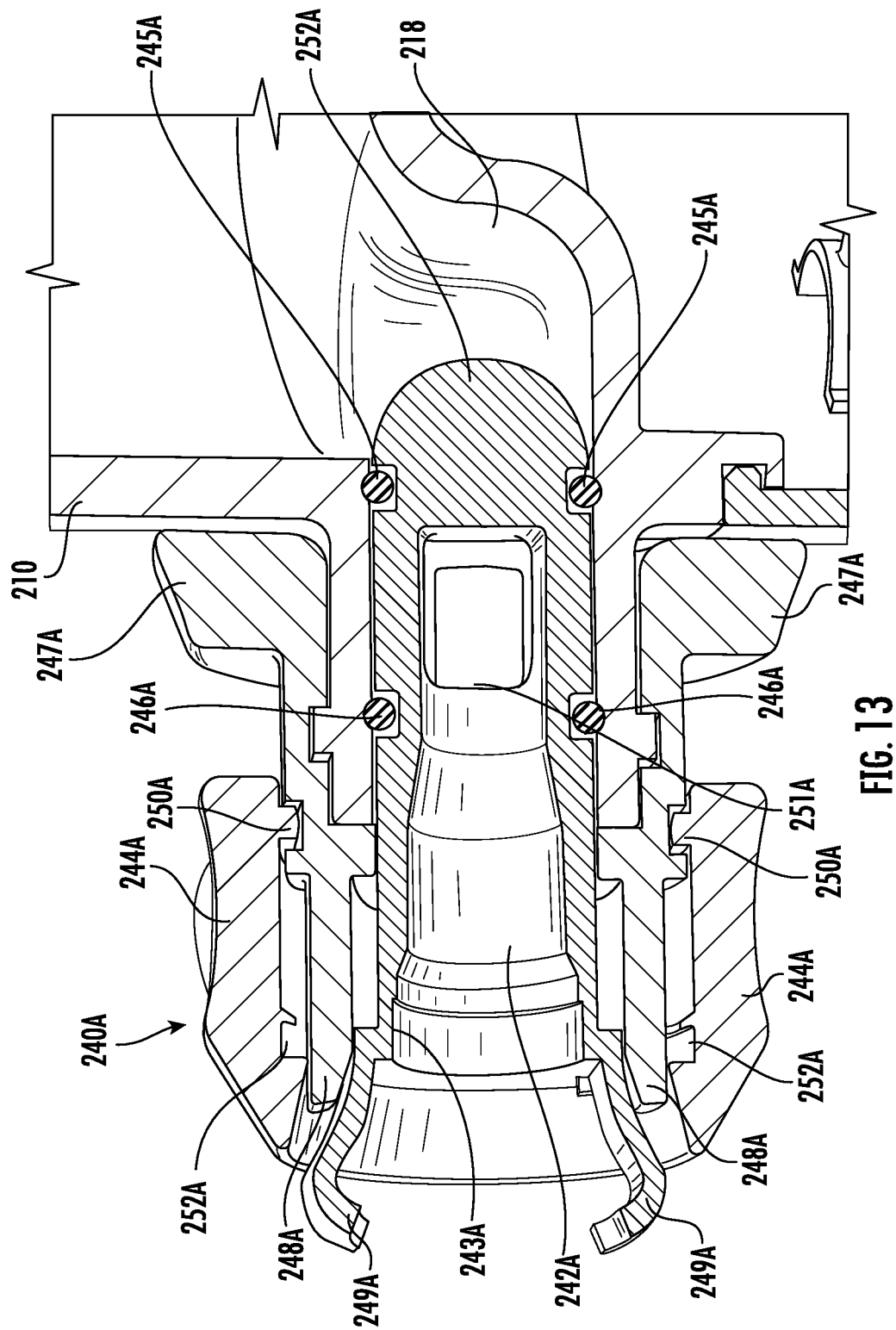
Figure 14:
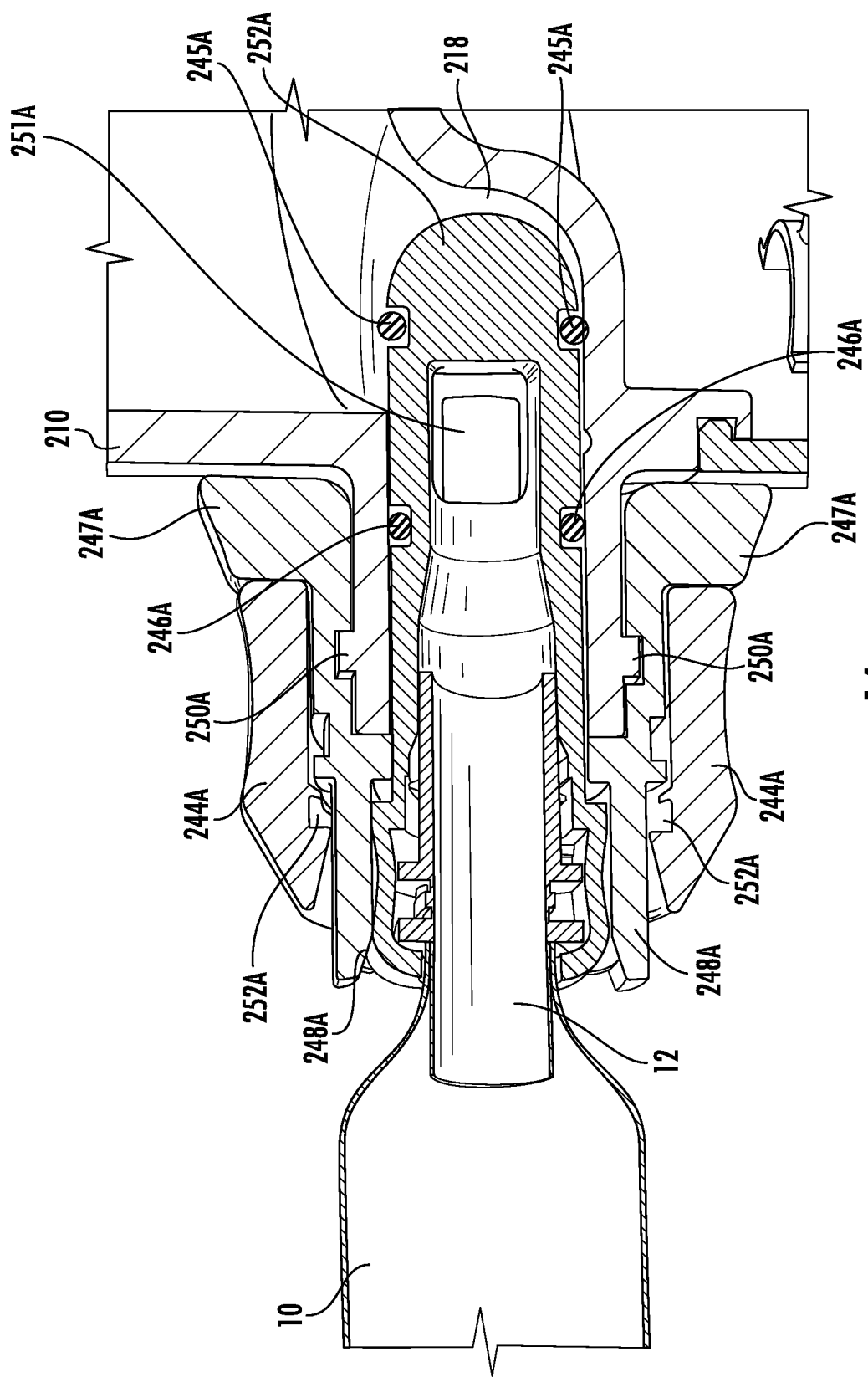

FIGS. 12-15 illustrate a dial-clamp valve 240A for use with the food pouch filling station 200. Specifically, FIG. 12 illustrates the dial-clamp valve system 240A in a closed position. FIG. 13 illustrates a cross-section of the dial-clamp valve system 240A in a closed position. FIG. 14 illustrates a cross-section of the dial-clamp valve system 240A in an open position with the valve door port 251A open to the canister 210. FIG. 15 illustrates the dial-claim valve system 240A in an open position with a pouch 12 attached. The dial-clamp valve system 240A may include radial seals.

As specifically illustrated in FIGS. 13 and 14, the dial-clamp valve 240A may include a valve shaft 242A. The valve shaft 242A may include a slightly tapered internal surface 243A that allows the pouch spout 12 to seal radially on an outside diameter of the pouch spout 12. The valve shaft 242A may also include a first O-ring 245A and a second O-ring 246A. The first O-ring 245A may seal the contents of the canister 210 from the dial-clamp valve 240A and the canister spout 216 when the dial-clamp valve 240A is closed. The second O-ring 246A may seal the contents of canister 210 when the dial-clamp valve 240A is open. The valve shaft 242A may also include a port 251A. When the dial-clamp valve 240A is in the open position, the port 251A allows the contents of the canister 210 to travel through the port 251A into the valve shaft 242A and into the pouch spout 12. The valve shaft 242A may also include a rounded end 252A located within the canister 210 that is designed to push the contents of the canister 210 in the trough 218 out of the way when the dial-clamp valve 240A is opened.

Additionally, as illustrated in FIGS. 12-15, the dial-clamp valve 240A may include a dial 244A. The valve shaft 242 may be connected to the turning dial-clamp valve 240A by snapping the valve shaft 242 over a groove 252A on the inside of the dial 244A. The dial valve 240A may also include one or more pins 250A on the inside that assembles onto the spout connectors 247A. The one or more pins 250A may track on the spout connector 247A. The spout connector 247A may have a radial groove with a pitch so that when a user turns the dial 244A, the radial groove moves the dial 244A and dial-clamp valve 240A forward. The spout connector 247A may also have two legs 248A protruding out which are used to bend the two clamps 249A on the valve shaft 242A inwards. When the dial 244A is turned, the clamps 249A get squeezed inwards and clamp down to secure the pouch spout 12 air-tight in position. The clamps 249A may pull and secure the pouch spout 12. This dial or turning motion also pulls the pouch spout 12 inward to ensure a tight seal and reduce the need for the user to use any force to push the pouch 10 inward toward the food pouch filling station 200. For example, the user may put the pouch 10 in place and turn the dial 244A to allow the dial 244A and clamps 249A to pull and secure the pouch 10 while simultaneously moving the dial-clamp valve 240A to an open position exposing the port to the inner diameter of the canister 210 and allowing for a rapid fill of the pouch 10.

In order to open the door, the door must in a linear motion along the axis of the pouch spout 12. One example may be a cam-style clamp, such that the pouch spout 12 moves inwards by locking into the channels on the pouch spout 12 and that same motion would also open the valve 240A. This action may require the use of minimal force to insert the pouch spout 12 in place and let the camming motion do the work in pushing the pouch spout 12 and valve 240A inwards to seal the pouch spout 12 to the valve 240A and simultaneously open the door all in one process.

One example for sealing the valve 240A with the canister spout 216 may utilize a plastic door that seals in the inside surface of an inner diameter of the canister 210, such that a face seal is molded that would seat against the inside surface of the canister 210.

The dial-clamp valve 240A will need to be cleaned, such that there is a least amount of parts to reduce the number of food trap points. By having the seals on the valve shaft 242A, the dial-clamp valve 240A (dial 244A and valve shaft assembly 242A) may be pulled out. The dial-clamp valve 240A components may be made out of plastic or at least a majority of plastic. The dial 244A and the spout connector may be made of another material, such as metal or a combination. The valve shaft 242A may be made of plastic because the clamps 249A need to bend repeatedly over thousands of cycles.

Figure 16A:
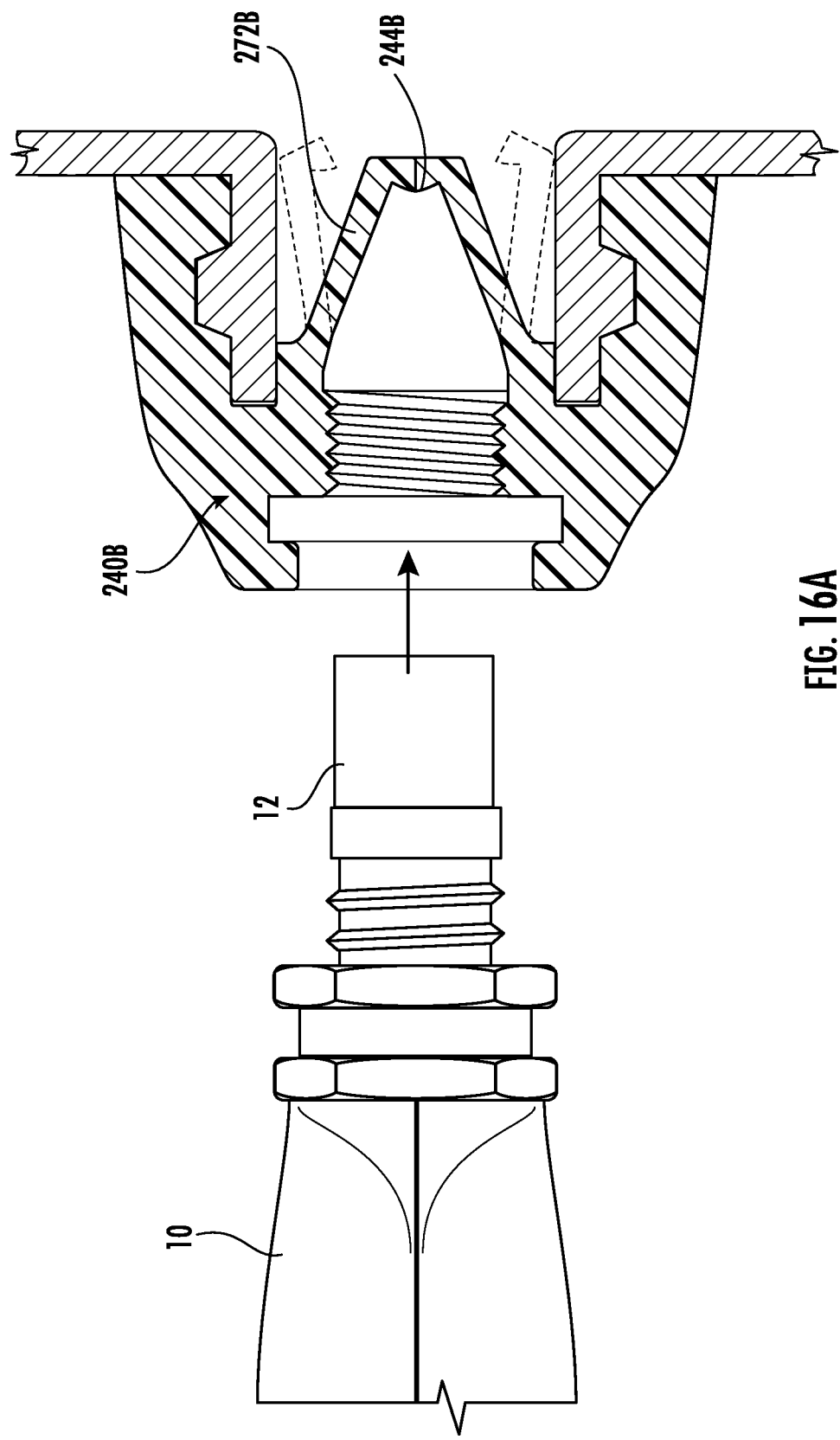
FIGS. 16A and 16B include various views of components of a food pouch filling station in accordance with an embodiment of the system of the present invention.
Figure 16B:
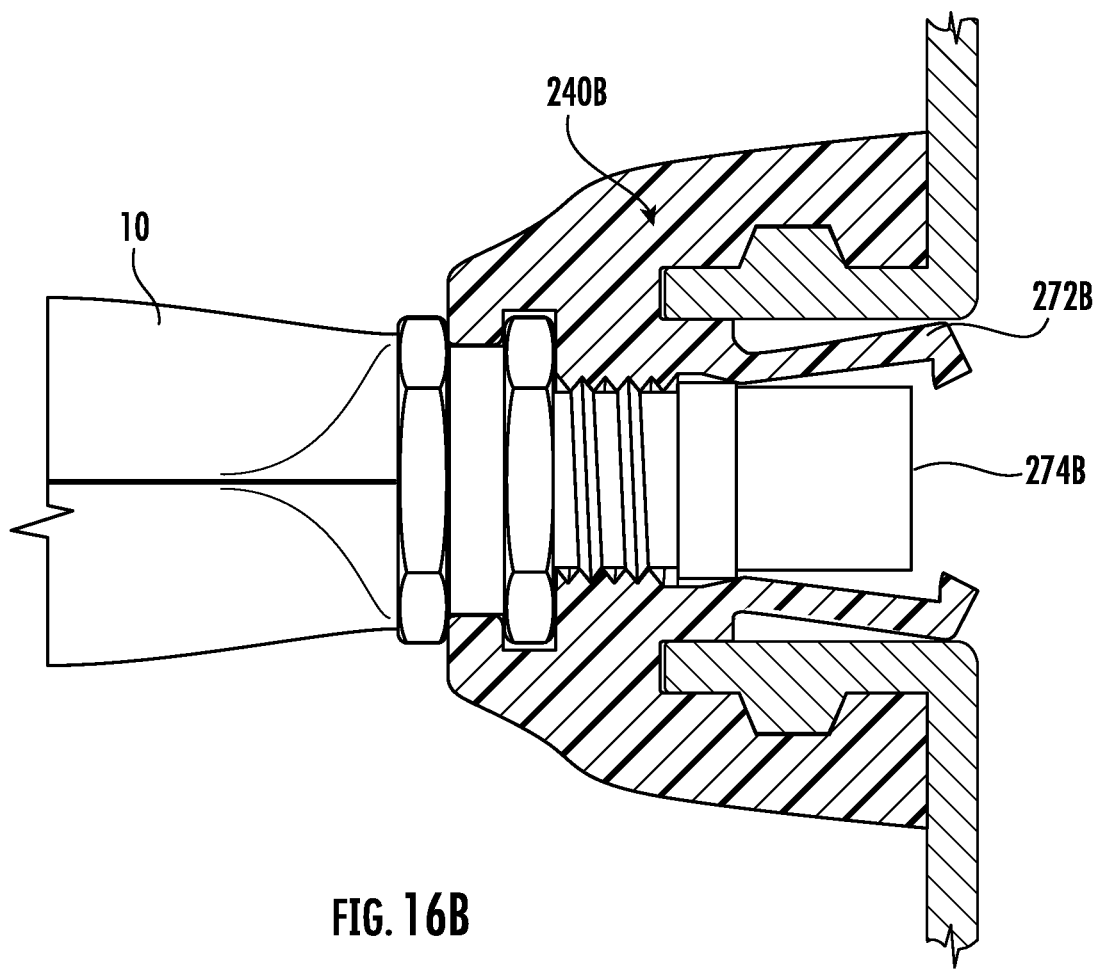
Figure 17A:
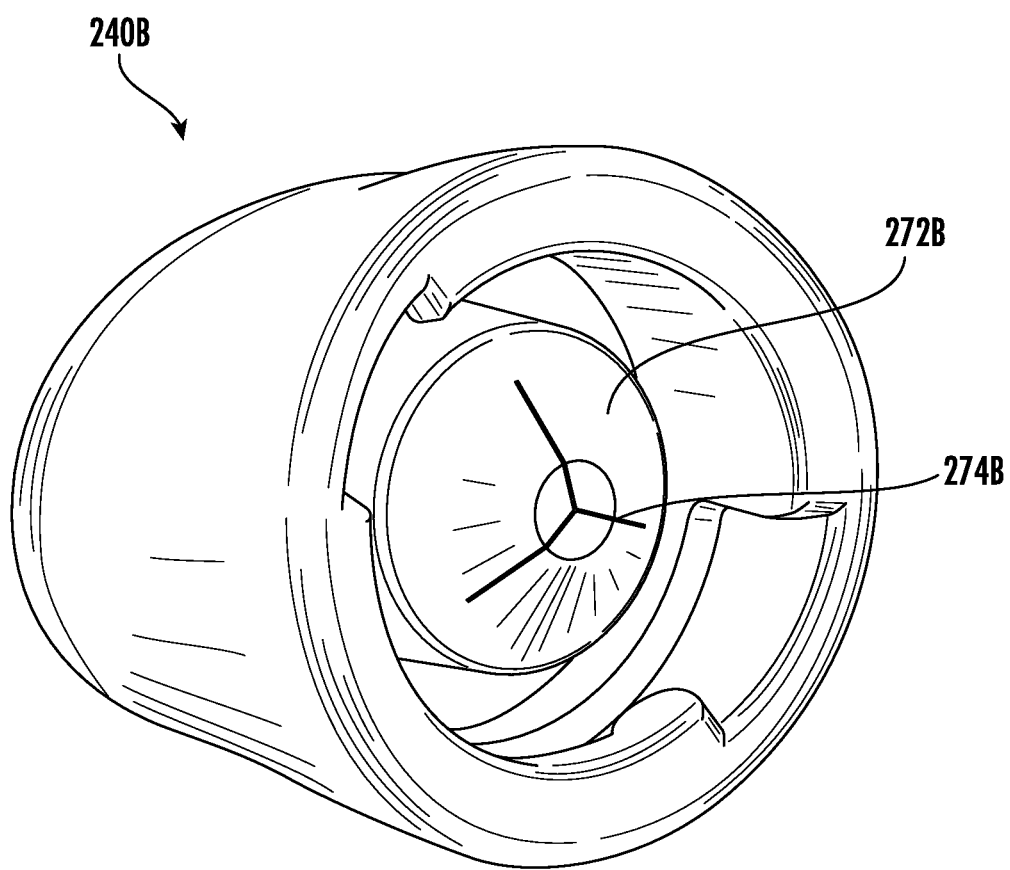
FIGS. 17A-17C include various views of components of a food pouch filling station in accordance with an embodiment of the system of the present invention.
Figure 17B:
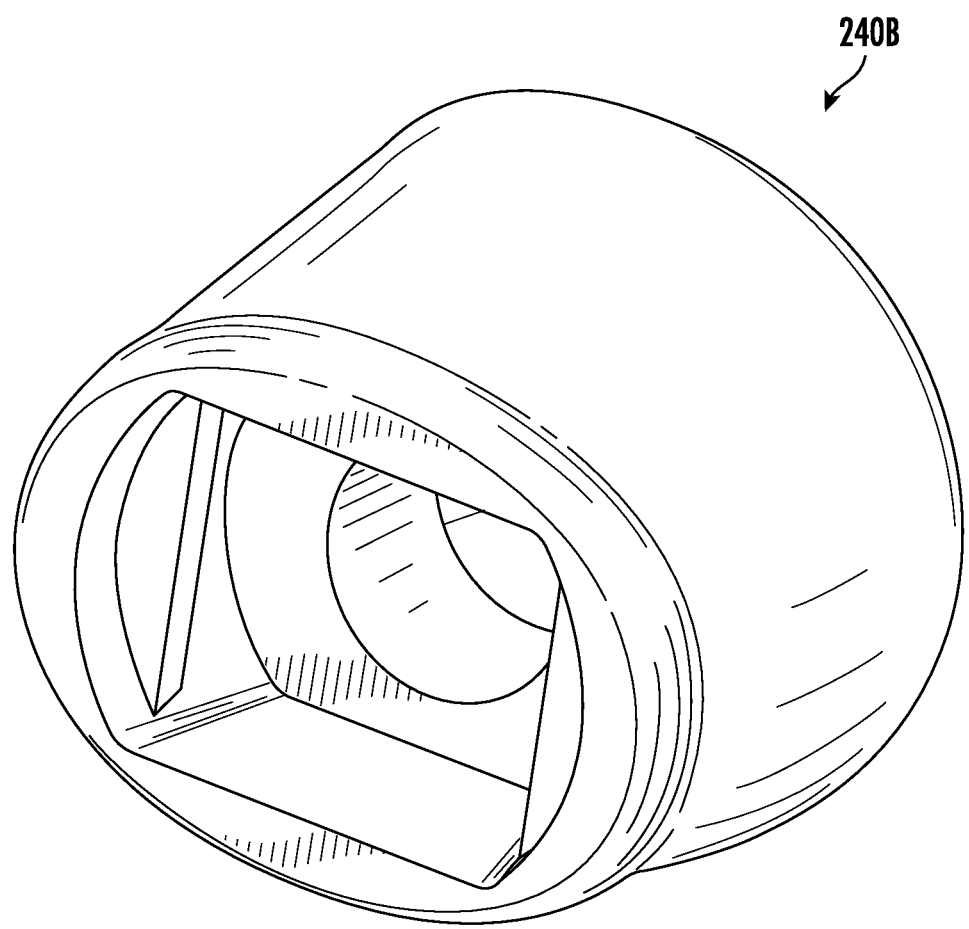
Figure 17C:
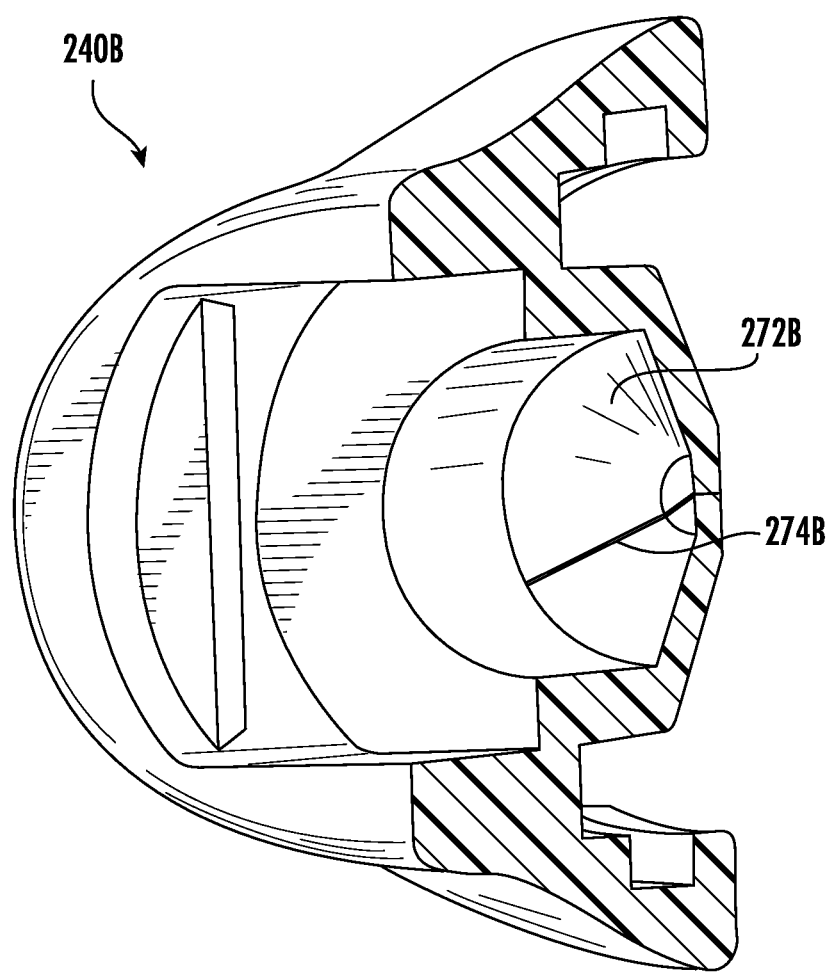

In another embodiment, a cone valve seal 240B may be utilized and as illustrated in FIGS. 16A-16B and 17A-17C. The cone valve seal 240B may include a valve seal and a manual push spout to open valve. The cone valve seal 240B and valve seal may be plastic or rubber or combination of plastic and rubber or rubber-like materials. For example, the cone valve seal 240B and valve seal may be made of a silicone or a thermoplastic elastomer (TPE) or other materials without these without departing from this invention. FIGS. 16A and 16B illustrate the cone valve seal 240B with a valve seal with a manual push spout on the pouch 10 to open the cone valve seal 240B. FIG. 17A illustrates a front perspective view of the cone valve seal 240B. FIG. 17B illustrates a rear perspective view of the cone valve seal 240B. FIG. 17C illustrates a cross-sectional view of the cone valve seal 240B.

Figure 18:
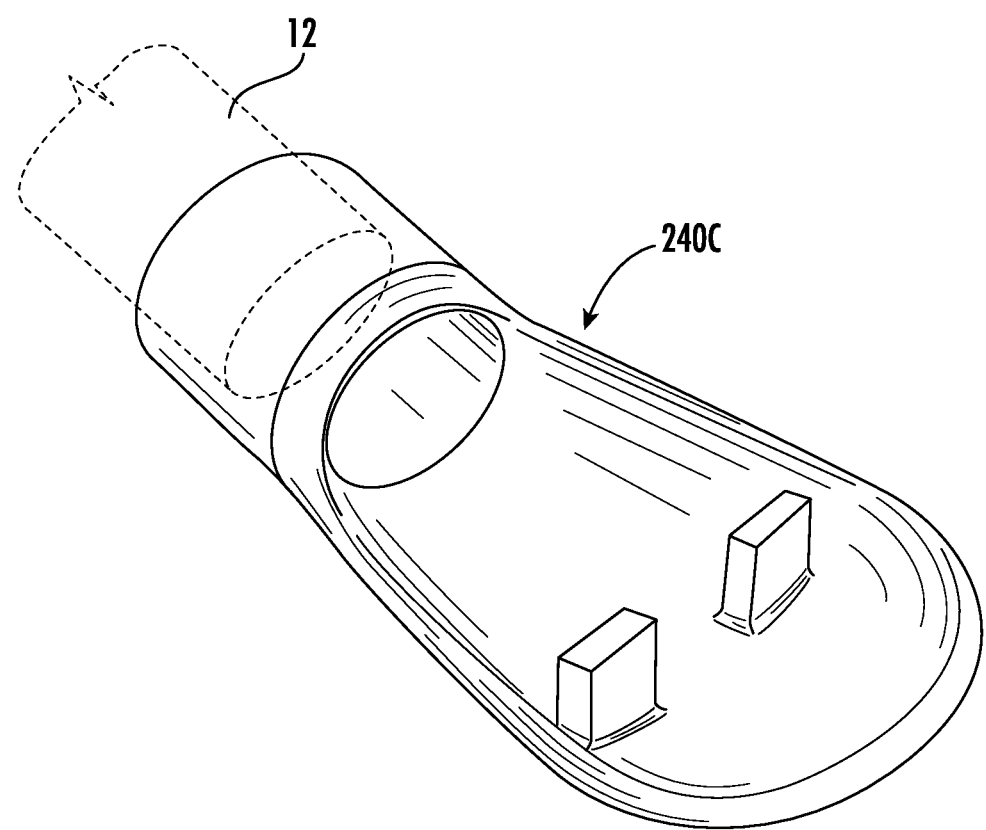
FIG. 18 includes a view of components of a food pouch filling station in accordance with an embodiment of the system of the present invention.

FIG. 18 illustrates an exemplary spout concept 240C that may be used with this invention. As illustrated in FIG. 18, a barrel spout with a half-turn screw and lock design. The spout concept 240C includes a drop and secure pouch boot design with an air-tight boot seal. Additionally, the exemplary spout concept may include silicon teeth to secure the pouch 10 and a trough design to hold spills.

Figure 19:
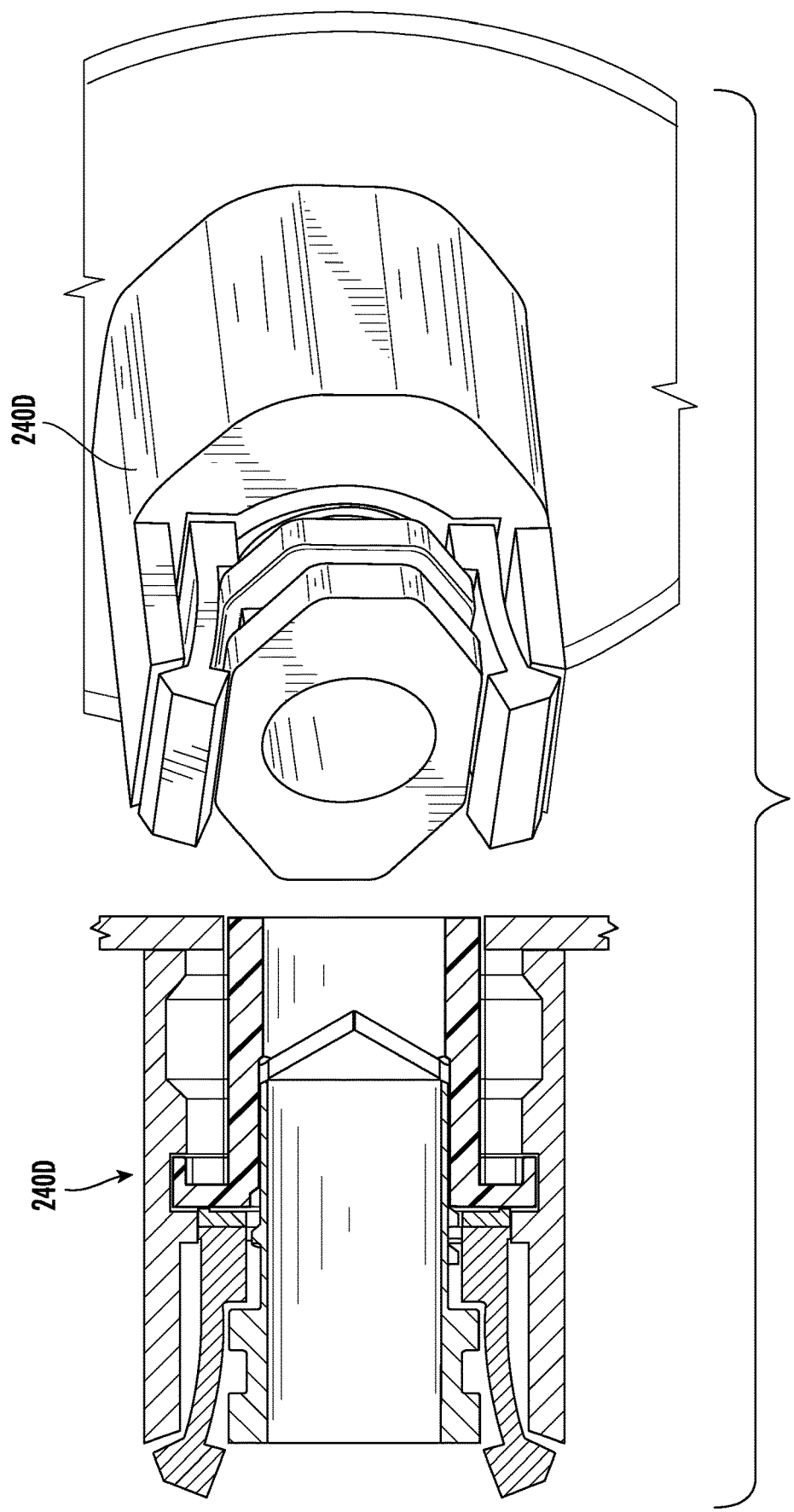
FIGS. 19-23 include various views of components of a food pouch filling station in accordance with an embodiment of the system of the present invention.
Figure 20:
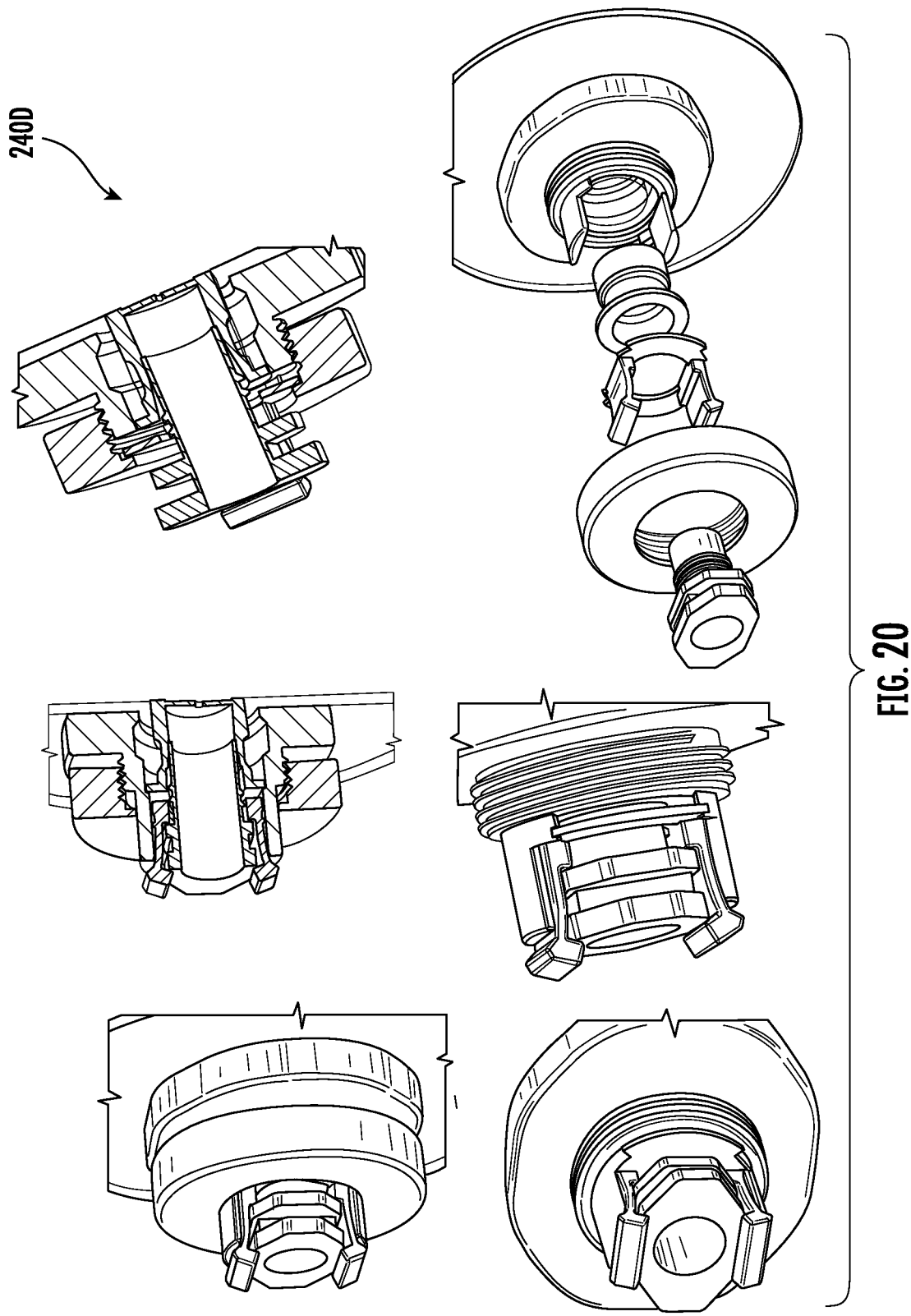
Figure 21:
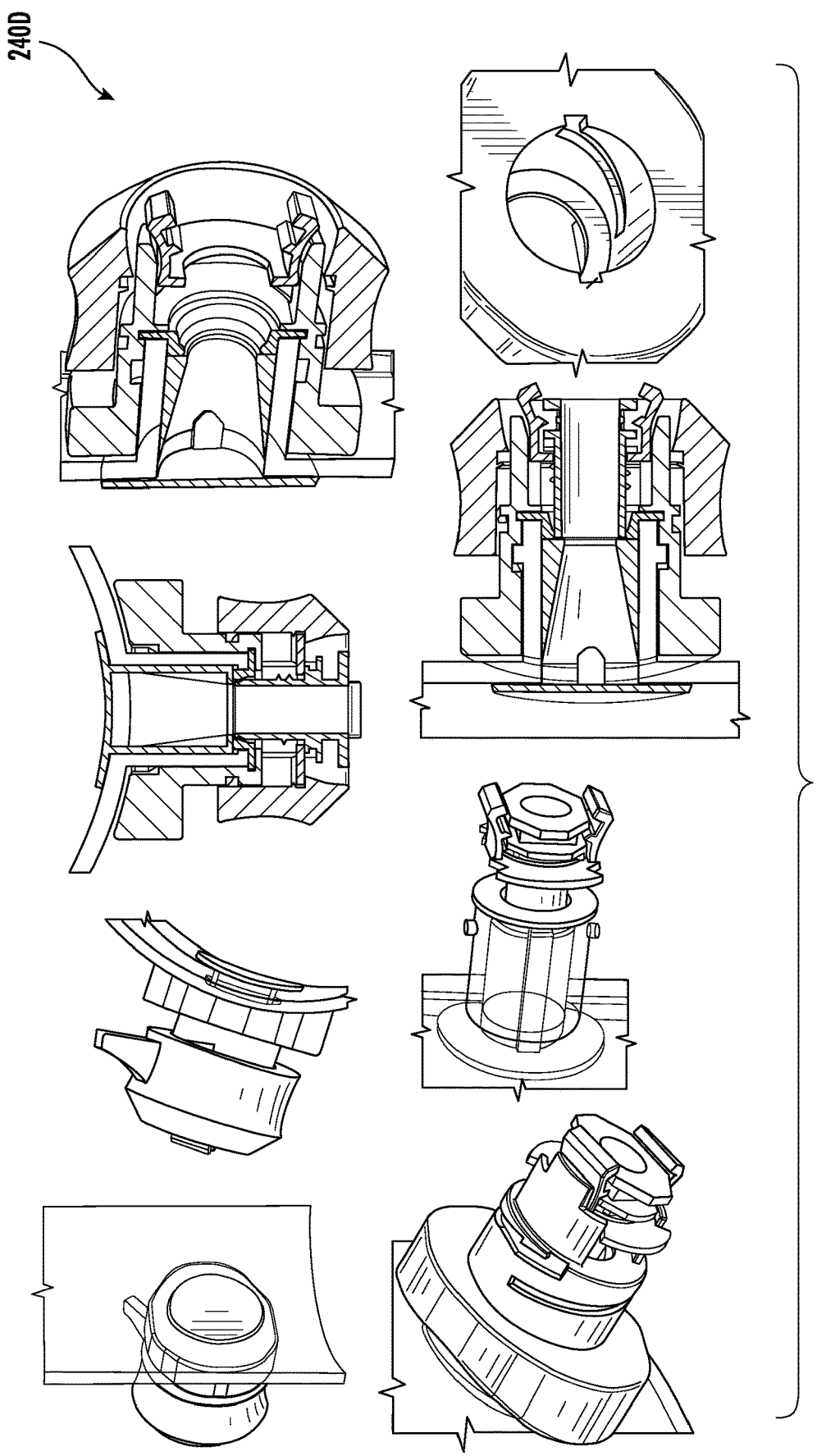
Figure 22:
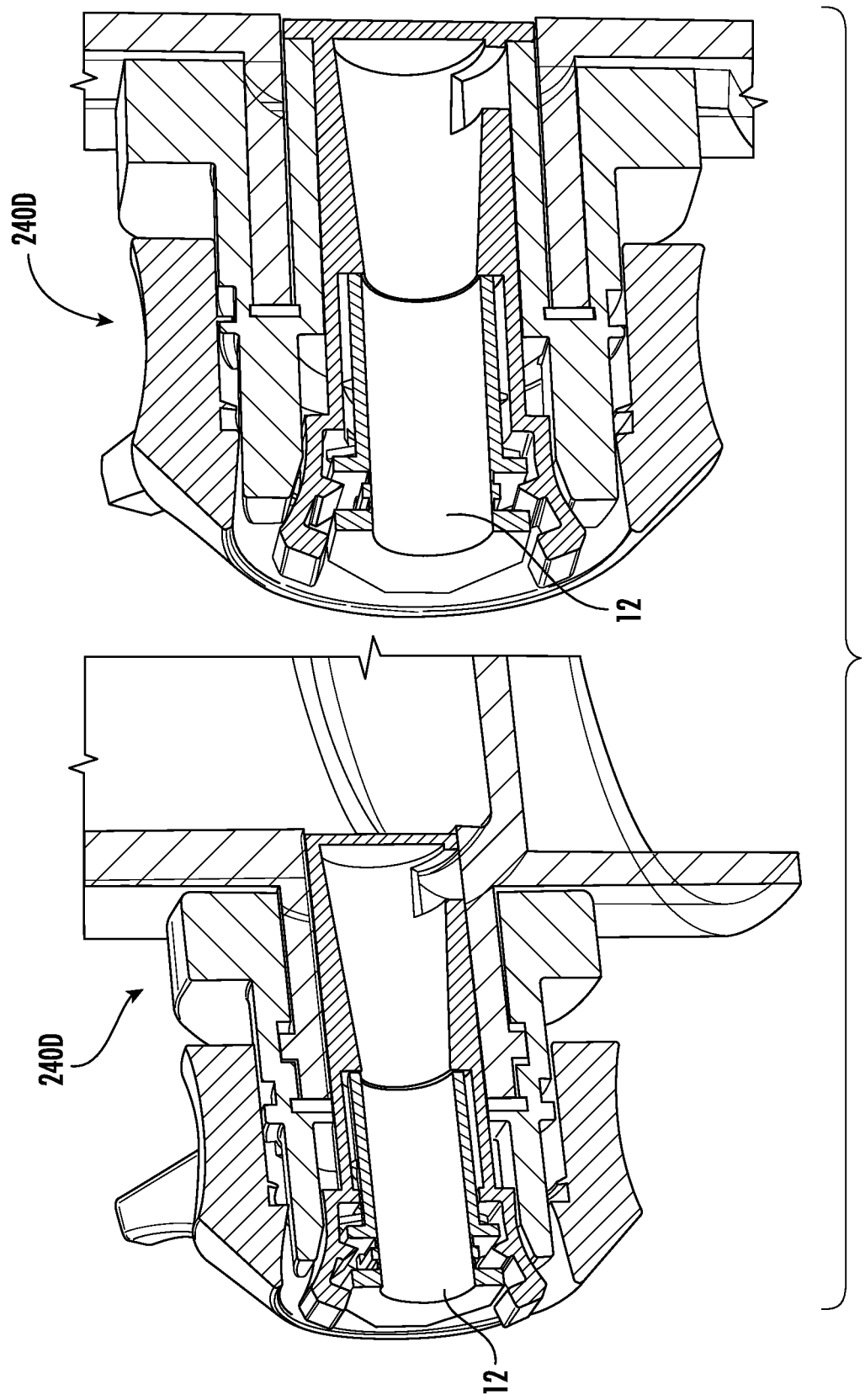
Figure 23:
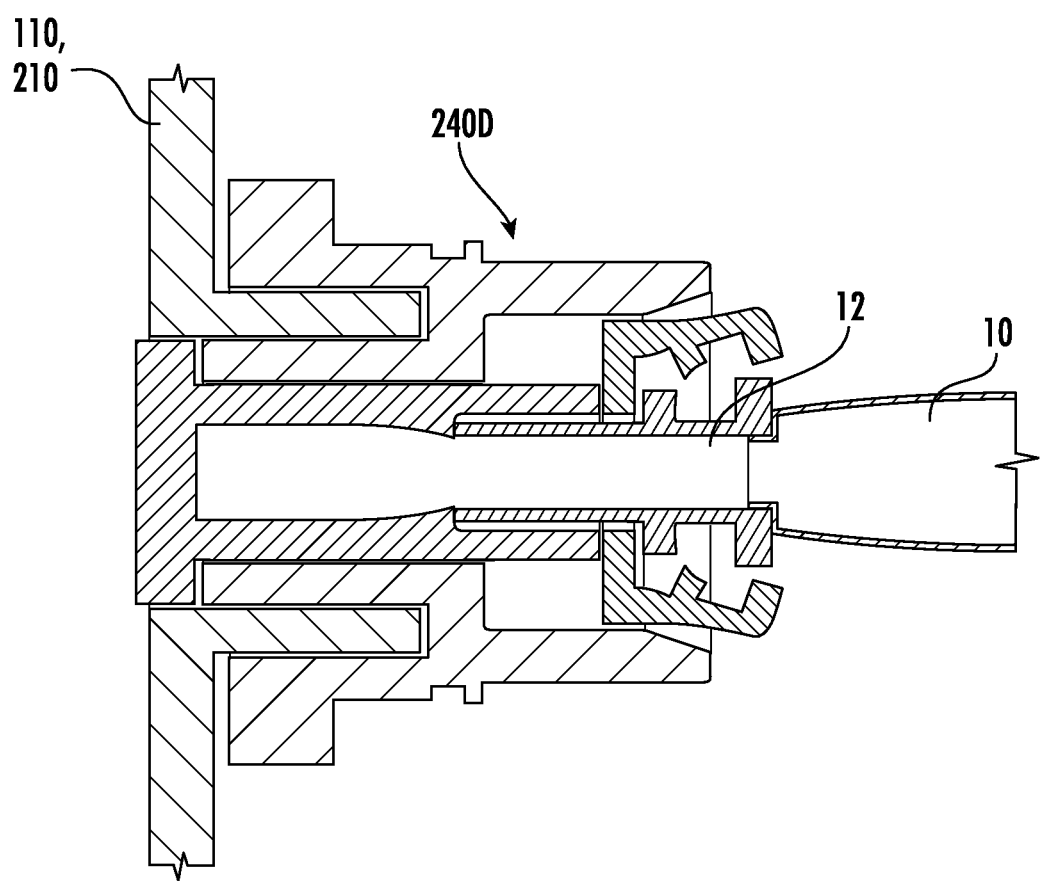

In another embodiment a dial clamp with a cone valve 240D opens by forcing the spout through the valve slits, as illustrated in FIGS. 19-23. The dial clamp with cone valve 240D may be plastic or rubber or combination of plastic and rubber or rubber-like materials. For example, the dial clamp with cone valve 240D may be made of a silicone or a thermoplastic elastomer (TPE) or other materials without these without departing from this invention. FIG. 19 specifically illustrates a dial clamp with the valve 240D that opens by forcing the spout 12 through the valve slits. FIG. 20 specifically illustrates a dial clamp with a seal containing slits that break under pressure when pressurizing the canister 110, 210 or using a plunger 150. FIG. 21 specifically illustrates a dial clamp with the face seal door sealing on the inside of the canister 110 surface. In another example, the dial-clamp valve system 240D may include a door-face seal concept as illustrated in FIGS. 22 and 23. Additionally, the seal may be in different locations in order to seal the pouch spout 12 to the dial-clamp valve 240D.

Figure 24:
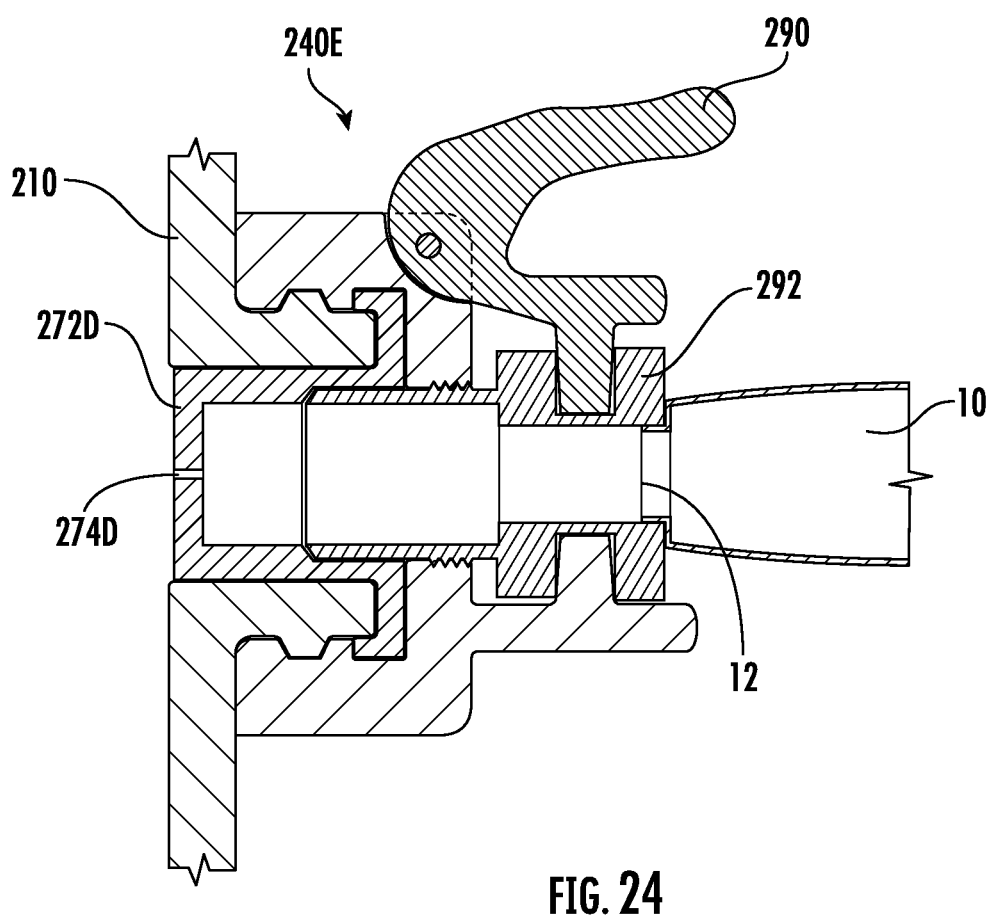
FIG. 24 includes a view of components of a food pouch filling station in accordance with an embodiment of the system of the present invention.

FIG. 24 illustrates an exemplary lever valve 240E concept that may be used with this invention. The lever valve 240D may include a lever 290 and a locking collar 292 that hold the pouch 10 to the canister 210. The lever valve 240E may also include a membrane 272E that seals with slits 274E. The membrane 272E and/or valve slits 274E may be plastic or rubber or combination of plastic and rubber or rubber-like materials. For example, the membrane 272E and/or valve slit 274E may be made of a silicone or a thermoplastic elastomer (TPE) or other materials without these without departing from this invention.

Figure 25B:
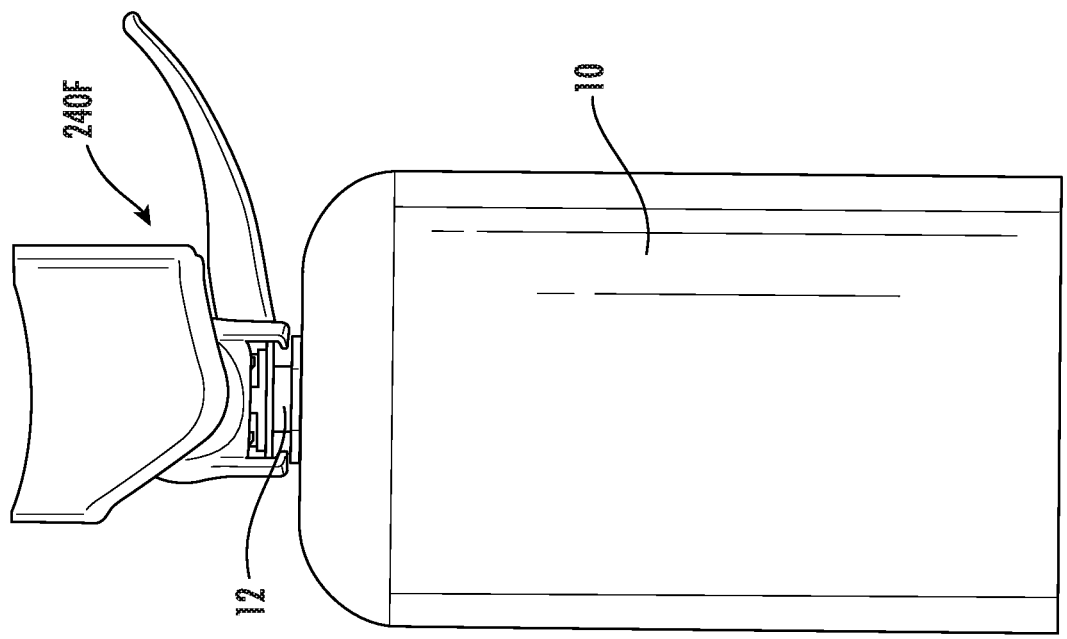
Figure 25A:
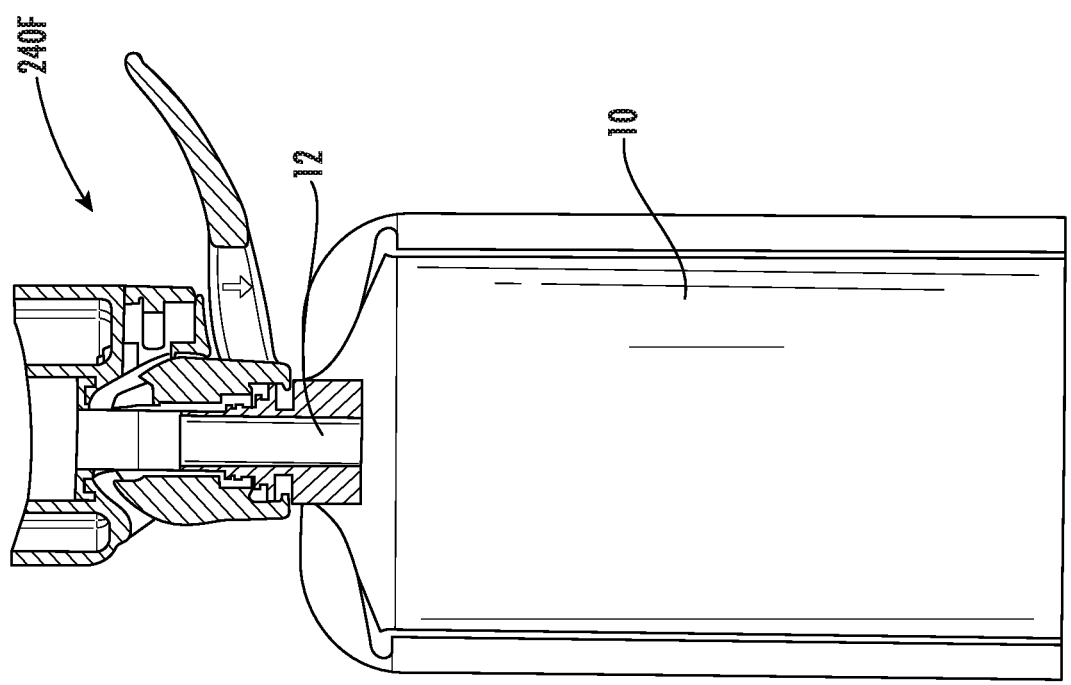

In another embodiment, a pinch valve 240F may be utilized with and as illustrated in FIGS. 25A through 28B. The pinch valve 240F may be utilized with any of the food pouch filling stations, the canisters, or the pressure systems in accordance with this invention. Specifically, FIG. 25A illustrates a cross-sectional view of the pinch valve 240F in an open position. FIG. 25B illustrates a top view of the pinch valve 240F in the open position. FIG. 25C illustrates a close-up cross-sectional view of the pinch valve 240F showing a pinch valve seal 248E in a pinched closed position.

FIG. 26 illustrates the various components included with the pinch valve 240F. The pinch valve 240F includes a valve rotating axis body 241F that attaches to the canister and creates the valve shaft 242F. A push button body 244F with a push button 245F may attach to the valve rotating axis body 241F. A pinch valve seal 246F may be located within the valve rotating axis body 241F. The pinch valve seal 246F may be made of a flexible material such as plastic or rubber or combination of plastic and rubber or rubber-like materials. For example, the pinch valve seal 246F may be made of a silicone or a thermoplastic elastomer (TPE) or other materials without these without departing from this invention. The pinch valve seal 246F may pinch close the valve shaft 242F when the pinch valve 240F closes. A spout retention body 248F may be attached to the valve rotating axis body 241F with a pivot pin 249F located off center for rotation about the valve rotating axis body 241F. The spout retention body 248F may also include an arm lever 250F that may be utilized to open and close the valve, thereby rotating the spout retention body 248F and pinching the pinch valve seal 246F. The push button 245F may be depressed which may release the spout retention body 248F to rotate open due to the load force from the pinch valve 240F and the pinch valve seal 246E being released from the locked position.

Figure 27B:
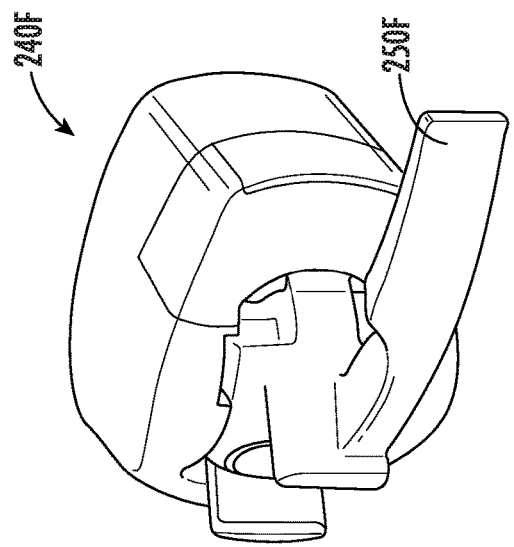
FIGS. 27A-27D include various views of components of a food pouch filling station in accordance with an embodiment of the system of the present invention.
Figure 27D:
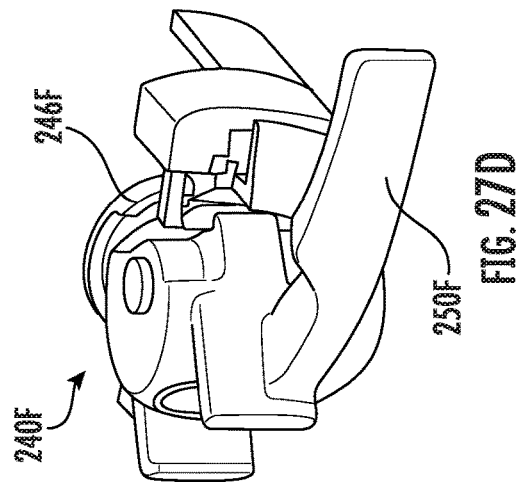
Figure 27A:
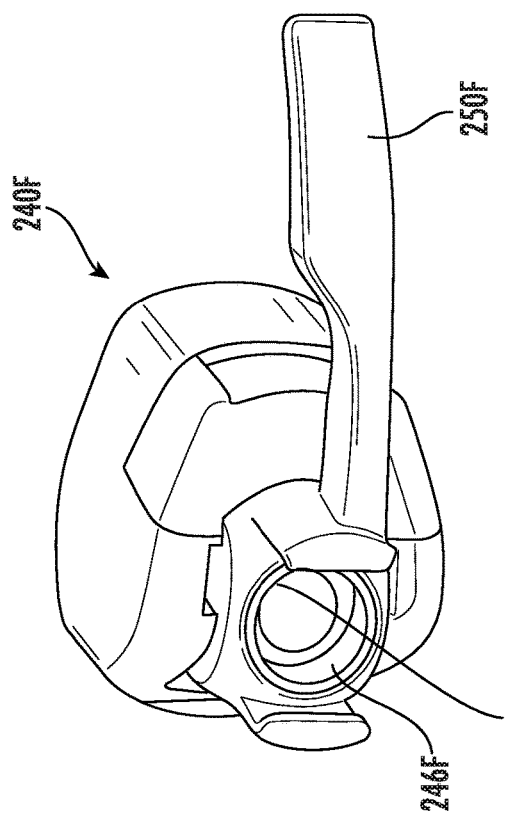
Figure 27C:
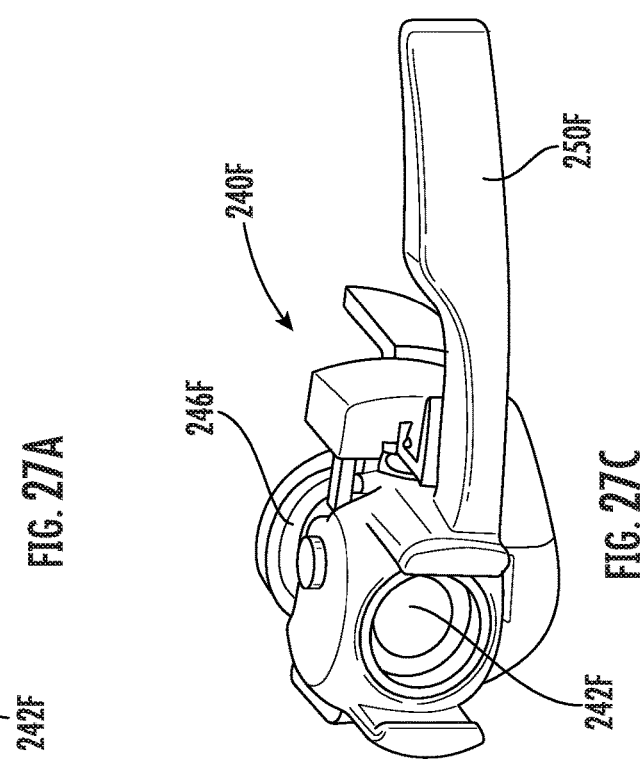

FIGS. 27A and 27B illustrate the pinch valve 240F in the open position (FIG. 27A) and the closed position (FIG. 27B). FIGS. 27C and 27D illustrate the pinch valve 240F and specifically a valve spring and locking mechanism in the unlocked position (FIG. 27C) and the valve spring and locking mechanism in the locked position (FIG. 27D).

FIGS. 28A and 28B illustrate the pinch valve 240F and the pouch 10 inserted into the pinch valve 240F. FIG. 28A specifically illustrates the orientation as the pouch 10 is inserted into the pinch valve 240F and the clearance for the pouch spout 12 to enter the valve retention features before being rotated 90 degrees and locked into position. FIG. 28B specifically illustrates the pouch 10 orientation rotated 90 degrees so that the pouch spout 12 groove locks into the valve nozzle retention feature. One key feature of the pinch valve 240F design is the way the pouch 10 is held in position by using a groove of the food pouch spout 12 and plastic hooks 247F on the pinch valve 240F. The pouch 10 is inserted so that the pouch spout 12 goes inside the pinch valve 240F and then the pouch 10 is rotated so the pouch 10 locks into place. This locking provides a secure seal and prevents unexpected removal due to the filling pressure.

Figure 29B:
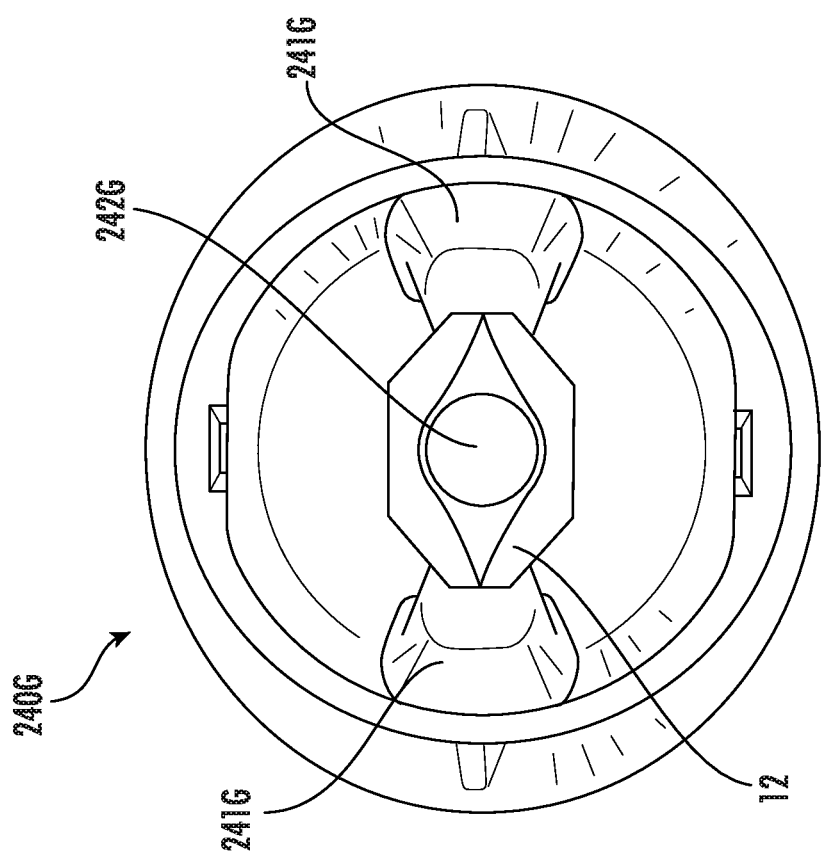
FIGS. 29A and 29B include various views of components of a food pouch filling station in accordance with an embodiment of the system of the present invention.
Figure 29A:
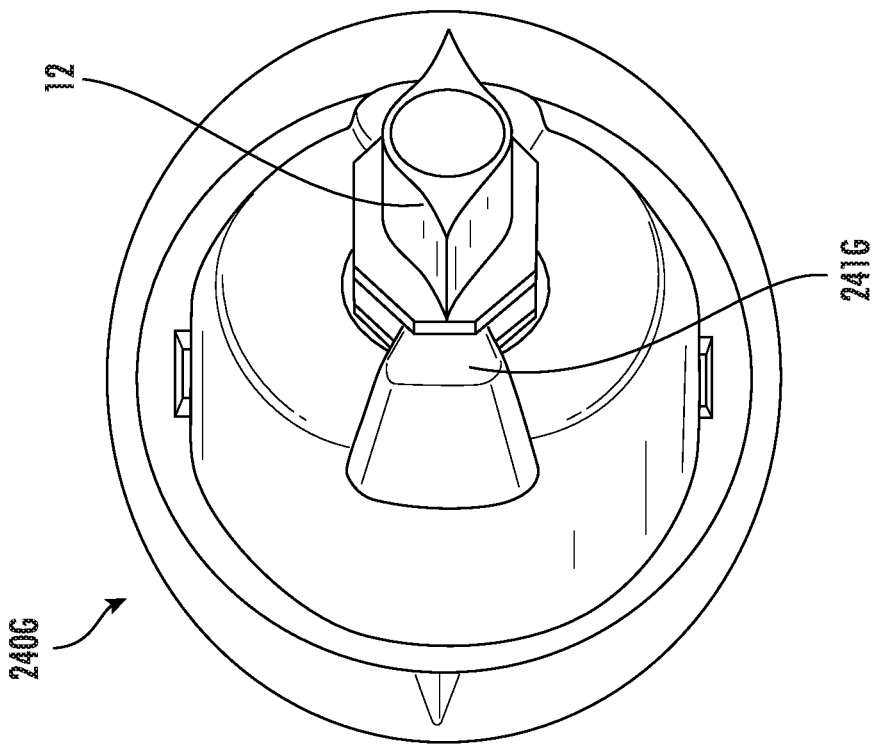

In another embodiment, a ball valve 240G may be utilized with and as illustrated in FIGS. 29A through 33. The ball valve 240G may be utilized with any of the food pouch filling stations, the canisters, or the pressure systems in accordance with this invention. Specifically, FIG. 29A illustrates the ball valve 240G rotated in a locked position and the pouch spout 12 locked into position on the ball valve 240G. FIG. 29B illustrates the ball valve 240G in an open position with a clear passage way for the contents of the canister 210 to enter the pouch 10 with the pouch spout 12 locked into position on the ball valve 240G.

Figure 30B:
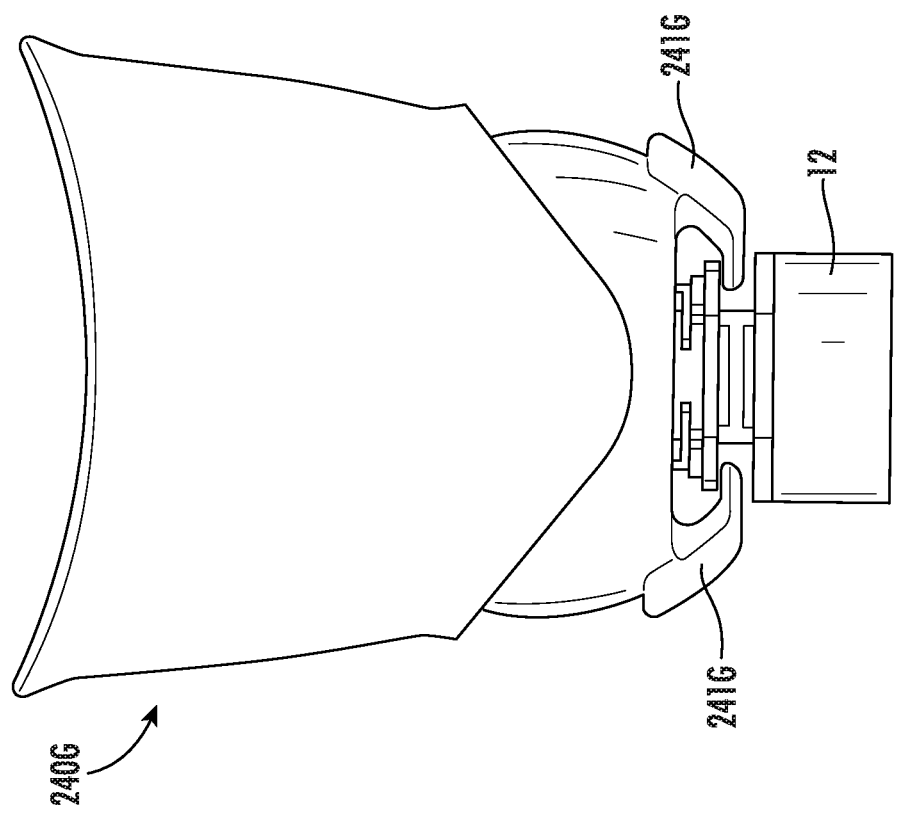
FIGS. 30A and 30B include various views of components of a food pouch filling station in accordance with an embodiment of the system of the present invention.
Figure 30A:
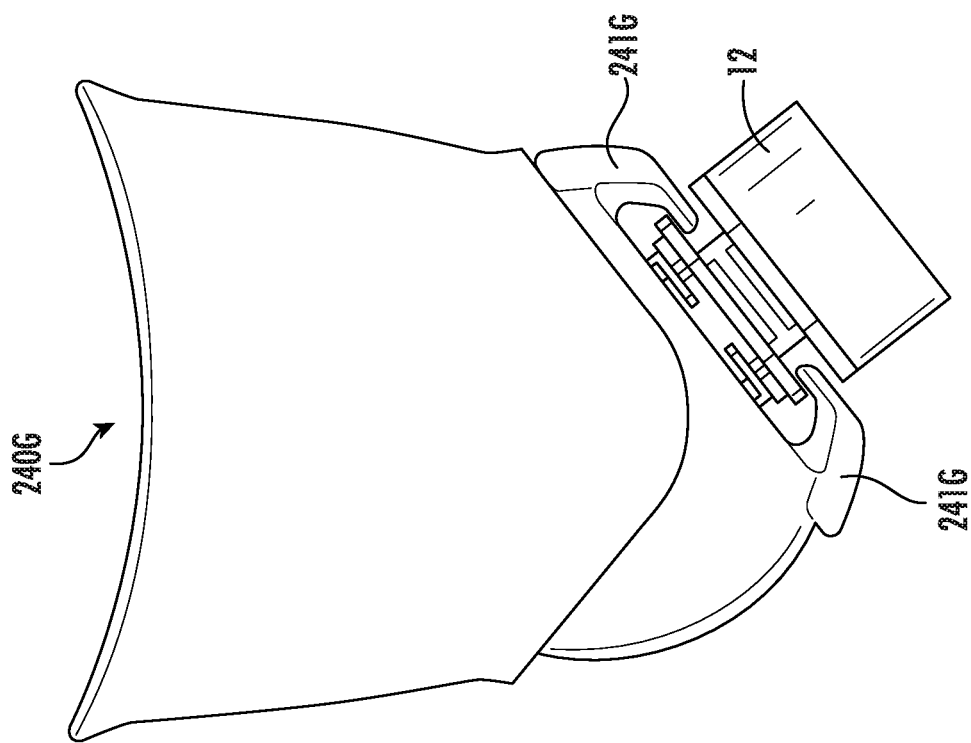

FIG. 30A illustrates a top view of the ball valve 240G in the locked position while FIG. 30B illustrates a top view of the ball valve 240G in the open position. One key feature of the ball valve 240G design is the way the pouch 10 is held in position by using a groove of the food pouch spout 12 and plastic hooks 241G on the ball valve 240G. The pouch 10 is inserted so that the pouch spout 12 goes inside the ball valve 240G and then the pouch 10 is rotated so the pouch 10 locks into place. This locking provides a secure seal and prevents unexpected removal due to the filling pressure.

Figure 31A:
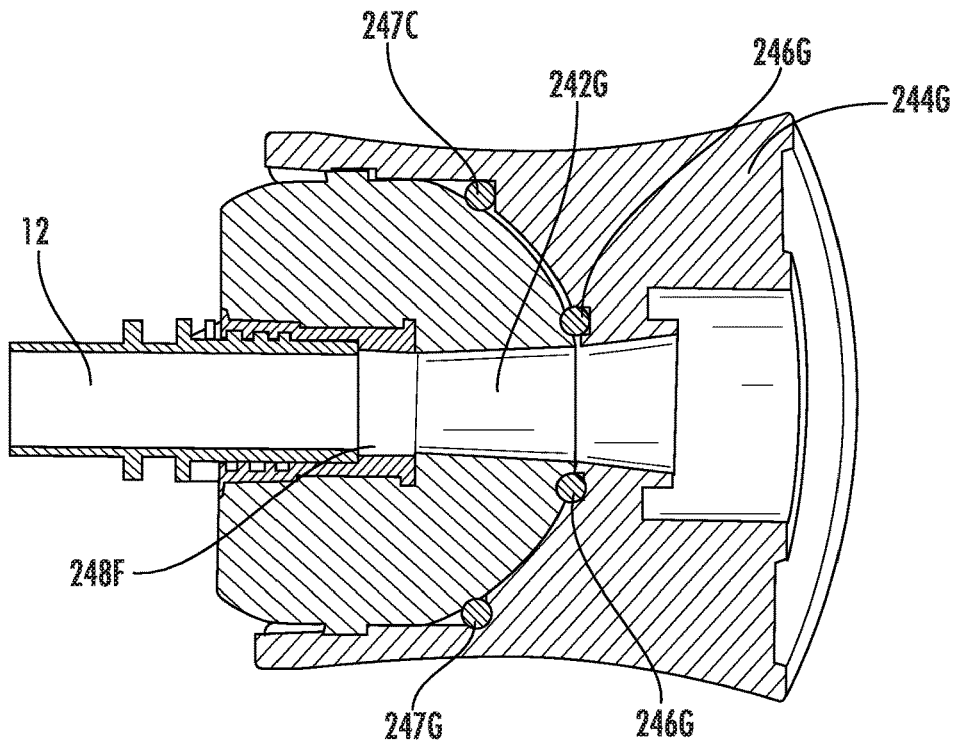
FIGS. 31A and 31B include various views of components of a food pouch filling station in accordance with an embodiment of the system of the present invention.
Figure 31B:
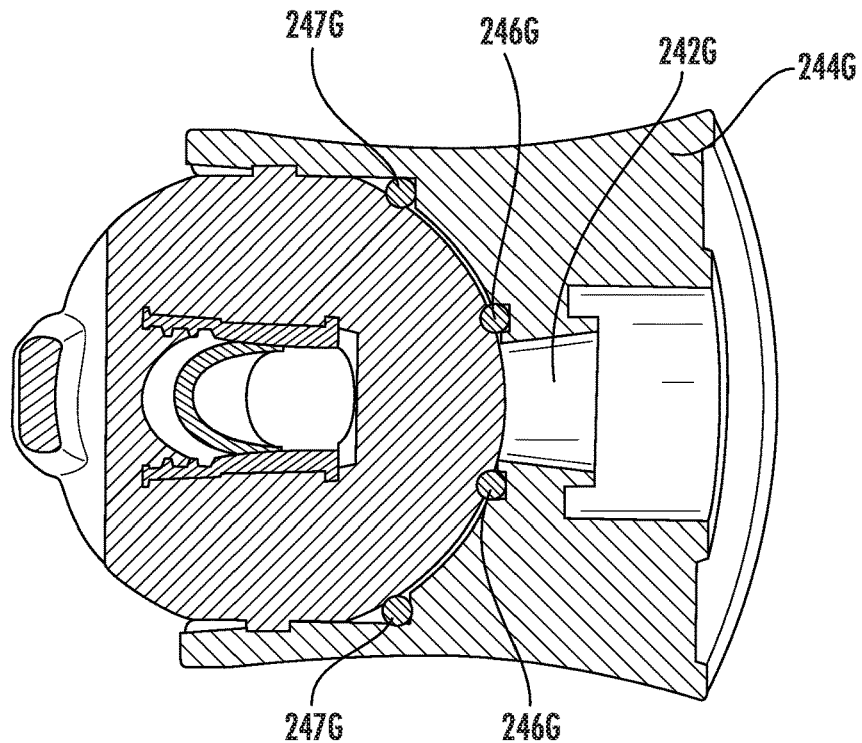
Figure 32:
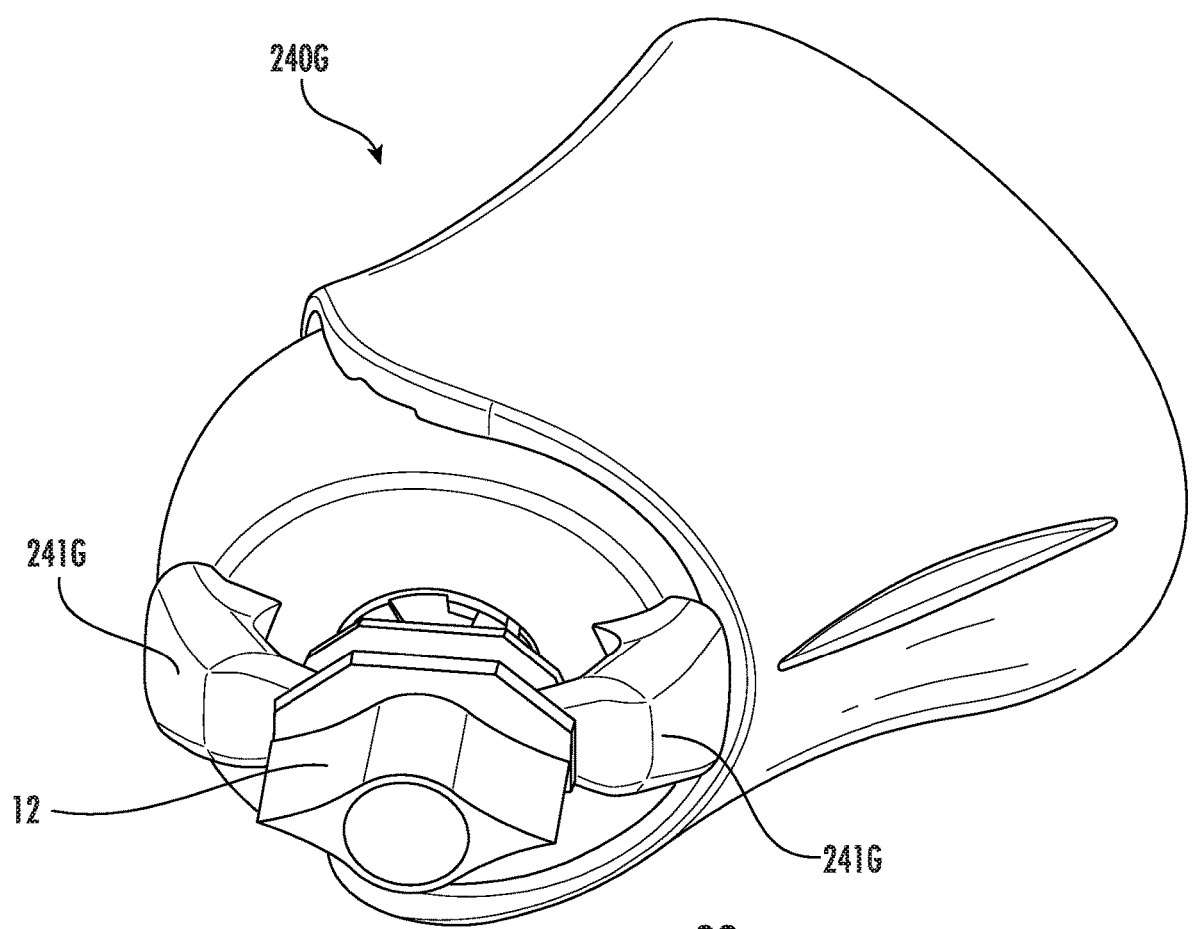
FIG. 32 includes a perspective view of components of a food pouch filling station in accordance with an embodiment of the system of the present invention.

FIG. 31A illustrates a cross-sectional view of the ball valve 240G in the open position and the pouch spout 12 attached. FIG. 31B illustrates a cross-sectional view of the ball valve 240G in the closed position. As illustrated in FIGS. 31A and 31B, the ball valve 240G may include a valve shaft 242G with a ball valve housing 244F that screws onto or connects to the canister 210 and canister spout 216. The ball valve 240F may also include a first internal O-ring 246G and a second internal O-ring 247G. The ball valve 240G may also include a seal 248G that seals against the pouch spout 12 and the ball valve 240G. FIG. 32 illustrates a perspective view of the ball valve 240G on the canister spout 216.

Figure 33:
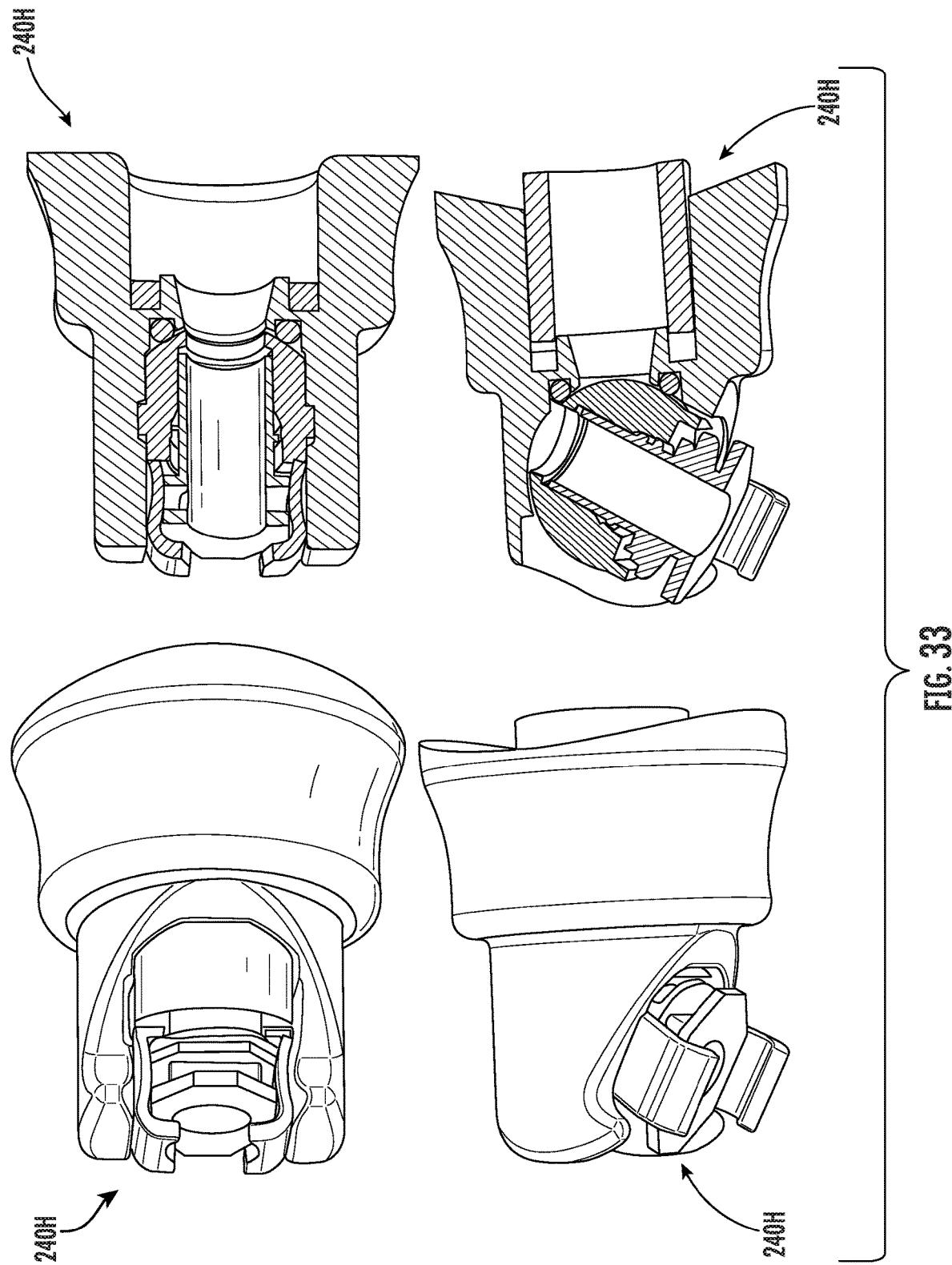
FIG. 33 includes various views of components of a food pouch filling station in accordance with an embodiment of the system of the present invention.

FIG. 33 illustrates various views of another ball valve 240H in accordance with aspects of this invention.

For the embodiments of FIGS. 34-37, the features are referred to using similar reference numerals under the "3xx" series of reference numerals, rather than "1xx" or "2xx" as used in the embodiment of FIGS. 1-4 or FIGS. 5-11 respectively. Accordingly, certain features of the food pouch filling station 300 that were already described above with respect to the food pouch filling station 100 of FIGS. 1-4 and the food pouch filling station 200 of FIGS. 5-11 may be described in lesser detail, or may not be described at all.

Figure 34:
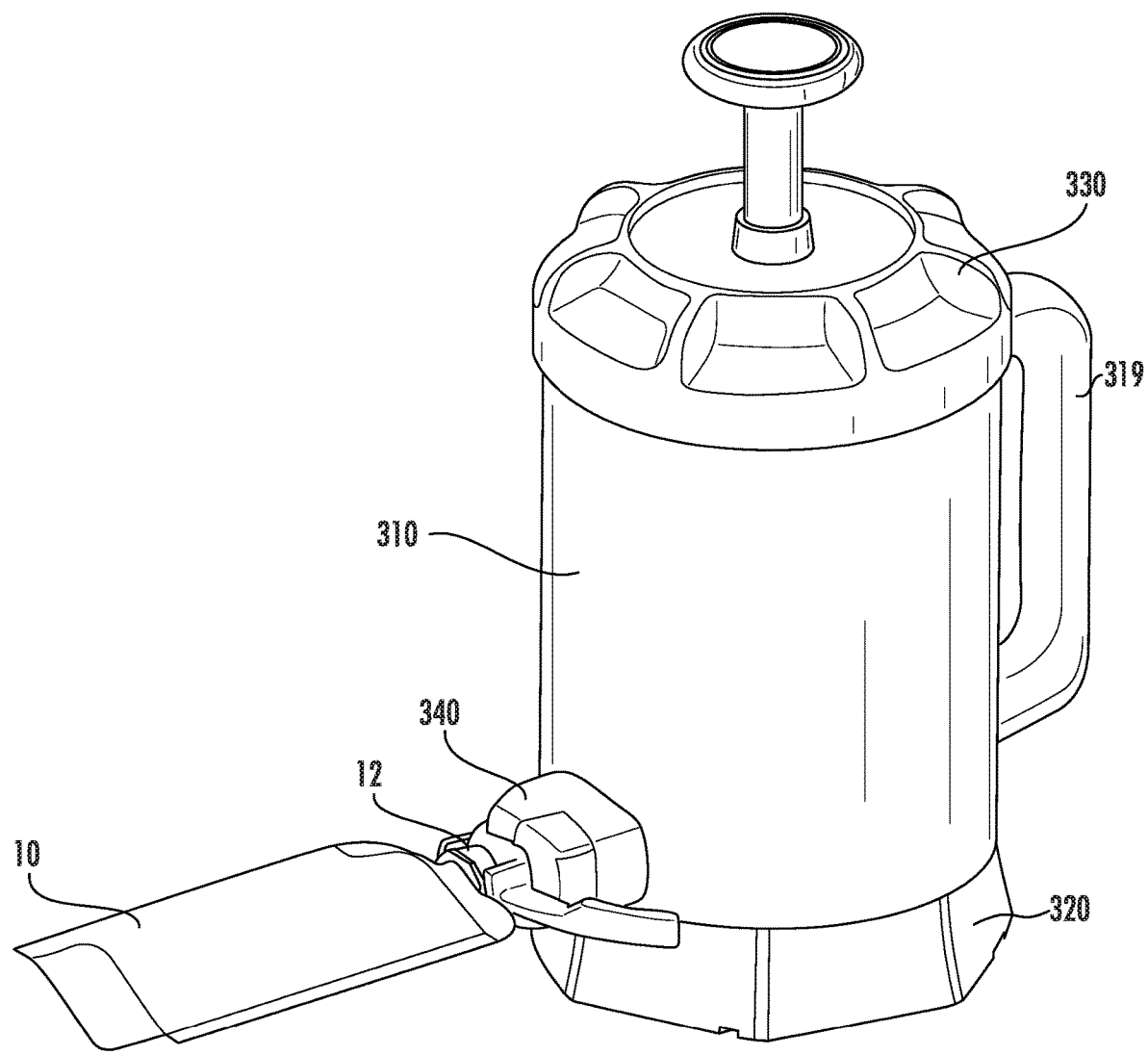
FIG. 34 is a perspective view of another food pouch filling station in accordance with an embodiment of the system of the present invention.
Figure 35:
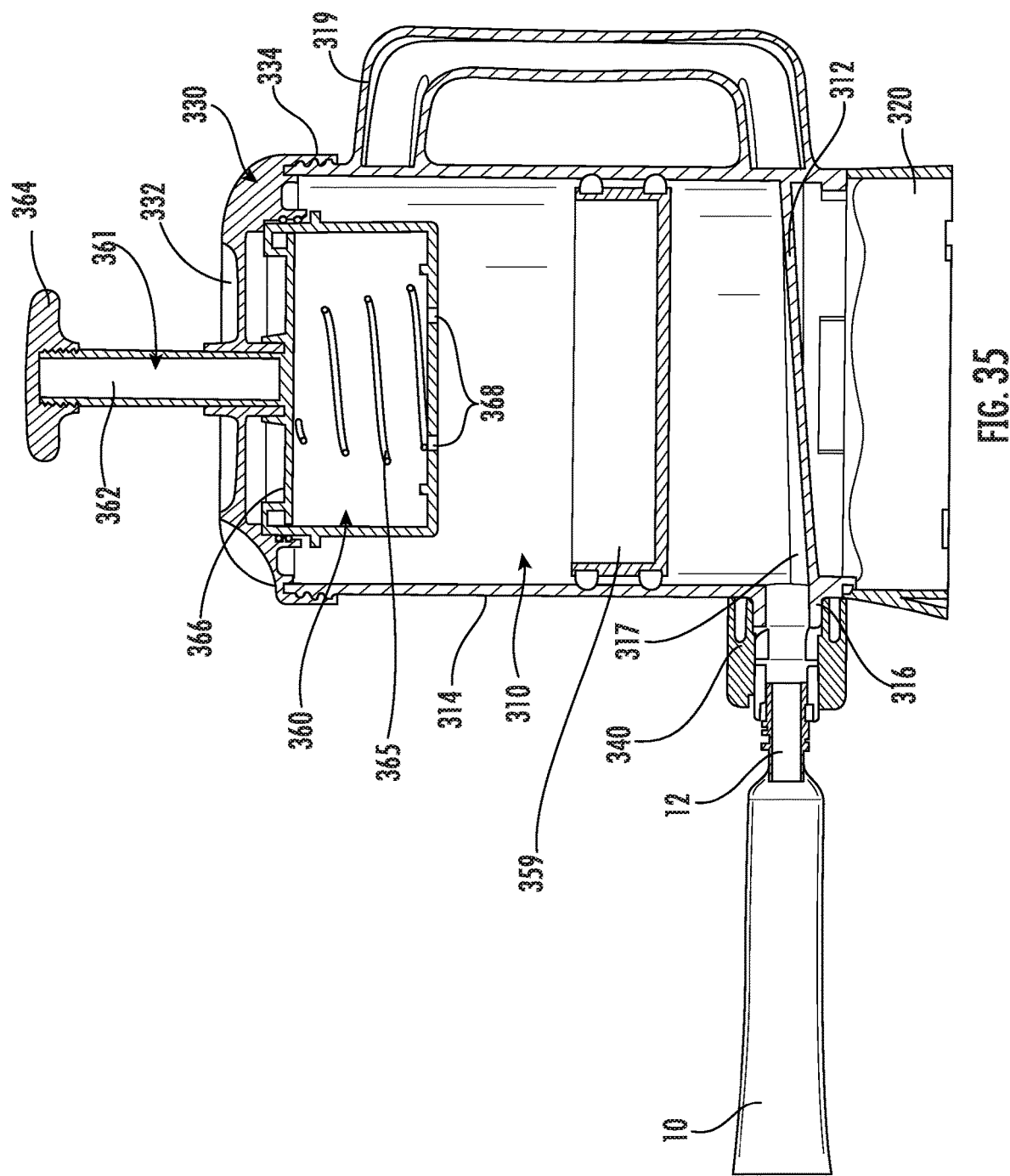
FIG. 35 is a cross-sectional view of another food pouch filling station in accordance with an embodiment of the system of the present invention.
Figure 36:
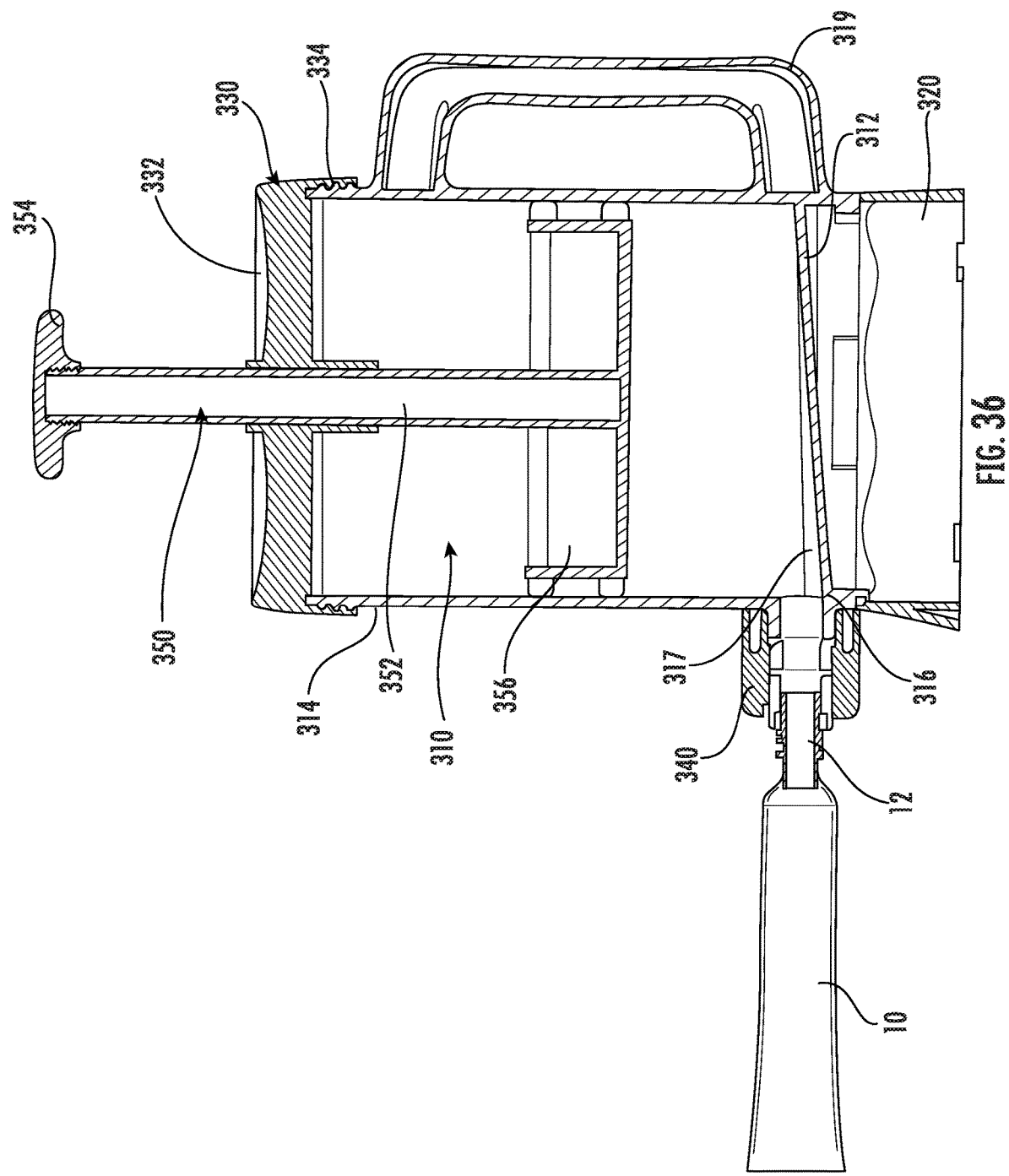
FIG. 36 is a cross-sectional view of another food pouch filling station in accordance with an embodiment of the system of the present invention.

The food pouch filling station 300 includes a canister 310, a base 320, a lid 330, and a valve assembly 340. The canister 310 may sit on and attach to the suction base 320. The valve 340 may be located on the wall of the canister 310 and may connect to the pouch spout 12. FIGS. 34 and 35 illustrate a food pouch filling station 300 with an air pump system 360. The lid 330 and the air pump system 360 may fit onto the top of the canister 310. The air pump system 360 may be included with the lid 330. FIG. 36 illustrates a food pouch filling station 300 with a plunger 350. The plunger 350 may extend through the middle of the lid 330. The plunger 350 may be sized to snugly slide into the canister 310 with enough pressure on the walls of the canister 310 to prevent the contents of the canister 310 from sliding by when the plunger 350 is pressed. The plunger 350 may include a shaft 352 with a handle 354 on one end and a plunger flange 356 on the other end. The plunger flange 356 may include a plurality of flexible ridges to snugly slide into the canister 310 with enough pressure on the side walls of the canister 310 to prevent the contents of the canister 310 from sliding by when the plunger 350 is pressed.

The canister 310 as illustrated in FIGS. 34-36 may include a bottom 312, side walls 314, and a canister spout 316. The side walls 314 may extend upward from the bottom 312. The side walls 314 may extend with a small draft angle angled inward from the top to the bottom of the canister 310 thereby creating a top-to-bottom internal diameter change. The top-to-bottom diameter change provides an upper internal diameter of the canister 310 larger than a lower internal diameter of the canister 310. The top-to-bottom diameter change of the internal diameter may be around 0.080 inch. Other values of top-to-bottom diameter change may be utilized without departing from this invention. The bottom 312 and side walls 314 may be various different shapes without departing from this invention. The canister spout 316 may be located near or adjacent to the bottom 312 of the canister 310 in order to connect to and receive a food pouch 10. The bottom 312 may also include a trough 318 to help feed the contents of the canister 310 to the canister spout 316. The bottom 312 may be slanted towards the canister spout 316 to help feed the contents of the canister 310 to the canister spout 316. The valve 340 may be located adjacent with the canister wall 314 and adjacent to the canister spout 316. Any of the valves 340 described and detailed may be utilized with the food pouch filling station 300 without departing from this invention. Any other valve 340 may be utilized with the food pouch filling station 300 without departing from this invention.

The canister 310 may also include a straight cylinder vessel or side walls 314 and may slide onto and connect with the base 320. The canister 310 may also include a pour spout and a canister handle 319 without departing from this invention. Further, the base 320 may be sized and shaped to sit on a flat surface, such as a table-top or a counter top. The lid 330 may include a top plate 332 and a flange 334 extending downward from the top plate 332. The top plate 332 may be sized and shaped to slide with the flange 334 within an internal diameter or outer diameter of the side walls 314 of the canister 310. The top plate 332 may be used to stabilize the pump shaft 352, 362 trajectory.

The air pump system 360 of the food pouch filling station 300 may include a one-way pump 361, a pump housing 363, and one or more button seals 368 located at the bottom of the pump housing 363. The pump housing 363 may be attached to or connected to a bottom-side or underside of the lid 330. For example, the pump housing 363 may be screwed onto the bottom-side of the lid 330 without departing from this invention. Other methods of connecting the pump housing 363 to the lid 330 may be utilized, such as snap-fit, molded, quarter-turn, etc. A seal may be utilized between the pump housing 363 and lid 330 connection. The one or more button seals 368 may act as one-way check valves from the pump housing 363 to the canister 310, preventing air from escaping from the canister 310 when a user pulls up on the pump 361. The pump 361 may include a pump shaft 362 with a handle 364 located at one end and a pump flange 366 located at the opposite end. When the canister 310 is pressurized, the pressure pushes against these valve seals 368 preventing the high pressure from escaping from the canister 310. The canister lid 330 may also have a seal on the pump housing 363 and the canister 310 so that there is an air-tight chamber. Additionally, the pump housing 363 may include a spring 365 so that the pump 361 and handle 364 retract automatically after pressed downward.

The air pump system 360 may also include a plunger disk seal 359 that would sit on top of the contents of the canister 310. FIGS. 37 and 38A-D specifically illustrate two exemplary plunger disk seals 359 that could be utilized with this invention. The plunger disk seal 359 may include two radius-lobed seals 359A, 359B made of a flexible material, such as rubber or plastic or combination of plastic and rubber or rubber-like materials. For example, the plunger disk seal 359 and its components may be made of a silicone or a thermoplastic elastomer (TPE) or combination or other materials without these without departing from this invention. The plunger disk seal 359 may also include a rigid body disk 359C. The seals 359A, 359B may need to flex and adjust to the diameter reduction in the canister 310 and not jam caused by tipping or high friction load on the seals 359A, 359B. The seals 359A, 359B may be made of a rubber or plastic or combination of plastic and rubber or rubber-like materials for the top and bottom seal for the flexing properties. For example, the seals 359A, 359B may be made of a silicone or a thermoplastic elastomer (TPE) or combination or other materials without these without departing from this invention. The seals 359A, 359B may stabilize the pump shaft 362 as it moves down the canister 310 by acting as a guiding component that stabilizes the pump shaft 362.

The plunger disk seal 359 may ensure there is an even distribution of air pressure on the contents of the canister 310 so that when there is a low volume of contents within the canister 310, the air does not bypass the contents of the canister 310 with air filling into the pouch 10. The plunger disk seal 359 will also ensure that all the contents of the canister 310 off the side walls 314 of the canister 310 and what is remaining on the bottom of the canister 310 when the canister 310 is almost empty are dispensed into the pouch 10.

Figure 37:
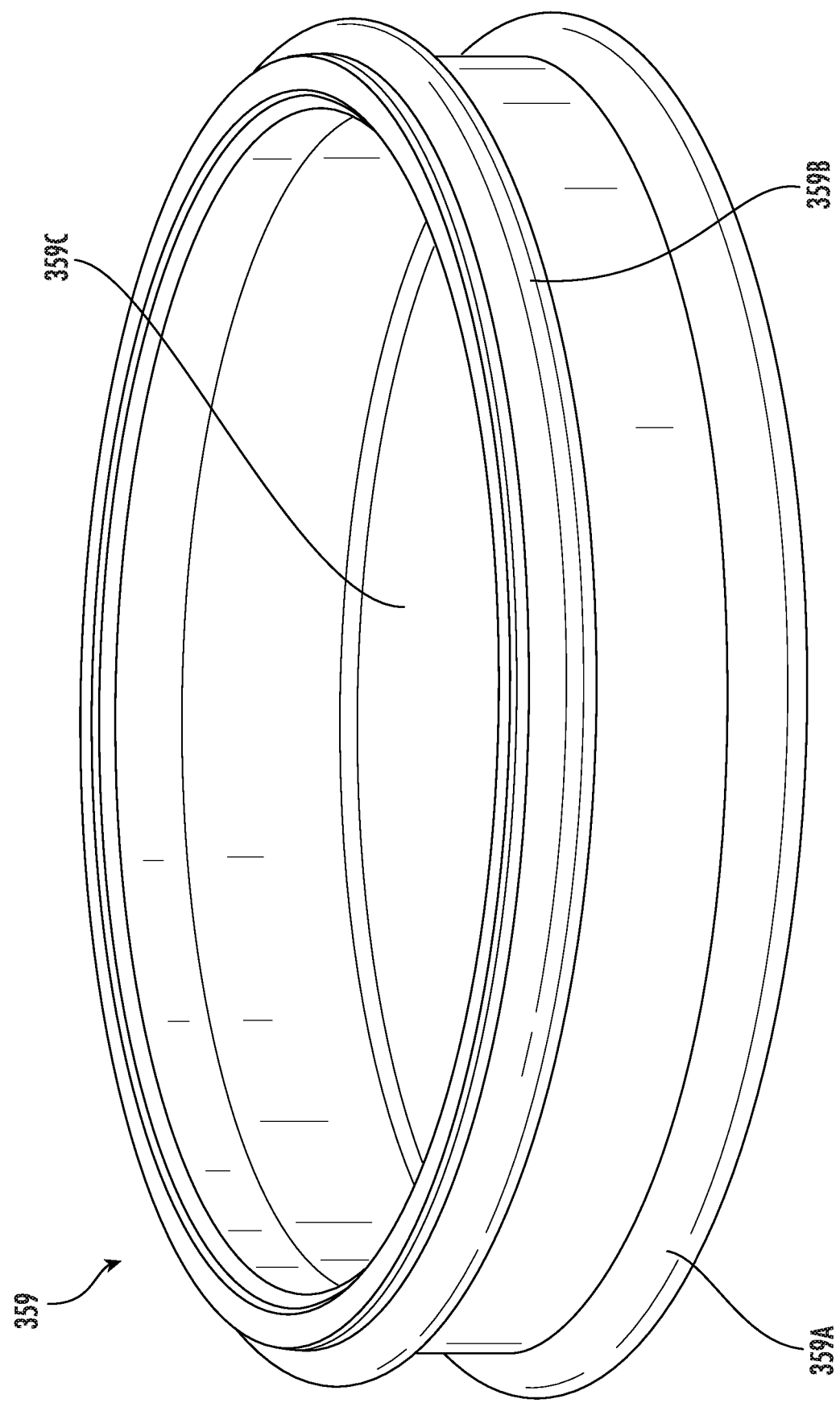
FIG. 37 includes a perspective view of components of a food pouch filling station in accordance with an embodiment of the system of the present invention.

Both the air pump style filling station illustrated in FIGS. 34 and 35 and the plunger style filling station illustrated in FIG. 36 may utilize a similar or same plunger disk seal 359. Additionally, the plunger flange 156 of the food pouch filling station 100 may utilize a similar size and shape to the plunger disk seal 359 as illustrated in FIGS. 37 and 38.

The air pump system 360 may also include an automatic pump system, which replaces the air pump lid with a lid with a pump motor that is electronically powered to generate pressure and volume of air in a specified amount of time. For example, the pump motor may include a pressure sensor which stops filling at a certain pressure. The automatic pump system may include this top lid with preconfigured or configurable settings such that the pump would be told to maintain a specific pressure inside the canister chamber. When a pouch 10 is inserted and the valve 340 is turned on, the pouch 10 would fill. The canister 310 would then simultaneously lose X ounces of air and the pressure within the canister 310 would drop. With an automatic pump system, the pump system 360 would then automatically turn on and pressurize the canister 310 to maintain the preset pressure.

In another embodiment of the invention, the food pouch filling station 300 may include an electric pump design. The food pouch filling station 300 may include an electric pump to mate with the canister 310 to generate pressure and volume of air in a specified amount of time. The electric pump may fit in the canister lid 330 replacing the hand air pump 360 or the plunger 350. Additionally, the electric pump may include controls that would maintain a certain air pressure and/or be designed to pump a certain amount of fluid ounces based on a pouch size or customer preference of how many ounces the want to serve for their child. The electric automatic pump may also have an intelligent pressure detection and stop function.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

We claim:

1. A pouch filling station comprising:
a canister including a vessel, the canister having a bottom, side walls extending from the bottom, and a canister spout located along the side wall of the canister, the canister holding contents to be dispensed into a pouch;
a lid that fits on a top of the canister;
a valve located on the side wall of the canister, wherein the valve is configured to attach to the canister spout and a pouch spout of the pouch, the valve controlling a flow of the contents of the canister to fill the pouch; and
an air pump system included with the lid and located on the top of the canister, the air pump system including a pump housing, and a pump to pressurize the pump housing and the canister,
wherein when the pump housing and the canister are pressurized with the pump, the pouch spout is connected to the valve, and the valve is opened, the air pressure from the canister pushes the contents of the canister through the canister spout and the valve into the pouch.

2. The pouch filling station of claim 1, wherein the bottom of the canister is slanted towards the canister spout and the bottom of the canister includes a trough to feed the contents of the canister to the canister spout.

3. The pouch filling station of claim 1, further including one or more check valve seals located at the bottom of the pump housing, wherein the pump pressurizes the pump housing and the canister through the one or more check valve seals, and further wherein the one or more check valve seals allow air to flow from the pump housing to the canister and prevent air from escaping from the canister when the pump pressurizes the pump housing.

4. The pouch filling station of claim 1, wherein the valve is one of the following: a ball valve, a pinch valve, a dial-clamp valve, or a cone valve seal.

5. The pouch filling station of claim 1, wherein the lid includes a top plate and a flange extending downward from the top plate, wherein the flange is sized and shaped to cooperate with the side walls of the canister to secure the lid to the canister, wherein the top plate stabilizes a pump shaft from the pump.

6. The pouch filling station of claim 1, wherein the pump includes a pump shaft with a handle located at one end and a pump flange located at the opposite end of the pump shaft.

7. The pouch filling station of claim 6, wherein the pump housing includes a spring so that the pump and handle retract automatically after the pump is pressed downward.

8. The pouch filling station of claim 1, wherein the air pump system includes a plunger disk seal located within an internal diameter of the canister to ensure an even distribution of air pressure on the contents of the canister.

9. The pouch filling station of claim 8, wherein the plunger disk seal includes a rigid body disk and one or more radius-lobed flexible seals extending around the circumference of the rigid body disk, wherein the one or more radius-lobed flexible seals seal the internal diameter of the canister.

10. The pouch filling station of claim 1, wherein the air pump system includes an automatic pump with a pump motor that electronically generates a pressure and a volume of air in the pump housing in a specified amount of time, wherein when the valve is opened and a pouch is filled, the automatic pump automatically turns on and pressurizes the pump housing and the canister to maintain a preset pressure.

11. The pouch filling station of claim 1, wherein the air pump system includes a pressure sensor that stops filling at a certain pressure and maintains a specific pressure within in the canister.

12. The pouch filling station of claim 1, wherein the air pump system includes an electric pump that fits on the lid and mates with the canister to generate a pressure and a volume of air in the pump housing in a specified amount of time, wherein the electric pump includes controls that maintain a specified air pressure to fill a certain amount of fluid ounces based on a pouch size.

13. A pouch filling station comprising:
a canister including a vessel, the canister having a bottom, side walls extending from the bottom, and a canister spout located adjacent to the bottom, the canister holding contents to be dispensed into a pouch, wherein the bottom of the canister is slanted towards the canister spout and the bottom of the canister includes a trough to feed the contents of the canister to the canister spout, wherein the lid includes a top plate and a flange extending downward from the top plate, wherein the flange is sized and shaped to cooperate with the side walls of the canister to secure the lid to the canister;
a lid that fits on a top of the canister;
a valve located on the side wall of the canister, wherein the valve is configured to attach to the canister spout and a pouch spout of the pouch, the valve controlling a flow of the contents of the canister to fill the pouch, wherein the valve is one of the following: a ball valve, a pinch valve, a dial-clamp valve, or a cone valve seal; and
an air pump system included with the lid and located on the top of the canister, the air pump system including a pump housing, one or more check valve seals located on the pump housing, and a pump to pressurize the pump housing and the canister through the one or more check valve seals, the air pump system further including a plunger disk seal located within an internal diameter of the canister to ensure an even distribution of air pressure on the contents of the canister,
wherein the pump includes a pump shaft with a handle located at one end and a pump flange located at the opposite end of the pump shaft, the top plate stabilizes the pump shaft;
wherein the pump housing includes a spring so that the pump and handle retract automatically after the pump is pressed downward,
wherein when the pump housing and the canister are pressurized with the pump, the pouch spout is connected to the valve, and the valve is opened, the air pressure from the canister pushes the contents of the canister through the canister spout and the valve into the pouch.

14. The pouch filling station of claim 13, wherein the one or more check valve seals allow air to flow from the pump housing to the canister and prevent air from escaping from the canister when the pump pressurizes the pump housing.

15. The pouch filling station of claim 13, wherein the plunger disk seal includes a rigid body disk and one or more radius-lobed flexible seals extending around the circumference of the rigid body disk, wherein the one or more radius-lobed flexible seals seal the internal diameter of the canister.

16. A pouch filling station comprising:
a canister including a vessel, the canister having a bottom, side walls extending from the bottom, and a canister spout located adjacent to the bottom, the canister holding contents to be dispensed into a pouch, wherein the bottom of the canister is slanted towards the canister spout and the bottom of the canister includes a trough to feed the contents of the canister to the canister spout;
a lid that fits on a top of the canister;
a valve located on the side wall of the canister, wherein the valve is configured to attach to the canister spout and a pouch spout of the pouch, the valve controlling a flow of the contents of the canister to fill the pouch; and
an air pump system included with the lid and located on the top of the canister, the air pump system including a pump housing, one or more check valve seals located on the pump housing, and a pump to pressurize the pump housing and the canister,
the air pump system further including a plunger disk seal located within an internal diameter of the canister to ensure an even distribution of air pressure on the contents of the canister, wherein the plunger disk seal includes a rigid body disk and one or more radius-lobed flexible seals extending around the circumference of the rigid body disk, wherein the one or more radius-lobed flexible seals seal the internal diameter of the canister,
wherein the air pump system includes an automatic pump with a pump motor that electronically generates a pressure and a volume of air in the pump housing in a specified amount of time, wherein when the valve is opened and a pouch is filled, the automatic pump automatically turns on and pressurizes the pump housing and the canister to maintain a preset pressure,
wherein when the pump housing and the canister are pressurized with the pump, the pouch spout is connected to the valve, and the valve is opened, the air pressure from the canister pushes the contents of the canister through the canister spout and the valve into the pouch.

17. The pouch filling station of claim 16, wherein the valve is one of the following: a ball valve, a pinch valve, a dial-clamp valve, or a cone valve seal.

18. The pouch filling station of claim 16, wherein the air pump system includes a pressure sensor that stops filling at a certain pressure and maintains a specific pressure within in the canister.

19. The pouch filing station of claim 16, wherein the one or more check valve seals allow air to flow from the pump housing to the canister and prevent air from escaping from the canister when the pump pressurizes the pump housing.

20. The pouch filling station of claim 16, wherein the air pump system includes an electric pump that fits on the lid and mates with the canister to generate a pressure and a volume of air in the pump housing in a specified amount of time, and wherein the electric pump includes controls that maintain a specified air pressure to fill a certain amount of fluid ounces based on a pouch size.

* * * * *